United States Patent [19]

Roye

[11] Patent Number: 4,821,336
[45] Date of Patent: Apr. 11, 1989

[54] METHOD AND APPARATUS FOR SIMPLIFYING RUNLENGTH DATA FROM SCANNING OF IMAGES

[75] Inventor: John M. Roye, Tempe, Ariz.

[73] Assignee: GTX Corporation, Phoenix, Ariz.

[21] Appl. No.: 16,662

[22] Filed: Feb. 19, 1987

[51] Int. Cl.⁴ .................................................. G06K 9/00
[52] U.S. Cl. ................................... 382/56; 358/261.1; 382/26; 382/54
[58] Field of Search ........................ 382/56, 21, 22, 25, 382/26, 54; 358/260, 261, 263, 133

[56] References Cited

U.S. PATENT DOCUMENTS

| | | | |
|---|---|---|---|
| 4,103,287 | 7/1978 | Frank | 382/56 |
| 4,107,648 | 8/1978 | Frank | 382/26 |
| 4,183,013 | 1/1980 | Agrawala et al. | 382/26 |
| 4,189,711 | 2/1980 | Frank | 382/26 |
| 4,307,377 | 12/1981 | Pferd et al. | 382/56 |
| 4,486,784 | 12/1984 | Abraham et al. | 358/261 |
| 4,499,597 | 2/1985 | Alves | 382/54 |
| 4,603,431 | 7/1986 | Grover et al. | 358/260 |

Primary Examiner—Leo H. Boudreau
Attorney, Agent, or Firm—Cahill, Sutton & Thomas

[57] ABSTRACT

Serial runlength data obtained by scanning an image includes "slices" that each include the length and an ending pixel number of a successive string of connected black pixels. The runlength data is operated upon, line-by-line, by a decision tree classifier that creates a software "object" including a first linked list of a plurality of further linked lists each of which contains all of the slices of a simple shape of the image. The slices of the object are entered into a "frame" in the same order in which they are scanned and are "filtered" to delete insignificant horizontal and vertical gaps between slices. The slopes of edges of the shapes are tested for linearity to determine which shapes can be represented as trapezoids that can be represented by four corner points and which must be represented as irregular blobs containing all of their slices. The resulting greatly compacted frame data representing the object is fed into a decision tree classifier that recognizes and assigns identifiers to divergences, convergences, and open ends of the object and creates a new linked list of linked lists representing the object in the form of blob records, trapezoid records, divergence records, and convergence records which then can be conveniently used in subsequent vectorization operations without the need to scan and recognize data representing the object.

34 Claims, 26 Drawing Sheets

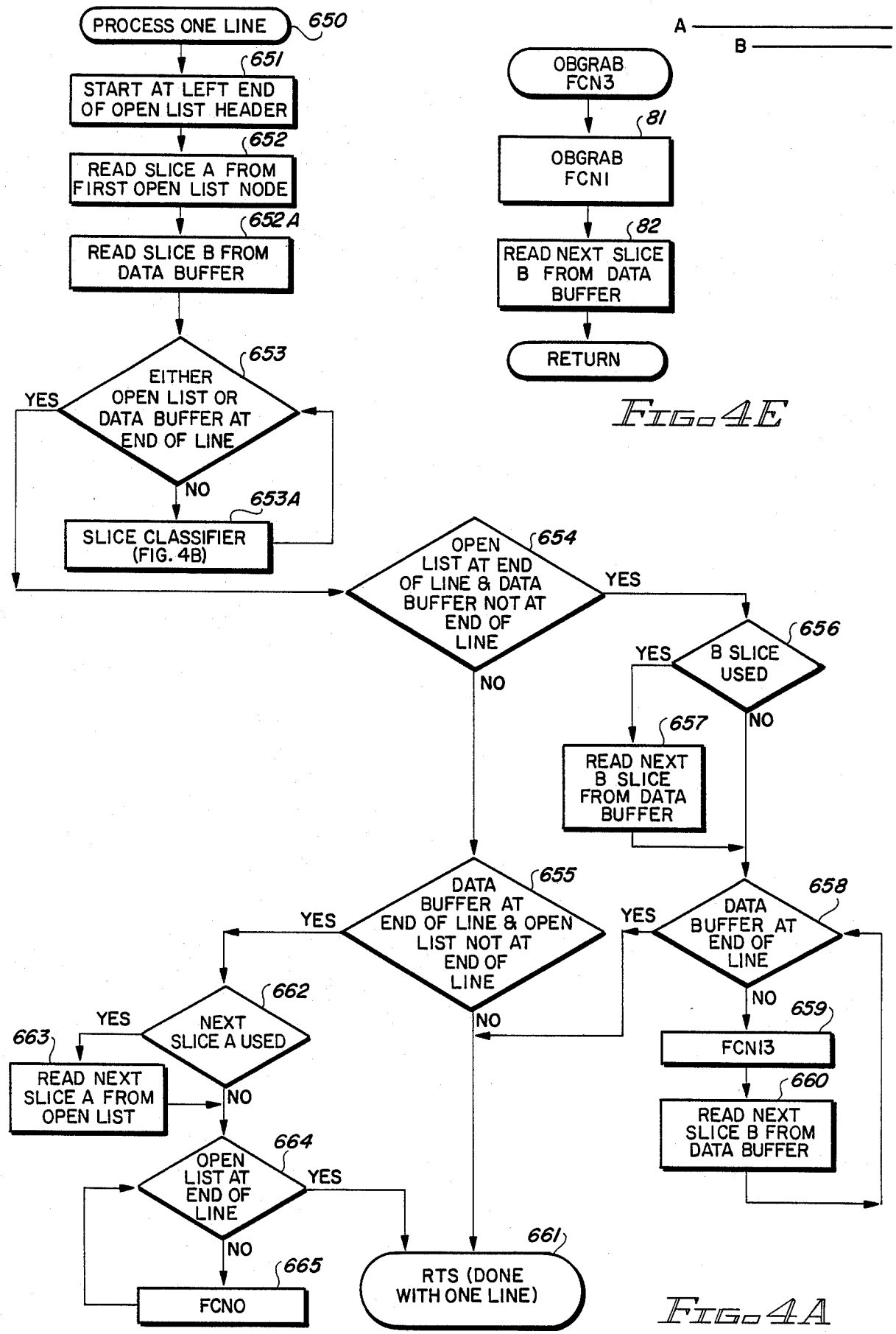

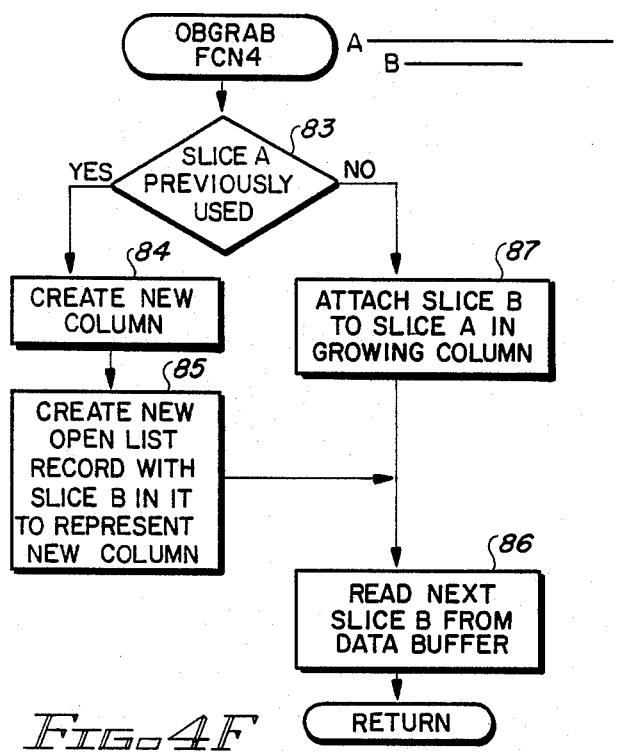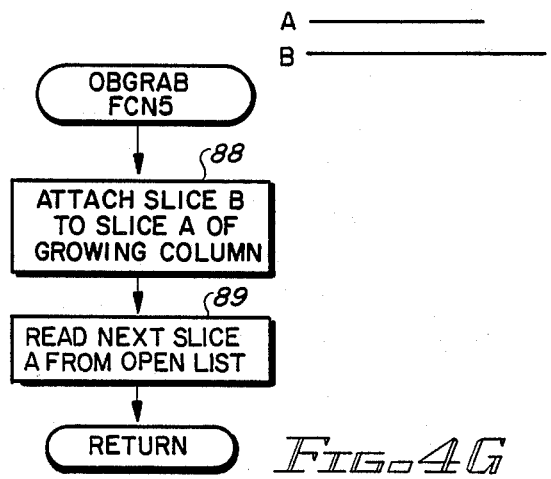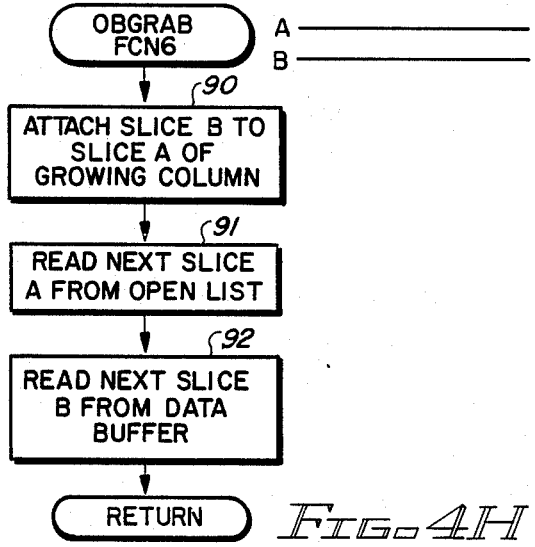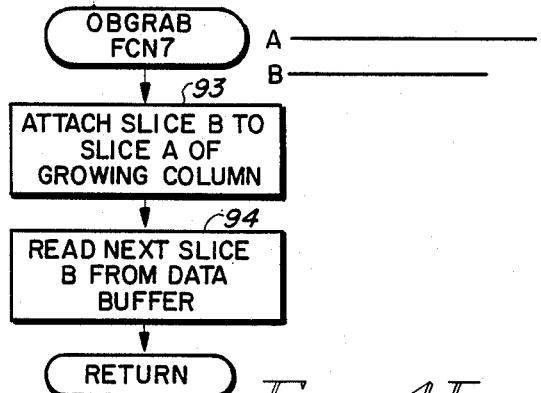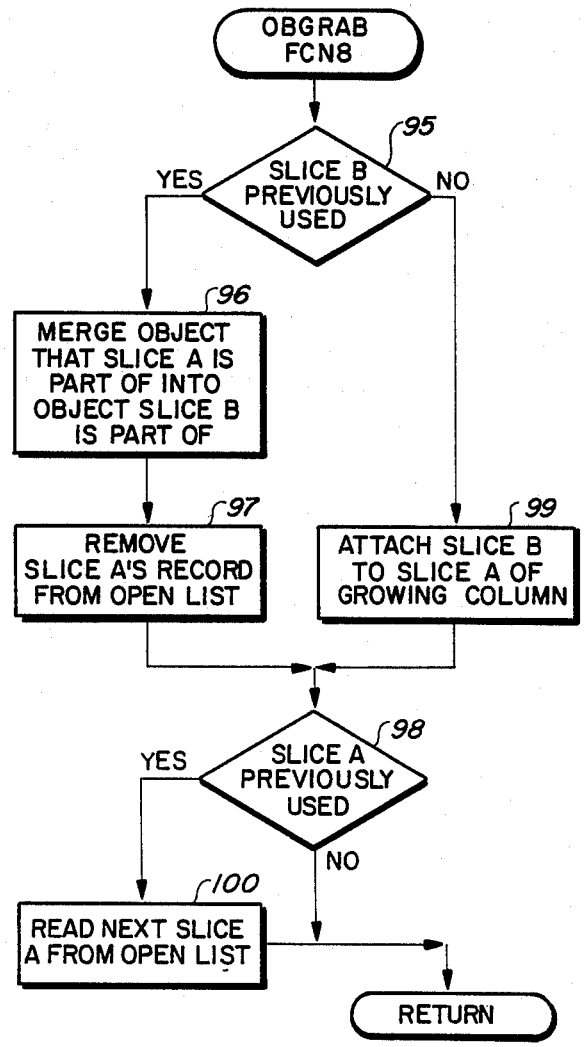

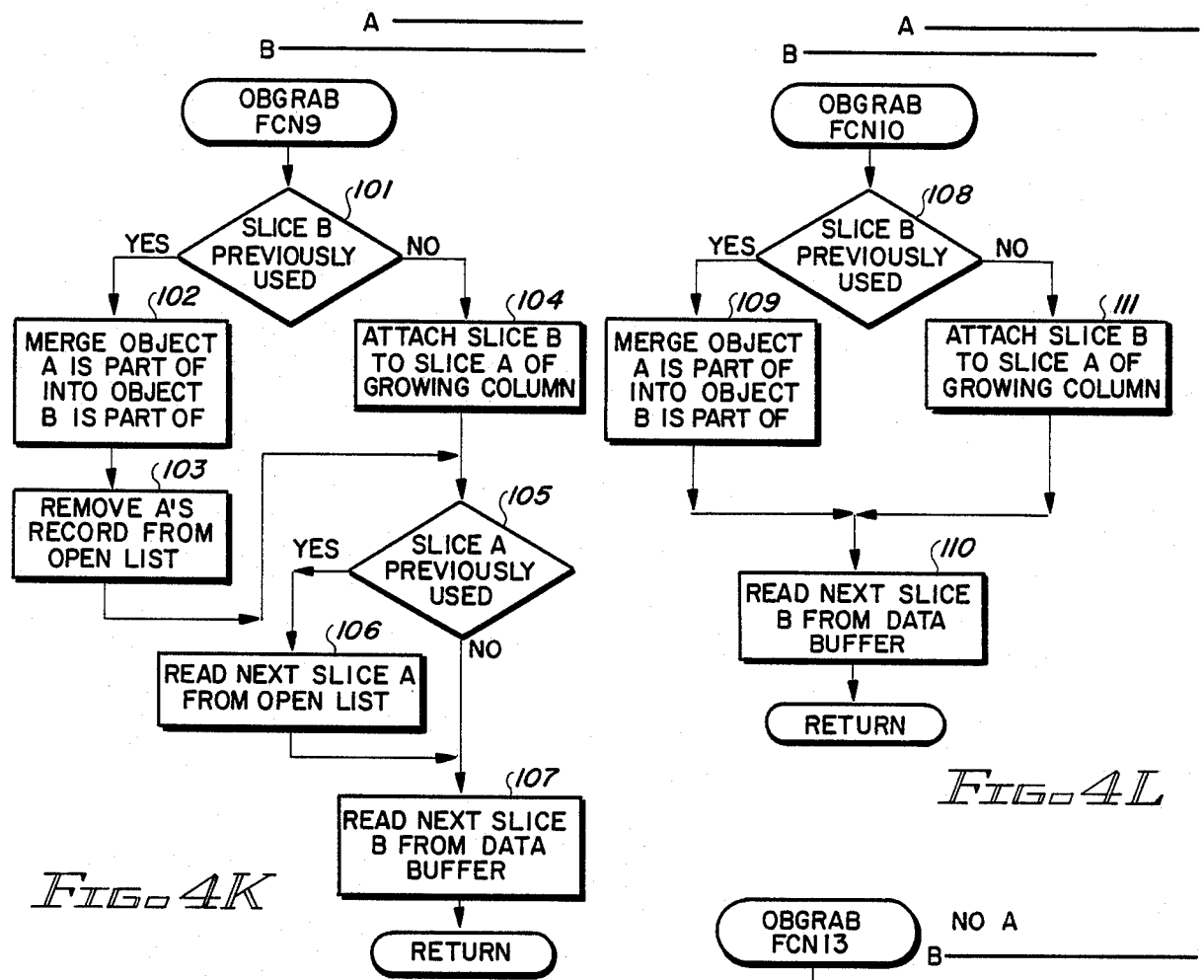
Fig. 4K
Fig. 4L
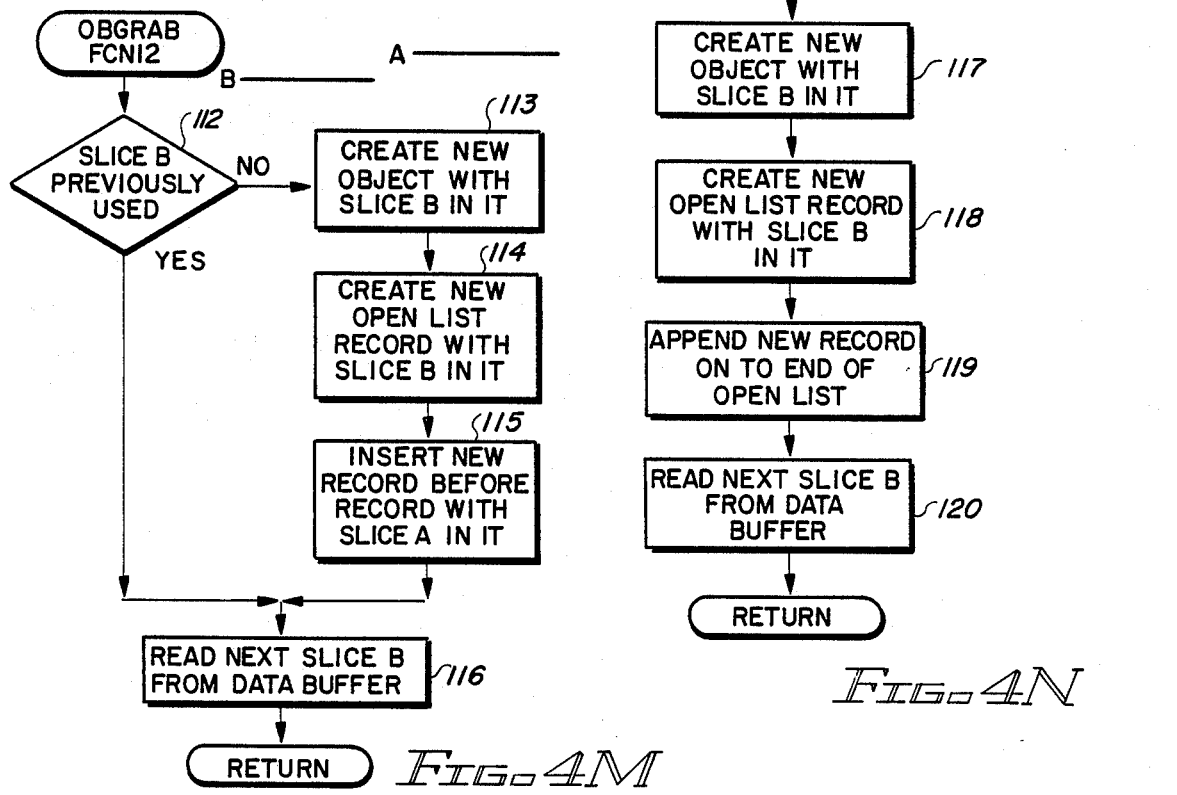
Fig. 4M
Fig. 4N

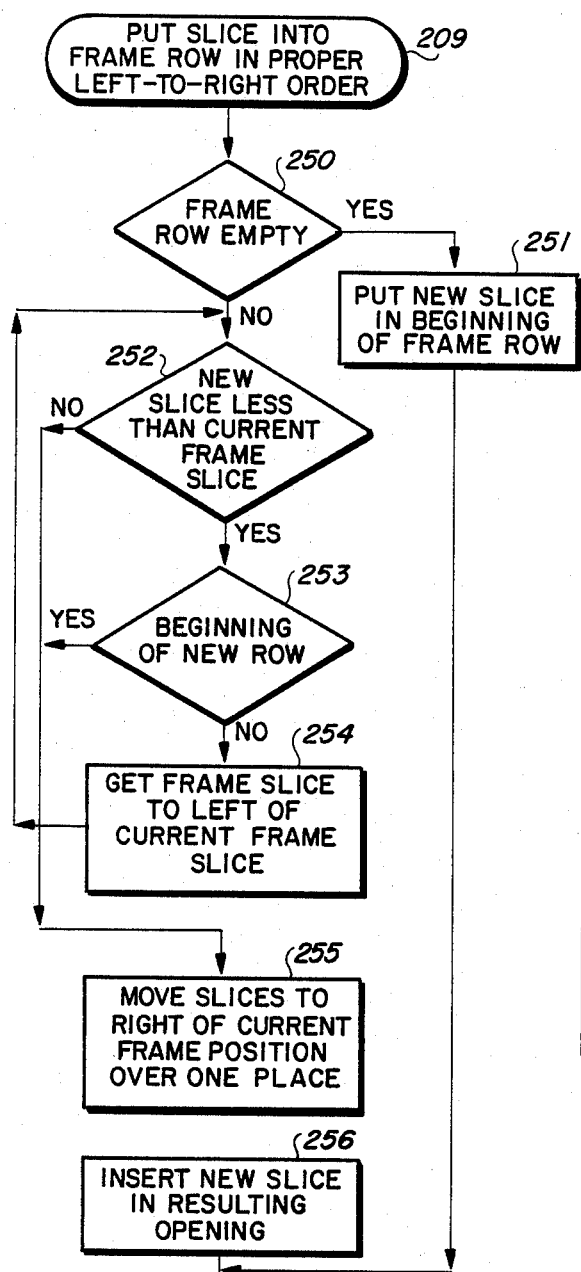
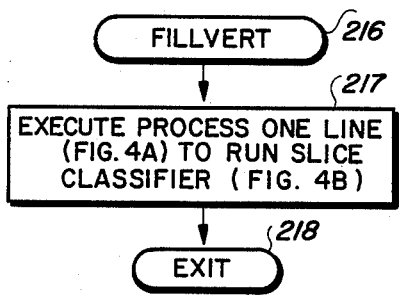
FIG-7A
FIG-8
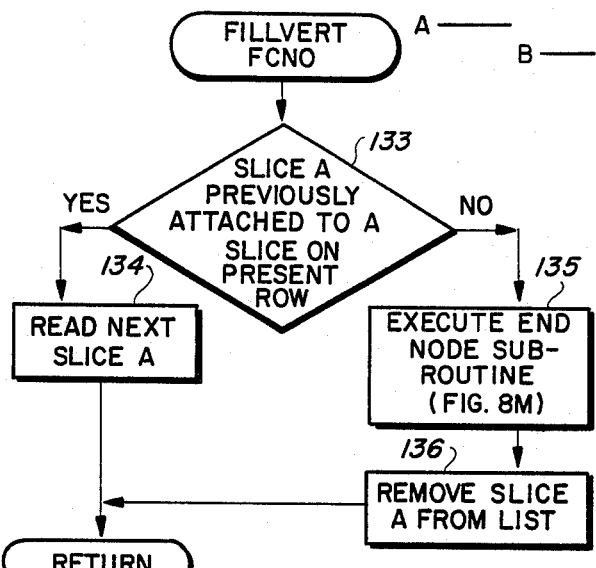
FIG-8A
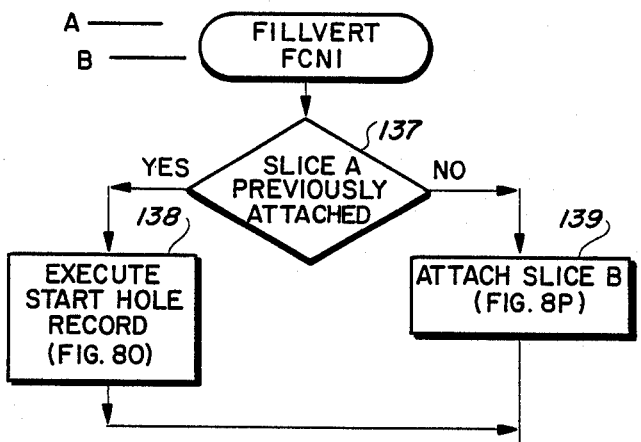
FIG-8B
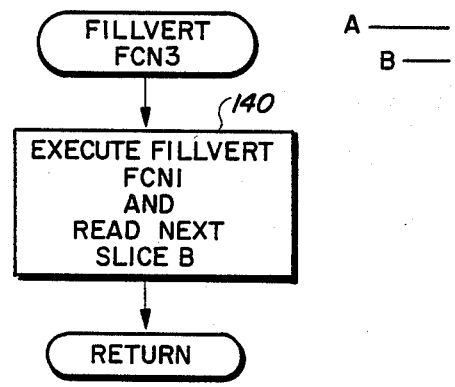
FIG-8C

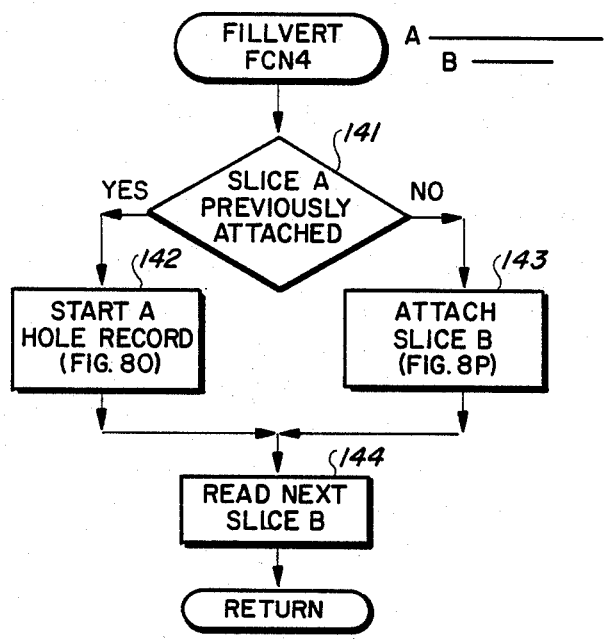
FIG._8D
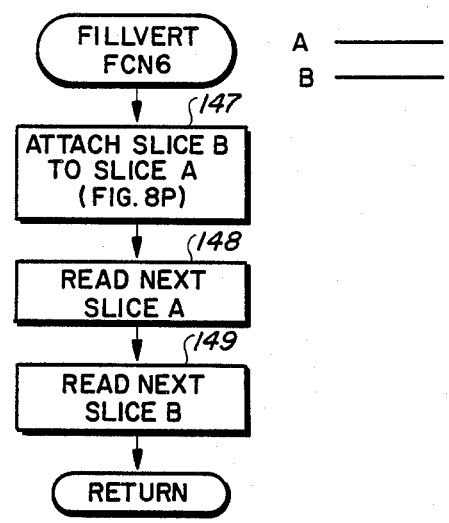
FIG._8F
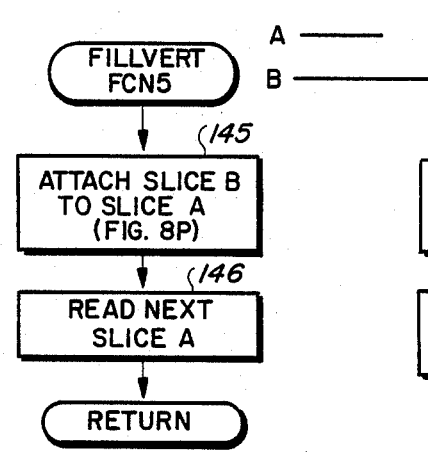
FIG._8E
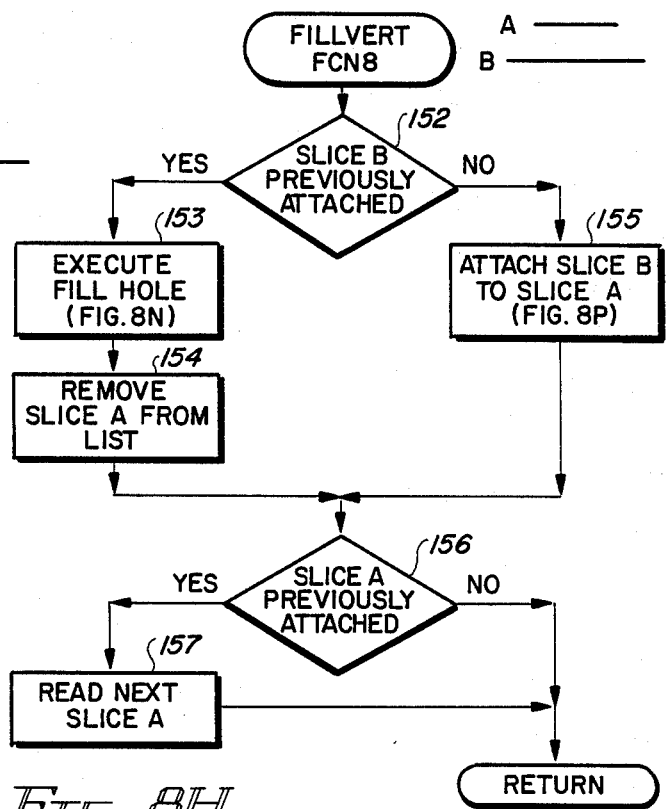
FIG._8H
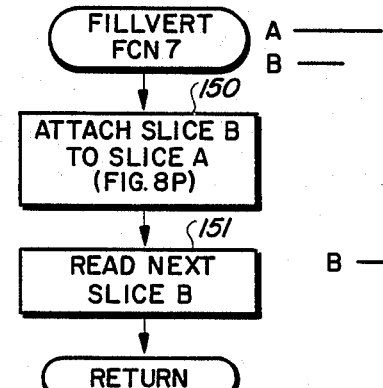
FIG._8G
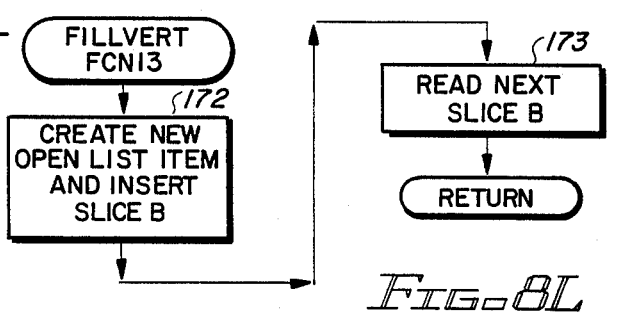
FIG._8I

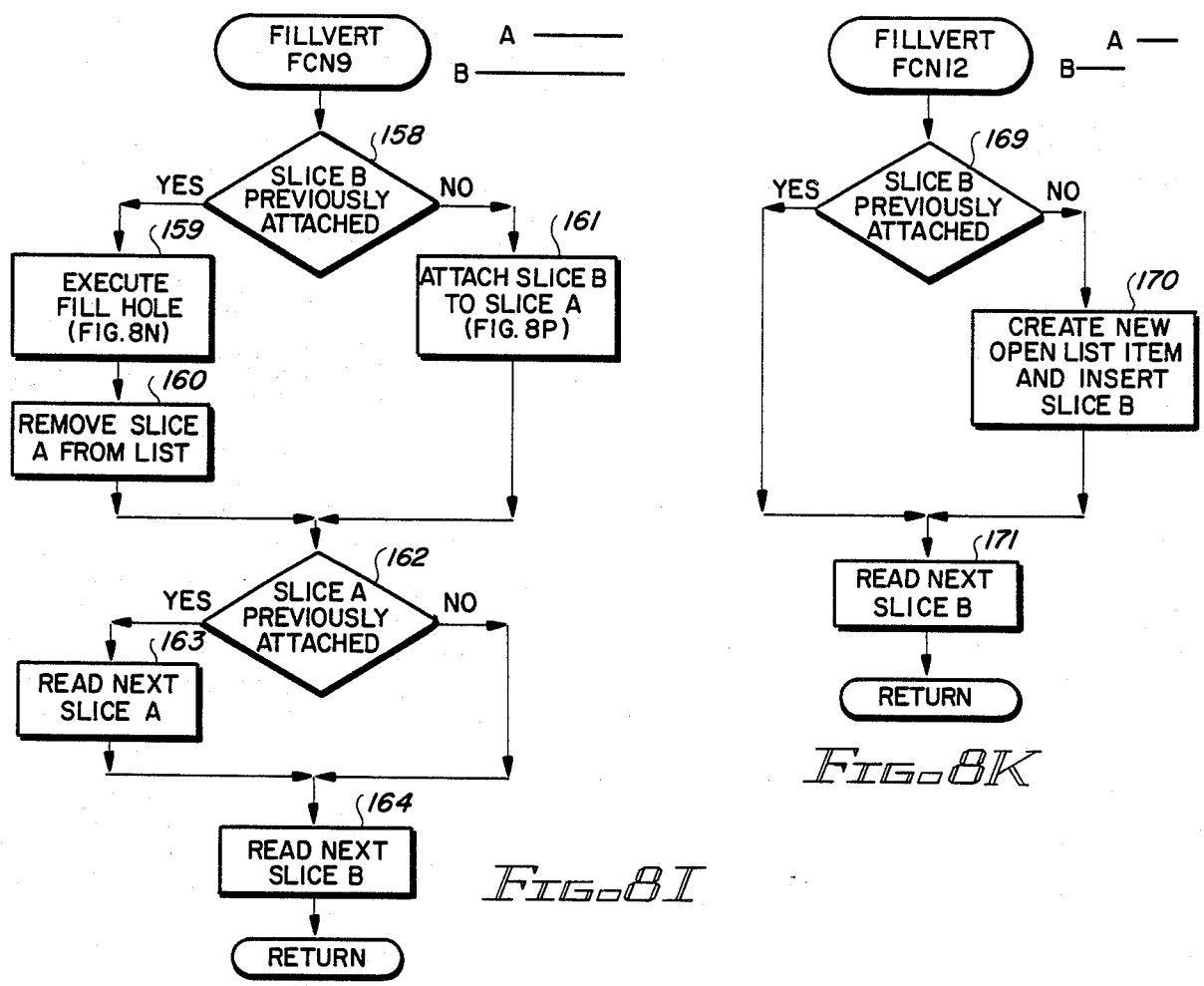
FIG. 8I
FIG. 8K
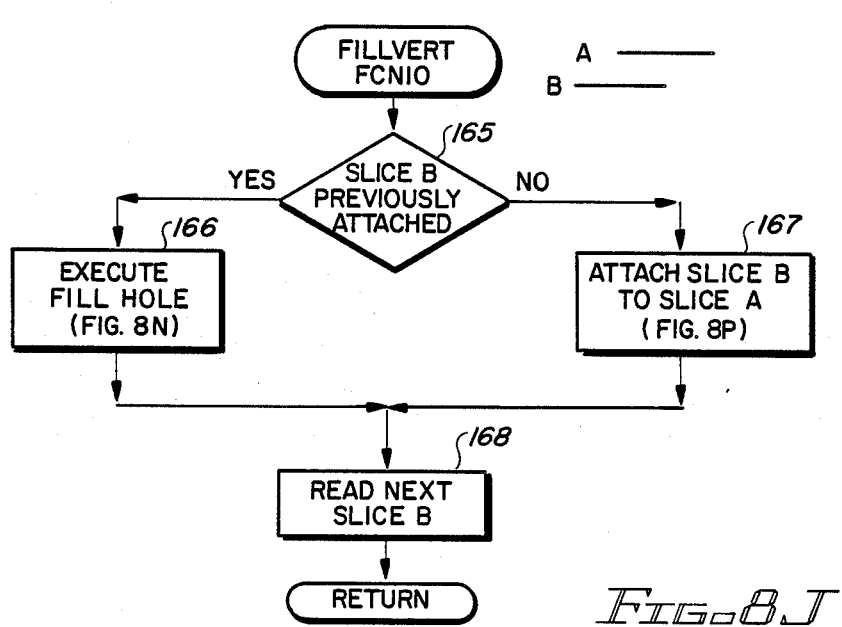
FIG. 8J

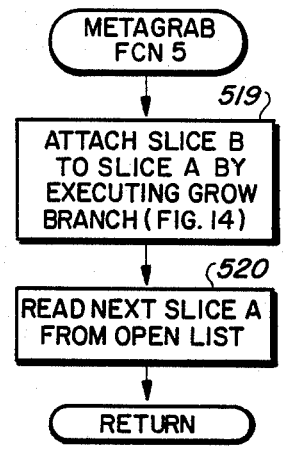
FIG. 9E
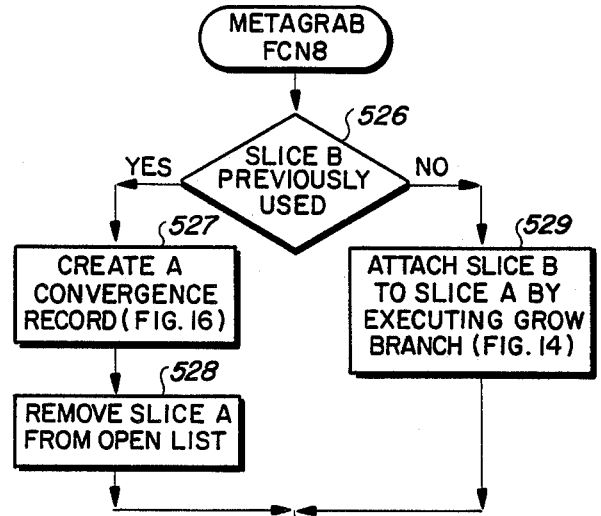
FIG. 9H
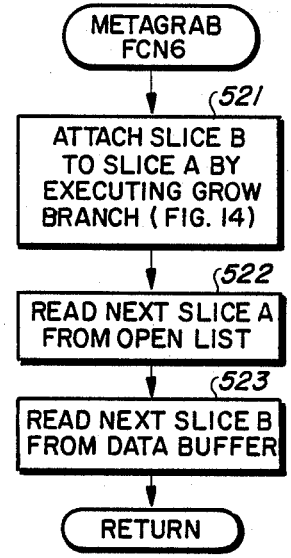
FIG. 9F
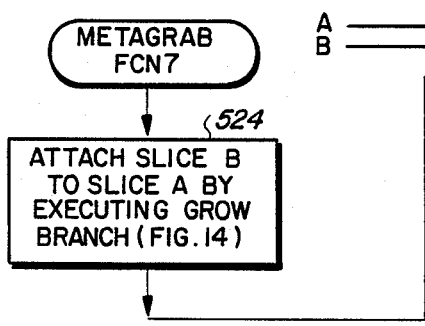
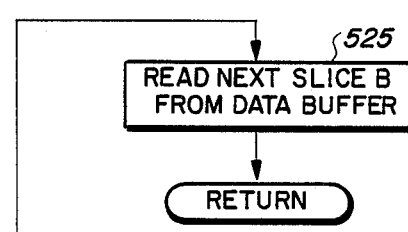
FIG. 9G

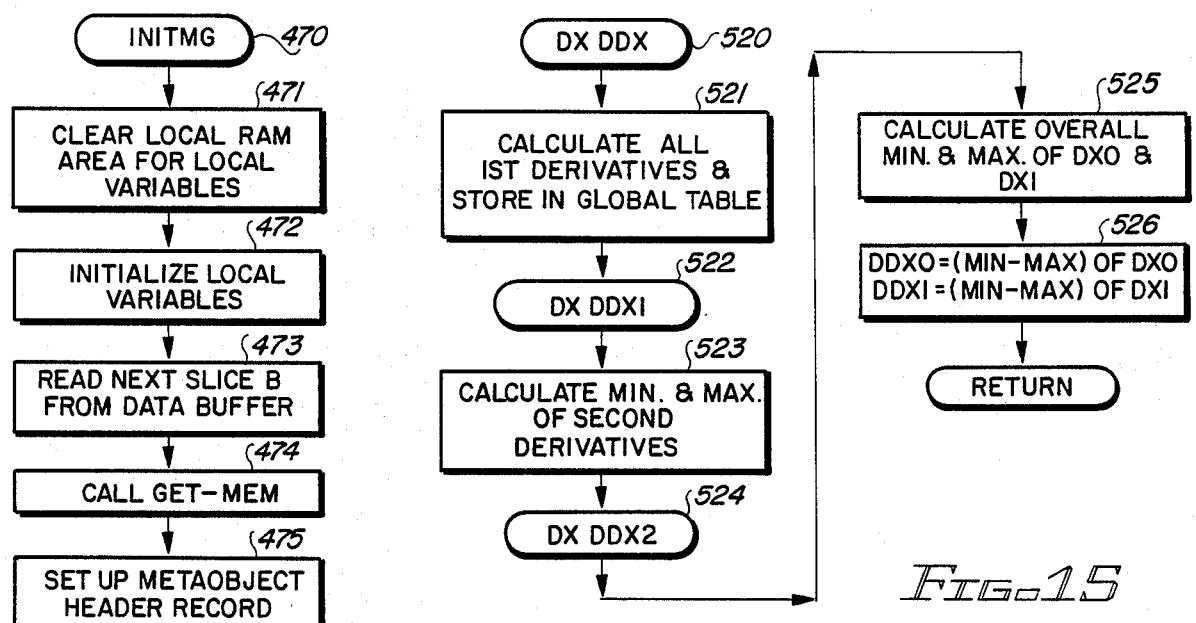
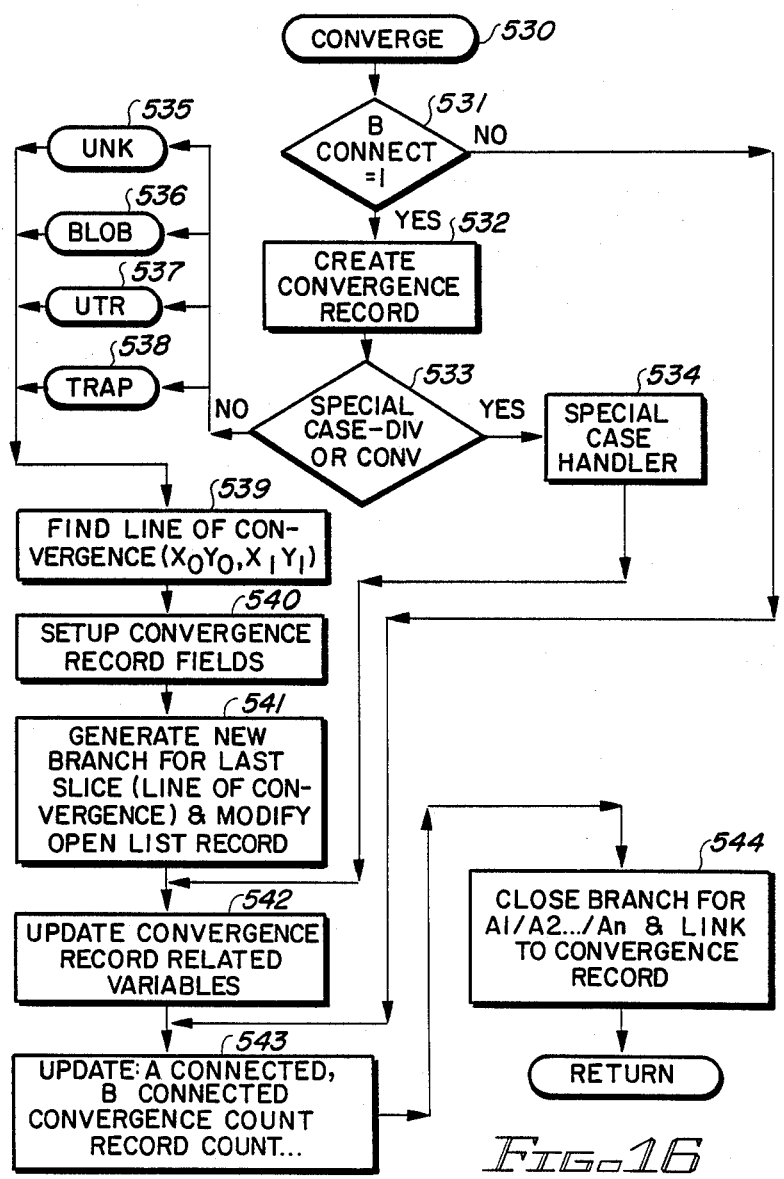

METHOD AND APPARATUS FOR SIMPLIFYING RUNLENGTH DATA FROM SCANNING OF IMAGES

CROSS-REFERENCE TO RELATED APPLICATIONS

The invention is related to the co-pending application "APPARATUS AND METHOD FOR VECTORIZATION OF INCOMING SCANNED IMAGE DATA", by Yih-Liang Lien, and the co-pending application "HIGH SPEED SERIAL PIXEL NEIGHBORHOOD PROCESSOR AND METHOD", by David M. Krich, both assigned to the present assignee, both filed on even date herewith, and both incorporated herein by reference.

BACKGROUND OF THE INVENTION

The invention relates to methods and apparatus for simplifying data obtained by line-by-line electronic scanning of graphic images and the like, and more particularly to apparatus and methods for compacting the scanned pixel data and assembling it into a format that can be utilized for subsequent vectorization and/or character recognition operations with a minimum number of memory access operations to fetch data that is to be vectorized and/or subjected to character recognition operations.

Many techniques have been used for operating upon scanned image data, i.e., pixel data. Most techniques in common use include storing all of the pixels in the form of pixel codes that represent the darkness of color of a scanned point, each pixel code being stored in a memory location that corresponds to the location of the scanned point that produced that pixel code. Such techniques require a very large amount of memory to store all of the pixel codes representing an entire scanned document. To reduce the amount of memory required and the number of memory-intensive pixel manipuations required, various vectorization techniques have been developed, including so-called "line thinning" and "boundary tracing" vectorization techniques. Most, if not all, of these techniques have required extensive pixel manipulation, and hence have been slower than desirable and have required larger amounts of memory than desirable. Substantial loss of accuracy in the ultimately reproduced image also has been a major shortcoming of prior vectorization techniques. One prior art reference, "The Line Recognition of the Handwritten Schematics by Using Run-Length Information Only", by M. Okamoto and H. Okamoto, Faculty of Engineering, Shinshu University, Japan, describes a technique for line recognition of handwritten schematics wherein scanning of consecutive lines produces runlength data that is merged into "blocks" if certain connectivity conditions and other conditions are satisfied. The amount of direct pixel manipulation thereby is reduced. Simple breaks or insignificant gaps between pixels are eliminated.

In the Okamoto article, the images scanned are not operated upon from a "global" perspective. That is, the total image seen by a viewer is not simulated in its entirety. Instead, the image is fragmented into a large number of blocks or trapezoids which then are subjected to hundreds of "special case" rules which are applied in attempts to synthesize the trapezoids or pieces into vector data that represent the original objects in the scanned image. The vectorized data produced by this approach does not accurately preserve the topography of many shapes of scanned images, although it greatly reduces the amount of bit manipulation and memory required by most prior techniques for line-by-line scanning of graphic images.

There remains an unfulfilled need for an improved technique for greatly compacting scanned pixel data into linked lists that accurately represent scanned images and can be utilized for subsequent operations without extensive bit manipulation to locate image data in memory. The needed improved technique must be fast, accurate, and inexpensive, because systems utilizing most of the prior techniques are too expensive (costing more than $100,000.00), too slow, requiring an hour or more to vectorize or digitize a single page-sized complex drawing, and/or are inaccurate in that hours of human editing may be required to fix the inaccuracies resulting from the vectorization/digitizing techniques.

SUMMARY OF THE INVENTION

Accordingly, it is an object of the invention to provide an improved method and apparatus for receiving scanned pixel data and producing linked lists representing scanned image data in greatly simplified form.

It is another object of the invention to provide such linked lists which can more accurately represent scanned images and present data representative thereof in a format that can be utilized for subsequent processing without excessively "memory intensive" bit manipulation.

It is another object of the invention to provide an improved apparatus and method for vectorization and character recognition of scanned image data which can be implemented in a practical manner using a commercially available desk computer, such as an IBM PCAT.

It is another object of the invention to provide an apparatus and method for processing scanned graphic data much more accurately and inexpensively than has been accomplished by the closest prior art.

Briefly described, and in accordance with one embodiment thereof, the invention provides serial runlength data obtained by scanning an image includes "slices" that each include the length and an ending pixel number of a successive string of connected black pixels. The runlength data is operated upon, line-by-line, by a first decision tree slice classifier that creates a software "object" including a first linked list of a plurality of further linked lists each of which contains all of the slices of a simple shape of the image. This is accomplished by creating a first open list and inserting slices of a first row of the image therein. Then, slices in the last row of slices inserted into the first open list and slices in the next row of the image are operated on by means of the first slice classifier, which attaches slices of the next row of the image to slices of the last row in the first open list to grow branches of the first open list, create new branches of the first open list and insert slices of the next row of the image into the new branches, or terminate growing branches of the first open list in accordance with the relationship between individual slices in the last row of the open list and slices in the next row of the image. The slices of the object are entered into a "frame" in the same left-to-right order in which they are scanned, and are "filtered" to eliminate insignificant horizontal and vertical gaps between slices. Insignificant horizontal gaps are eliminated by extending slices across such gaps to include slices on the opposite side thereof. Insignificant vertical gaps are eliminated by executing a second slice classifier that builds a second open list, columns of which create divergences that may converge to form insignificant vertical gaps. If this occurs, corresponding slices on one side of the vertical gap are extended across it to include corresponding slices on the opposite side of the vertical gap. To greatly simplify the data required to represent certain "well behaved" images, a third open list is created and slices from a first row of the second open list are inserted therein. Slices in the last row inserted into the third open list and slices in the next row of the second open list are operated upon by means of a third slice classifier which is essentially similar to the first and second slice classifiers, to thereby grow branches of the third open list, create new branches thereof, and insert slices of the next row of the second open list therein, or terminate growing branches of the third open list in accordance with the relationships between individual slices of the last row inserted in the third open list and the individual slices of the next row of the second open list. The slopes of edges of the branches of the third open list are tested for linearity to determine which shapes can be represented as trapezoids that can be represented by four corner points and which must be represented as irregular blobs containing all of their slices. Portions of branches of the third open list that can be classified as trapezoids have their four corner points entered into trapezoid records that are linked by address pointers to other adjacent trapezoid records and "blob records". Portions of branches which cannot be represented as trapezoids are represented as blobs, all slices of which are entered into blob records that are linked by address pointers to adjacent blob records or trapezoid records associated with the third open list. Records identifying convergences and divergences are stored and linked by address pointers to records of adjacent blobs and trapezoids associated with the third open list.

BRIEF DESCRIPTION OF THE DRAWINGS

FIG. 4A is a flow chart of a subroutine called PROCESS ONE LINE that is called by the OBGRAB subroutine of FIG. 4.

FIGS. 4C-4N are flow diagrams of function subroutines called by the basic classifier subroutine of FIG. 4 when it is used by OBGRAB to build objects from raw runlength slices.

FIG. 7A is a flow chart of a subroutine corresponding to block 209 of FIG. 7, for effectuating correct left-to-right placement of slices filled by the subroutine of FIG. 7.

FIGS. 9A-9L are flow charts of classifier function subroutines called by the classifier subroutine executed during the METAGRAB routine of FIG. 9.

FIG. 13 is the flow chart of a subroutine called INITMG executed by the METAGRAB routine of FIG. 9.

FIG. 15 is the flow chart of a subroutine called DX DDX executed by the METAGRAB routine of FIG. 9.

FIG. 16 is the flow chart of a subroutine called CONVERGE executed by the METAGRAB routine of FIG. 9.

DESCRIPTION OF THE INVENTION

Figure 1:
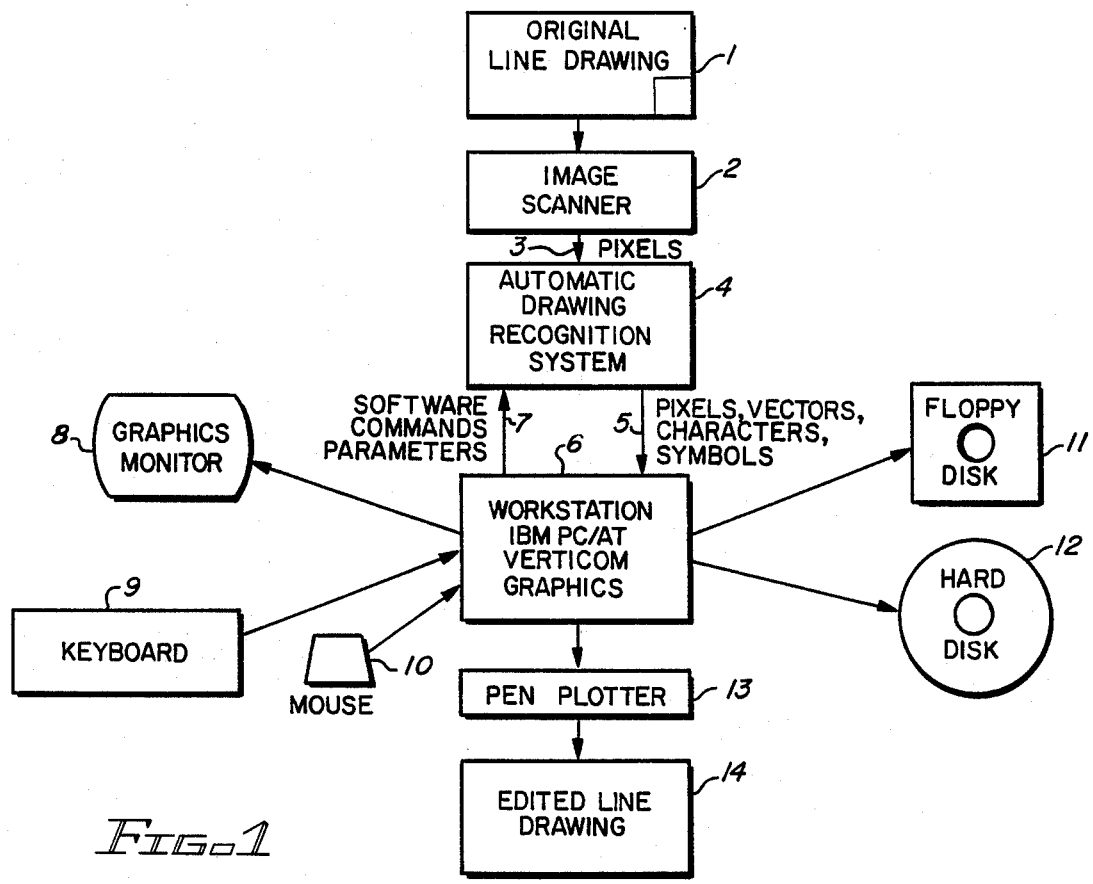
FIG. 1 is a flow diagram of an automatic drawing recognition system in which the present invention is utilized.

In FIG. 1, a system is illustrated in which an original line drawing 1, typically an engineering drawing or the like, is scanned by a suitable image scanner 2. (Various image scanners are commercially available.) Image scanner 2 outputs serial pixel data 3 into an "automatic drawing recognition system" 4 that, in accordance with the present invention, simplifies the pixel data as subsequently described and produces, as necessary, pixels, vectors representing groups of pixels, recognized characters, and symbols, as indicated by arrow 5, to a "work station" including an IBM PCAT desktop computer containing VERTICOM graphics boards, a high resolution graphics monitor 8, a keyboard 9, a mouse 10, a floppy disk 11, and a hard disk 12.

Operating software commands and input parameters entered via keyboard 9 or mouse 10 are applied by work station 6 to the automatic drawing recognition system 4. Data representing the original line drawing 1, after simplification by the automatic drawing recognition system 4, is stored by the work station computer 6 on hard disk 12 The drawing can be edited in response to work station commands 7, modifying pixels, vectors, characters, and symbols 5, and the edited drawing then can be stored on hard disk 11.

Upon appropriate command, an edited line drawing 14 can be plotted by a conventional pen plotter 13, or displayed on graphics monitor 8.

Figure 2B:
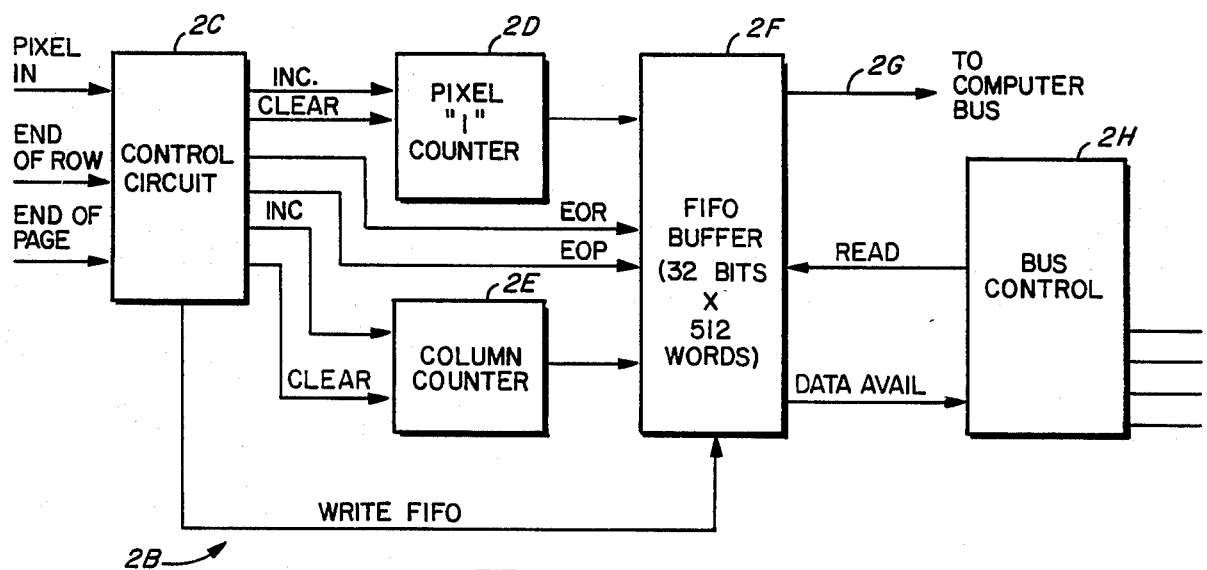
FIG. 2B is a block diagram of a runlength encoder indicated in block 2B of FIG. 2.
Figure 2:
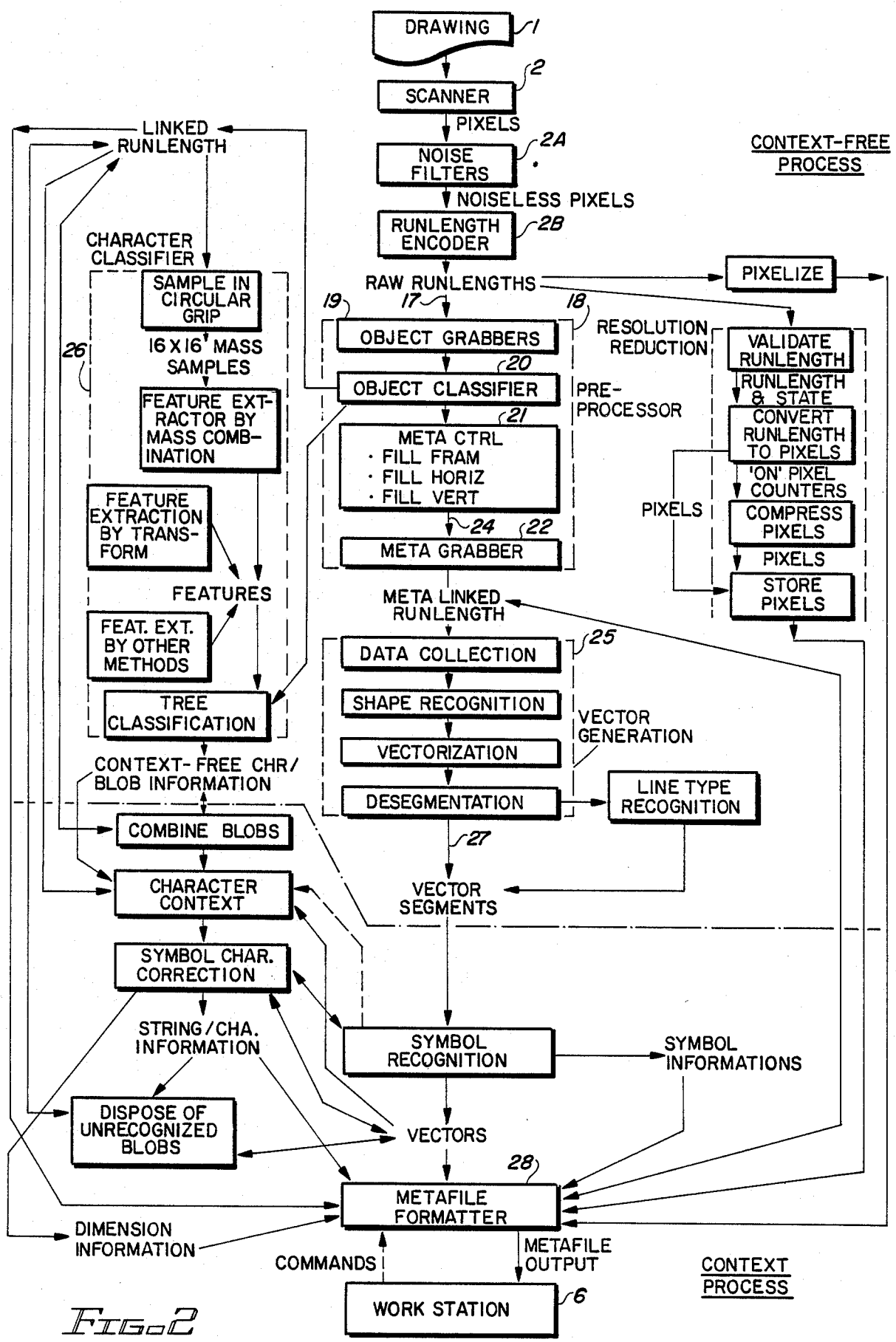
FIG. 2 is another flow diagram illustrating in more detail both hardware and software sections of the automatic drawing capture system of FIG. 1.

FIG. 2 shows the general data flow through the system of FIG. 1; where appropriate, similar reference numerals are used. FIG. 2 shows that pixels produced by scanner 2 are filtered prior to being fed into a runlength encoder 2B.

Runlength encoder 2B, shown in FIG. 2B, is a relatively simple circuit that receives a "pixels in" signal, an end of row (EOR) signal, and an end of page (EOP) signal from scanner 2, with some noise being filtered by noise filters. These signals are fed into a control circuit 2C that generates an "increment" signal and a "clear" signal that are applied to a pixel counter 2D that is incremented each time a new non-zero pixel code is received. The control circuit 2C also generates an "increment" signal and a "clear" signal that are applied to a column counter circuit 2E which is incremented every time a new pixel input signal is received. The clear input signal to the pixel counter resets it every time there is a transition from a string of connected "black" or non-zero pixels to a "white" pixel, at which time the contents of the pixel counter are written into a FIFO (first in, first out) buffer 2F of 32 bits by 512 words. Thus, the pixel counter 2D always stores the length of the present string or slice of dark pixels resulting from scanning of an object on the document. The column counter clear signal is generated at the end of every row in response to the EOR signal. A "write" signal causes the contents of both the pixel counter 2D and the column counter 2E to be written into FIFO buffer 2F every time an end of a slice occurs or the end of a row occurs. A bus control circuit 2H notifies a computer that data is available in the FIFO buffer after the first entry, i.e., at the end of the first slice, and at this point, software in accordance with the present invention starts reading the contents of the FIFO buffer into its own RAM (random access memory) storage via bus 2G.

The output of the runlength encoder 2B, i.e., the 32 bit words read from the above-mentioned FIFO buffer, are designated by reference numeral 17 in FIG. 2. Each raw runlength is hereinafter referred to as a "slice", representing a black (or dark colored) string of "connected" (i.e., no gaps therebetween) horizontal pixels. In accordance with the present invention, the raw runlength data is operated upon on a real-time basis by an "object grabber" program 19 called OBGRAB. OBGRAB assembles the raw slices into a linked list of linked lists, hereinafter referred to as an "object" and subsequently explained with reference to FIG. 6. An "object" is a body of connected dark pixels completely surrounded by white (i.e., transparent) pixels, and consists of a group of connected "shapes", each of which is represented by one of the linked lists.

The object classifier 18 determines if the present object is to be fed into a character recognition system generally designated by reference numeral 26 or into a vectorization program 25, described in the above-referenced co-pending application by Yih-Liang Lien.

Ultimately, the information representing recognized characters or vector segments designated in FIG. 2 by reference numeral 27 generated by the vectorization program 25 is fed into a formatted file that is passed by a routine called a "metafile formatter" 28 into the work station 6.

Figure 3:
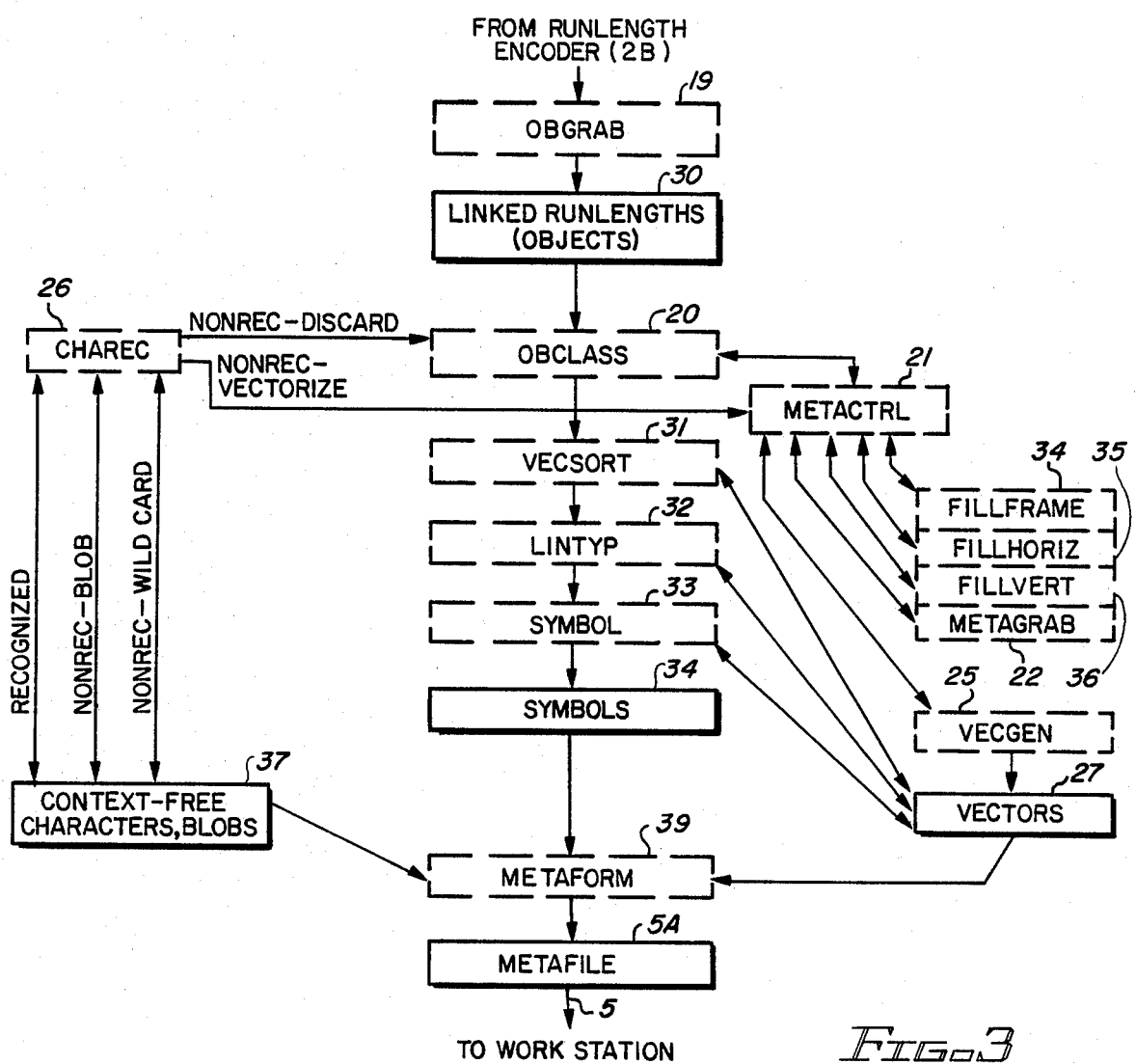
FIG. 3 is a flow chart illustrating certain subroutines and files created by the system shown in FIG. 2.

Referring now to FIG. 3, it should be noted that the dotted line blocks represent routines and subroutines, and the solid line blocks represent software files created by the routines. A program called OBGRAB is the above-mentioned "object grabber" routine 19 of FIG. 2. OBGRAB operates on raw runlength data in the form of 32 bit words read from the above mentioned FIFO memory 2F (FIG. 2B), each representing the number of pixels in a slice and the "pixel number" or "column number" of the last pixel of that slice. The OBGRAB routine 19 generates or builds the above-mentioned "objects", which each constitute a linked list of linked lists, each of the latter group of linked lists containing all of the pixels in a single "shape" or "branch" of the object. An object classifier subroutine 20 called OBJCLASS in FIG. 3 determines if the present object is a "character", such as a printed letter, that can be conveniently operated upon by a character recognition program 26 called CHAREC, or is of the nature of a diagram, such as a circuit schematic or a mechanical drawing, in which case the present object is operated upon by a program 21 called METACTRL.

In accordance with the present invention, the program METACTRL coordinates the operation of four subroutines 34, 35, 36 and 22 called FILLFRAME, FILLHORIZ, FILLVERT, and METAGRAB, respectively. It will be shown that use of these programs greatly reduces the amount of data required to accurately represent a typical engineering drawing, by filling minute horizontal and vertical gaps between nearby slices, reconstructing the object 30 produced by OBGRAB subroutine 19 from the simplified data by creating what those skilled in the art will recognize as a "directed graph" of the boundary of the object composed of blob records, trapezoid records, convergence records, and divergence records, all subsequently explained. The directed graph can be conveniently used by the VECGEN vector generation program 25 described in the above-referenced co-pending Louis Lien application.

The vectors produced by VECGEN are stored in a vector file 27, and then are operated on by a program 39 called METAFORM to perform the function of putting data representing characters, blobs, symbols, and vectors into a suitable format for storage in a file 5A called METAFILE, from which that data is output to work station 6, as indicated by arrow 5.

The OBGRAB program routine 19 of FIG. 3 receives raw runlength data or slices from the above-mentioned FIFO buffer 2F (FIG. 2B), creates an "open list header" consisting of a plurality of "open list nodes", each representing or storing a single "A" slice in the first or present scanned line. The OBGRAB routine then receives the "B slices" of the second scanned line and compares each "B slice" with "A slices" of appropriate open list nodes to determine if the "B slices" of the second scan line can be "attached" to "A slices" of the various open list nodes, and if any new open list nodes need to be created, and if any present open list nodes need to be eliminated.

Figure 4:
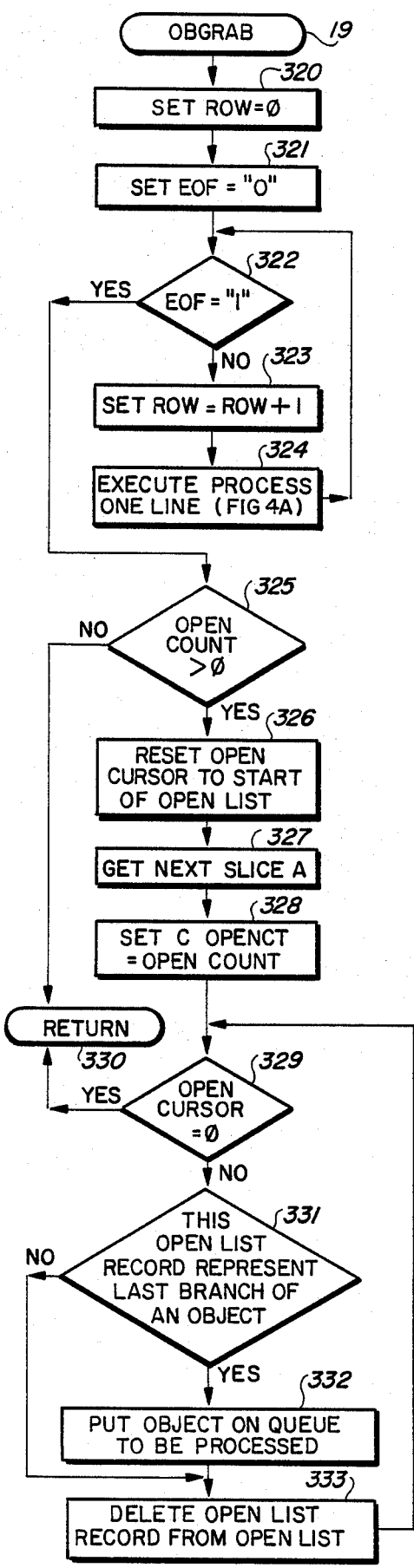
FIG. 4 is a flow chart of the "object builder" routine, called OBGRAB.

The subroutine OBGRAB shown in block 19 of FIG. 3 thereby creates a linked list of linked lists (shown in FIG. 6) that contains all of the slices contained in the raw runlength data, organized in a fashion that may or may not correspond "geometrically" to the boundaries of the image scanned on the input document. FIG. 4 shows the OBGRAB routine that performs this function. OBGRAB calls the PROCESS ONE LINE subroutine of FIG. 4A, which in turn calls the CLASSIFIER subroutine of FIG. 4B, which in turn calls the OBGRAB FCN subroutines of FIGS. 4C-4N.

Those skilled in the computer science art will recognize that when data structures such as linked lists are constructed, it is a routine and necessary matter to insert and delete elements of the lists by manipulatin address pointers. It is assumed herein that the necessary address pointers are added to and deleted from the described lists, but the details are not provided, as they can be easily provided by those skilled in the computer science art.

Referring now to FIG. 4, the OBGRAB routine is entered at label 19 and goes to block 320 and sets a variable ROW equal to 0, and then goes to block 321 and sets an "end of file" or "end of object" variable EOF equal to a logical "0", representing a "false condition". Next, OBGRAB goes to decision block 322 and tests EOF to determine if it is a logical "1" representing a "true" condition. As long the determination is negative, the subroutine increments ROW in block 323, executes PROCESS ONE LINE (subsequently described) with reference to FIG. 4A, as indicated in block 324, and returns to decision block 322. This continues until OBGRAB gets to the end of the image being scanned on the input document, at which time an affirmative decision is obtained in block 322, and OBGRAB goes to decision block 325 and tests a variable OPEN COUNT. OPEN COUNT represents the number of nodes on the open list (which is assumed to have been created in initializing OBGRAB), wherein a number of open list nodes are established to provide starting points from which lists representing legs or branches of the image can grow as contiguous slices are attached, is greater than 0.

If the determination of block 325 is negative, OBGRAB returns to the calling program. Otherwise, the routine goes to block 326 and resets a cursor variable OPEN CURSOR to the beginning of the open list to which slices received from the runlength encoder of FIG. 2A are attached. The variable OPEN CURSOR keeps track of where OBGRAB is in the open list. OBGRAB next goes to block 327 and obtains the next slice A from the open list, and sets a variable C OPENCT equal to OPEN COUNT. As OBGRAB passes through the open list, a variable called C OPENCT (which indicates when the end of the open list is reached) is decremented from its initial value down to 0. Next, OBGRAB goes to decision block 329 and tests OPEN CURSOR to see if it has been decremented to 0 yet. If the answer is affirmative, OBGRAB returns to the calling program, but otherwise goes to decision block 331 and determines if the present open list record represents the last branch of an object being built by OBGRAB. If this determination is negative, OBGRAB goes to block 333, deletes the present open list record from the open list, and returns to decision block 329. If the determination of block 331 is affirmative, the routine puts the object on a queue for further processing by the character recognition system or by the subsequently described METACTRL subroutine.

Figure 4C:
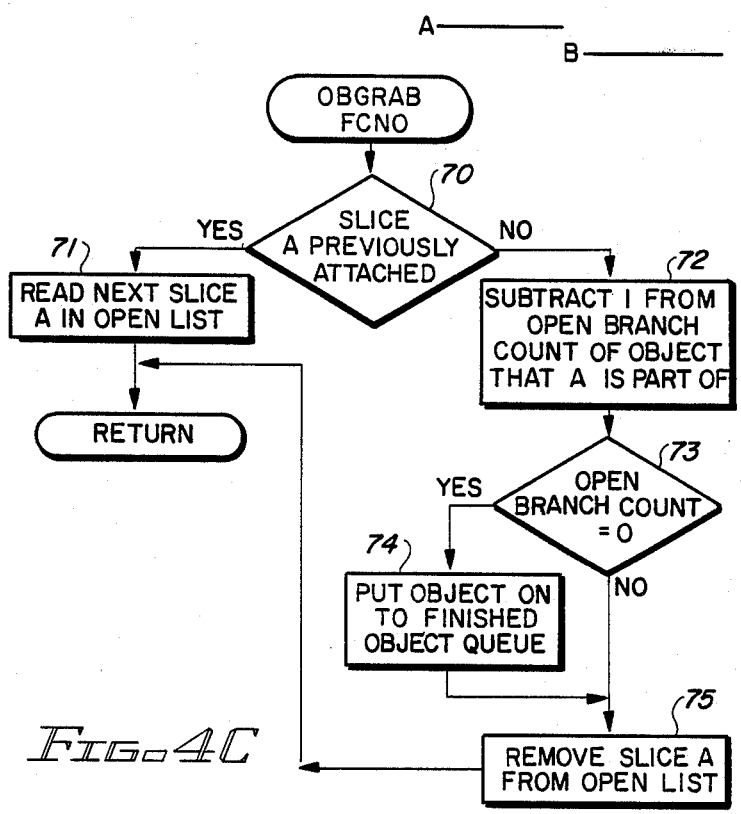
Figure 4D:
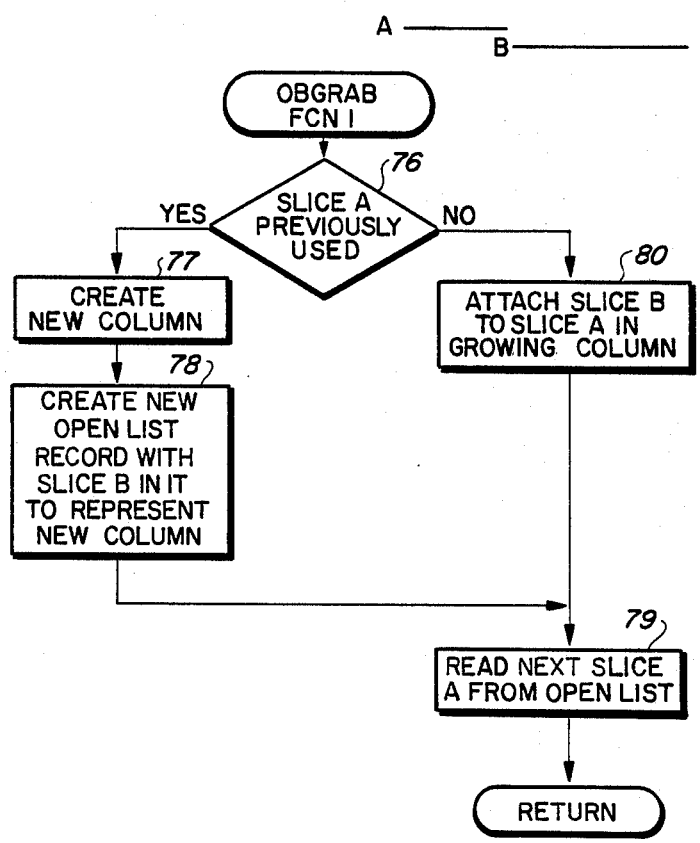
Figure 4B:
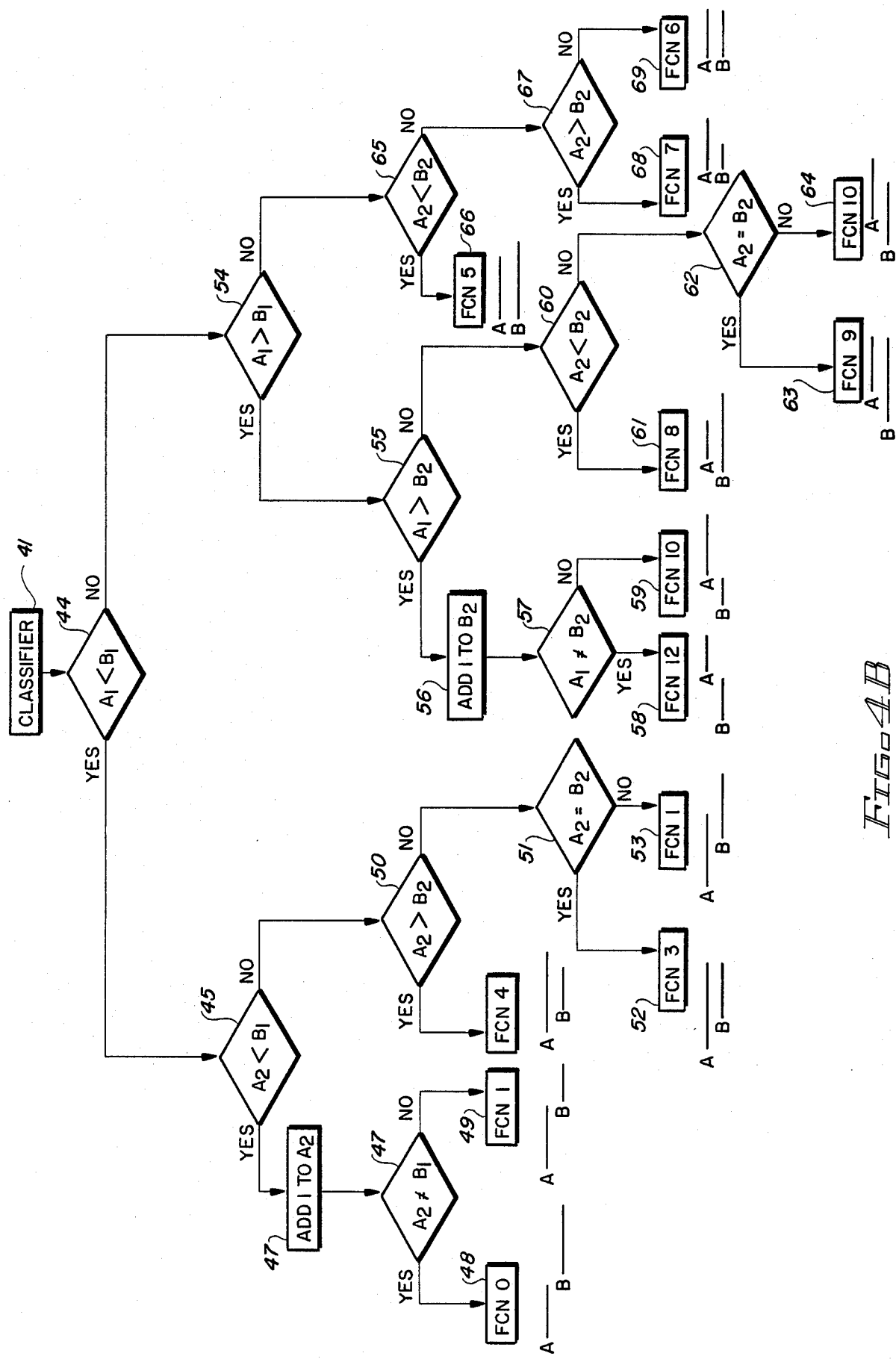
FIG. 4B is a diagram of a substrate called a slice classifier subroutine called CLASSIFIER that is called by the PROCESS ONE LINE subroutine of FIG. 4A.

In order to classify the incoming slices and thereby determine how the linked lists should be built, the OBGRAB routine calls the "classifier routine" of FIG. 4B, called CLASSIFIER. Before describing the CLASSIFIER, it will be necessary to understand that what the classifier routine does is compare two slices, referred to as an "A slice" and a "B slice".

Figure 5:
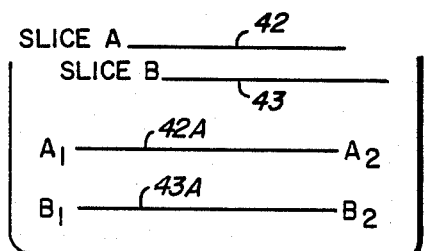
FIG. 5 is a diagram useful in explaining the operation of the slice classifier subroutine of FIG. 4.

Referring momentarily to FIG. 5, reference numeral 42 designates a generalized "A slice" and reference numeral 43 designates a generalized "B slice". The A slice always is read from an open list node of an open list, which begins with an open list header. The B slice is always received from an input buffer, such as the FIFO memory 2F. The left-hand end point of the A slice is called A1, and the right-hand end point is called A2. The left-hand end point of the B slice is called B1 and the right-hand end is called B2, as indicated by reference numerals 42A and 43A in FIG. 5. It can be seen that there are numerous possibilities for the relationship between slice A and slice B. For example, their left ends can be overlapping or nonoverlapping. Their right ends can be overlapping or nonoverlapping. The length of A1 can be equal to, greater than, or less than the length of B1, and the length of A2 can be equal to, greater than, or less than the length of B2.

The CLASSIFIER subroutine of FIG. 4B analyzes the present A slice and B slice and determines which of the possible relationships exist, and accordingly calls one of a number of different subroutines to determine whether to add slice B to the open list node from which slice A was read, and thereby continue the growth of a "branch" of the list of linked lists (i.e., the "object"), or terminate a branch to which the present slice A is connected, or create or delete an open list node. The execution of the CLASSIFIER subroutine always results in calling of one of a group of "function subroutines" called FCN0, FCN1, FCN3, FCN4, FCN5, FCN6, FCN7, FCN8, FCN9, FCN10, or FCN12, depending upon the identified relationship between the A and B slices.

If the CLASSIFIER routine of FIG. 4B "runs out" of A slices and one or more B slices remain, FCN13 is called to append one or more new open list nodes to the open list header of OBGRAB (one for each remaining B slice of the present scanned line from the FIFO buffer 2F).

It must be recognized that the CLASSIFIER routine of FIG. 4B can be called by three different routines of the present invention, including the OBGRAB routine 19, the FILLVERT routine 36, and the METAGRAB routine 20. For each of these three routines, each function subroutine (such as FCN0, FCN1, etc) that is called may be different depending on which routine is calling CLASSIFIER. If the CLASSIFIER routine is called by the OBGRAB routine 19, then the FCN0, FCN1, etc., of the OBGRAB FCN subroutines of FIGS. 4C-4N are called. If the CLASSIFIER routine is called by the FILLVERT routine 36, then the FILLVERT FCN subroutines of FIGS. 8A-8L are called. If the CLASSIFIER subroutine is called by the METAGRAB routine 22, then the METAGRAB FCN subroutines of FIGS. 9A-9L are called.

Referring now to FIG. 4B, the CLASSIFIER subroutine is entered via label 41 and goes to decision block 44, which determines if the left-hand X coordinate A1 of the present A slice is less than the left-hand X coordinate B1 of the B slice. If A1 is less than B1, the CLASSIFIER subroutine goes to decision block 45 and determines if A2 is less than B1. If it is, the program adds 1 to the X coordinate of A2 in block 46 and determines in block 47 if the incremented variable A2 is not equal to B1. If incremented A2 is not equal to B1, this means that the present B slice cannot be connected to the A slice, i.e., to the present open list node.

Note that in FIG. 4B, small replicas of the present A slice and B slice redrawn near the various FCN labels and decision branches to show the relationship determined by the decision tree of the classifier routine to exist. The upper line represents the A slice, and the lower line represents the B slice.

If the determination of decision block 47 is negative, this means that A2 is only one pixel to the left of B1 This is deemed close enough that slice B can be considered to be connected to present slice A, and therefore can be "attached to" the present open list node containing slice A.

If the determination of decision block 45 is that A2 is not less than B1, it means that either the X coordinate of A2 is equal to or greater than that of B1. Decision block 50 determines which of these two possible relationships exists. If A2 is greater than B2, the relationship between slice A and slice B is that slice A extends both to the left and right of slice B, and the CLASSIFIER subroutine calls the appropriate FCN4 subroutine in accordance with whether CLASSIFIER is being called by OBGRAB, FILLVERT, or METAGRAB. (Remember that the FCN subroutines depend on which routine is presently calling CLASSIFIER.) If the determination of decision block 50 is negative, the determination must be made as to whether A2 is equal to B2. If it is, the appropriate FCN3 subroutine is called.

If the determination of decision block 51 is negative, the present A and B slices have the relationship corresponding to the appropriate FCN1 subroutine, as indicated by label 53. If the determination of block 51 is positive, then FCN3 is called, as indicted by reference numeral 52.

The foregoing decisions exhaust the possibilities of the decision tree for the condition that A1 is less than B1. If the determination of decision block 44 is negative, then A1 must be equal to or greater than B1. The CLASSIFIER subroutine goes to decision block 54 and determines if A1 is greater than B1. If it is, the subroutine goes to decision block 55 and determines if A1 is greater than B2. If this is the case, it increments the X coordinate of B2, as indicated by block 56, and goes to decision block 57 and determines if A1 is not equal to the incremented value of B2. If A1 is not equal to the incremented value of B2, then slice A lies to the right of slice B, as indicated, and the appropriate (depending on the calling routine) FCN12 subroutine is called, as indicated by label 58. If the determination of decision block 57 is negative, then the left end of slice A is one pixel to the right of the right end of slice B, and the appropriate FCN10 subroutine is called, as indicated by label 59.

If the determination of decision block 55 is negative, the CLASSIFIER subroutine goes to decision block 60 and determines if A2 is less than B2. If this determination is affirmative, then both ends of slice B extend beyond the ends of slice A, and the appropriate FCN8 subroutine is called, as indicated by label 61. Otherwise, the program goes to decision block 62 and determines if A2 is equal to B2. If it is, the right ends of slice A and slice B are aligned, and the appropriate FCN9 subroutine is called, as indicated by label 63. Otherwise, the appropriate FCN10 subroutine is called, as indicated by label 64.

If the determination of decision block 54 was that A1 is not greater than B1, the CLASSIFIER subroutine goes to decision block 65 and determines if A2 is less than B2. If so, A1 has to be equal to B1, and the appropriate FCN5 subroutine is called, as indicated by label 66. Otherwise, the CLASSIFIER subroutine goes to decision block 67 and determines if A2 is greater than B2. If so, i the right end of slice A extends beyond the right end of slice B, as illustrated, and the appropriate FCN7 subroutine is called as indicated by label 68. Otherwise, both the right and left ends of slice A and slice B are perfectly aligned, and the appropriate FCN 6 subroutine is called, as indicated by label 69.

Now that the CLASSIFIER routine of FIG. 4B has been described, it should be understood that the CLASSIFIER decision tree is itself called up each time a slice A and a slice B are to be compared.

More specifically, during execution of OBGRAB, CLASSIFIER is called up by a subroutine called PROCESS ONE LINE, shown in FIG. 4A.

PROCESS ONE LINE controls the way CLASSIFIER is executed on a line-by-line basis. As indicated above, CLASSIFIER can be called by any of three different routines, namely OBGRAB, the routine called FILLVERT described in FIG. 8, and METAGRAB, described with reference to FIG. 9. Regardless of which of these three routines call the slice classifier, the calling routine will call a subroutine that is essentially similar to the PROCESS ONE LINE subroutine of FIG. 4A.

PROCESS ONE LINE is entered at label 650, and goes to block 651. The subroutine assumes that a suitable open list header has already been created by the calling routine for the purposes of building an "object" by OBGRAB, a "metaobject" by METAGRAB, or for the purposes of the FILLVERT routine. The PROCESS ONE LINE subroutine starts at the left end of the open list header and reads slice A from the first open list node therein, as indicated in block 652. The program then goes to block 652A and reads the next slice B from the data buffer, and then goes to decision block 653 and determines if the present position on the scan line is at the end of the open list for the present line or at the end of the data buffer for the present line. If this determination is negative, the PROCESS ONE LINE routine calls the CLASSIFIER routine of FIG. 4B, by identifying whether the calling routine is OBGRAB, FILLVERT, or METAGRAB, so that the proper OBGRAB FCN subroutines, FILLVERT FCN subroutines, or METAGRAB FCN subroutines will be called. The slice classifier routine of FIG. 4B continues to operate on the present line of the open list and the data buffer until an affirmative decision is made by decision block 653. If the subroutine is either at the end of the open list header or at the end of a line in a data buffer, then the subroutine goes to decision block 654 and it determines which of those two cases has occurred. If the determination of decision block 654 is that the subroutine is at the end of the open list header line but not at the end of a line of the data buffer, the subroutine goes to block 656, because there is a "left over" B slice to deal with.

Decision block 656 determines if that B slice is attached to another slice. If this determination is affirmative, there is no need to create a new node in the open lit header, so the routine goes to block 657 and reads the next B slice from the data buffer. In either case, the routine goes to decision block 658 and determines if the subroutine is at the end of the present line with respect to the data buffer. If the determination is affirmative, then the subroutine is at the end of both open list node and the data buffer, and goes to label 661 and returns to the calling routine (OBGRAB).

If the determination of decision block 658 is negative, the PROCESS ONE LINE subroutine calls up the FCN13 subroutine that corresponds to the calling routine, i.e., OBGRAB, FCN13, FILLVERT FCN13, or METAGRAB FCN13 (subsequently described) as indicated in block 659. The PROCESS ONE LINE subroutine then goes to block 660 and reads the next slice B from the data buffer, and returns to decision block 658, repeating this loop until an affirmative determination is attained.

If the determination of decision block 654 is negative, the subroutine goes to decision block 655, which determines if the subroutine is at the end of a line at the data buffer, but not at the end of the open list header. If this is the case, none of the slice A's can be attached to anything. If the determination of decision block 655 is negative, the subroutine returns to the calling routine, if the subroutine also has run out of both A slices in the open list header and has run out of B slices in the data buffer simultaneously. If the determination of decision block 655 is affirmative, the subroutine goes to decision block 662 and determines if the next remaining slice A is attached to anything. If this determination is negative, the subroutine goes to block 664 and determines if the present slice is at the end of the line of the open list header. If it is, the subroutine returns to the calling routine. If the determination of decision block 662 is affirmative, the subroutine goes to block 663 and reads the next slice from the open list, and goes to decision block 664. If the determination of decision block 664 is negative, the subroutine goes to block 665 and calls the appropriate FCN0 subroutine (i.e., OBGRAB FCN0, FILLVERT FCN0, or METAGRAB FCN0), and returns to decision block 664.

The OBGRAB FCN subroutines of FIGS. 4C-4N that are called by the CLASSIFIER routine of FIG. 4 when in turn it is called (indirectly by means of PROCESS ONE LINE) by the OBGRAB routine of FIG. 4B are described next.

If the decision tree CLASSIFIER of FIG. 4B selects FCN0 when called by OBGRAB, decision block 70 of FIG. 4C is entered and a determination is made as to whether slice A was previously attached to any slice on the row of present slice B. If this determination is affirmative, the subroutine goes to block 71 and reads the next slice A from the open list and returns. Otherwise, the subroutine goes to block 72, this means that slice A is not part of any branch that is still growing. In block 72, the OBGRAB FCN0 subroutine subtracts 1 from the "open branch count" of the object that slice A is part of, and goes to decision block 73. Note that every object has an open branch counter of the number of branches that are on it. In decision block 73, the subroutine determines if the open branch count is 0, and if it is not, goes to block 75 and removes slice A from the open list and returns. Otherwise, the subroutine goes to block 74 and puts the present object in the "finished object queue", and then goes to block 75.

Figure 14:
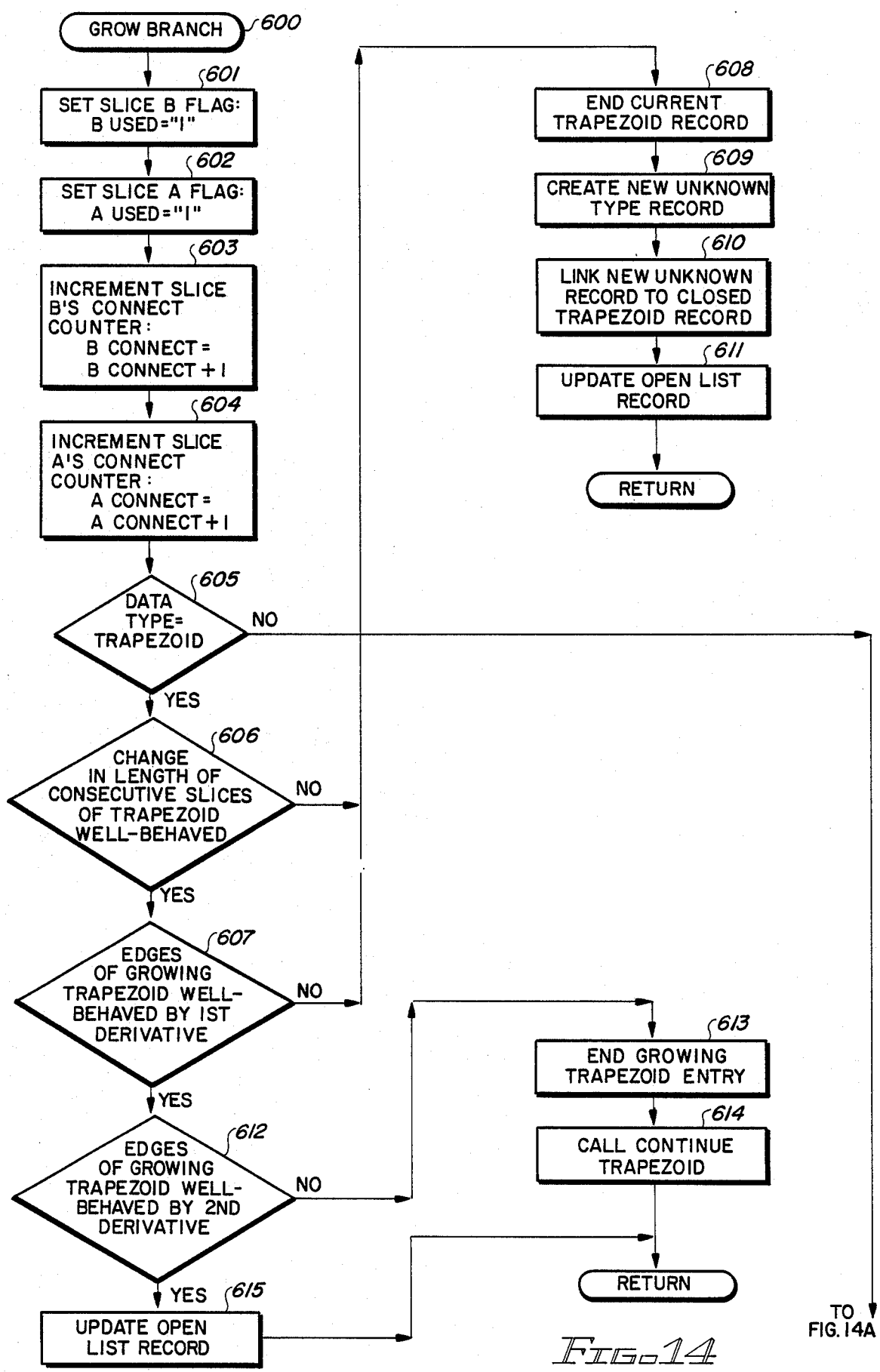
FIGS. 14, 14A 14B constitute the flow chart of a subroutine named GROBRANCH executed by the METAGRAB routine of FIG. 9.

The OBGRAB FCN1 subroutine is shown in FIG. 4D, and enters decision block 76 to determine if slice A was previously attached to another slice on the line of slice B, and if this is the case, goes to decision block 77 and creates a new column, goes to block 78, and creates a new open list record with slice B in it to represent the new column, and then goes to block 7g and reads the next slice A from the open list for OBGRAB. The subroutine then returns the calling subroutine. If the determination of decision block 76 is negative, the program goes to block 80, and attaches slice B to slice A in the growing columns by executing GROW BRANCH, of FIG. 14. The program then goes to block 79.

Referring to FIG. 4E, if the OBGRAB FCN3 subroutine is selected, a subroutine essentially identical to OBGRAB FCN1 is executed, as indicated in block 81, and then the next slice B is read from the data buffer, which contains the next unused slice. The subroutine then returns to the calling routine.

Referring to FIG. 4F, the OBGRAB FCN4 subroutine determines whether slice A was previously attached to a previous slice B in decision block 83, and if this is the case, creates a new column record, as indicated in block 84, creates a new open list node and inserts slice B in it, as indicated in block 85, and then reads the next slice B from the data buffer, as indicated in block 86 then returns.

If slice A was not previously attached, then the subroutine goes to block 87 and attaches slice B to slice A, growing the column. The subroutine then goes to block 86.

Referring to FIG. 4G, the OBGRAB FCN5 subroutine attaches slice B to slice A of the growing column, as indicated in block 88, and reads the next slice A from the open list, as indicated in block 89, and returns.

Referring to FIG. 4H, the OBGRAB FCN6 subroutine attaches slice B to slice A in the growing column as indicated in block 90, reads the next slice indicated in block 91, reads the next slice B from the data buffer, as indicated in block 92, and returns.

Referring to FIG. 4I, the OBGRAB FCN7 subroutine attaches slice B to slice A of the growing column, as indicated in block 93, and reads the next slice B from the data buffer, as indicated in block 94, and returns.

Referring to FIG. 4J, the OBGRAB FCN8 subroutine determines whether slice B was previously attached to another slice on the same line. If so, the subroutine goes to block 96 and merges the object (which up to now has been a different object, surrounded entirely by white pixels) that slice A is part of, into the object that slice B is part of, and then goes to block 97 and removes the record of slice A from the open list of OBGRAB. The subroutine then goes to decision block 98. If slice B was not previously attached to another slice on the same line, slice B is attached to slice A of the growing column, as indicated in block 99, and the program then goes to decision block 998. Decision block 98 determines if slice A is attached to any slice B. If so, the subroutine reads the next slice A from the open list as indicated in block 100, and returns. Otherwise, the subroutine just returns to the calling routine.

Referring now to FIG. 4K, the OBGRAB FCN9 subroutine determines in decision block 101, if slice B was previously attached to a previous slice A and if this determination is affirmative, merges the object that slice A is part of into the object that slice B is part of, as indicated in block 102, and then removes the record of slice A from the open list, as indicated in block 103. The subroutine then goes to decision block 105. If slice B was not previously attached, the subroutine "grows the column" by attaching slice A to slice B, as indicated in block 104, and goes to decision block 105. Decision block 105 determines if slice A was previously attached, and if this is the case, reads the next slice A from the open list and goes to block 107. Otherwise the subroutine simply goes from decision block 107 to block 106 and reads the next slice B from the data buffer and returns. Referring to FIG. 4L, the OBGRAB FCN10 subroutine determines if slice B was previously attached to an earlier slice A in decision block 108, and if this is the case, merges the object that slice A is part of into the object that slice B is part of, and goes to block 110 and reads the next slice B from the data buffer and returns. If slice B was not previously attached, slice B is attached to slice A to grow the present column of the object being built by OBGRAB, as indicated in block 111. The subroutine then goes to block 110.

Referring to FIG. 4M, the OBGRAB FCN12 subroutine determines in decision block 112 if slice B was previously attached to an earlier slice A. If this is the case, the subroutine goes to block 116, reads the next slice B from the data buffer, and returns. Otherwise, the subroutine creates a new node (representing a new column) in the open list as indicated in block 113 and inserts slice B in it, as indicated in block 114. The subroutine then goes to block 115 and inserts a new record before the record with slice A in it, and goes to block 116.

Finally, in FIG. 4N, the OBGRAB FCN13 subroutine creates a new object, as indicated in block 117, and then creates a new open list record with slice B in it, as indicated in block 118. The subroutine then appends the new record onto the end of the open list as indicated in block 119, and then goes to block 120, reads the next slice B from the data buffer, and returns to the calling routine.

Thus, it can be seen the FCN subroutines called by the CLASSIFIER routine of FIG. 4B when executed indirectly by the OBGRAB routine of FIG. 4 and directly PROCESS ONE LINE subroutine of FIG. 4A produces a linked list of linked lists, referred to as the "object", representing the image scanned, the image being (1) one or more connected "dark" branches or shapes and (2) entirely surrounded by "white" pixels. Each of the lists contains the slices from successive rows that overlap sufficiently that each can be attached to a "growing" open list node.

Each of the linked lists may contain pointers to other lists. The first list contains pointers to all lists containing successively connected slices.

Upon some reflection, one skilled in the art will recognize that when two images of the scanned document that start out as separate "objects" touch, and hence are merged into a single object, or if an object starts to split into separate, connected shapes, the "geometry" of the object being built may differ greatly from the actual geometry of the image on the document being scanned, because the lists constituting branches of the object are started in the order in which the top slice of each branch is scanned on a line-by-line scanning process. This altered "geometry" would make it more difficult to locate slices in the object as they are needed in subsequent vectorization and/or character recognition operations. As will eventually become clear, the present invention uses the METAGRAB routine to rebuilt a "directed graph" of the scanned image from the object so as to provide a completely "data driven" group of "records" representing the image to be vectorized or recognized and "restoring" the geometrical relationship of branches of the scanned image to the "branches" or "columns" of the "directed graph" representing that image. This simples the problem of locating slices when performing a subsequent vectorization operation.

At this point, it should be noted that even though the amount of raw runlength data obtained by scanning an object of the input document contains far less data than would be the case if all pixels, both light and dark, were stored if the drawing happens to b an ordinary document such as an engineering drawing, there may be numerous minute gaps and extraneous dark pixels caused, for example, by bits of dirt or microscopic imperfections in the dark lines on the document being scanned. Each gap between dark pixels on a scanned line (even if the gap is only one pixel wide) will result in creation of a new slice. Such gaps are ordinarily insignificant, as adjacent pixels are only one-sixteenth of a millimeter apart (Note that this measurement is for one scanner only. The software is independent of the scanner resolution.) Furthermore, the various lists, shapes or branches of the object that has been created by OBGRAB and represented by connected or linked lists of slices may be either quite irregular or highly regular. Irregular shapes must be represented by the slices contained therein, but regular shapes such as trapezoids, can be much more economically represented by their four corner points coordinates.

In accordance with the present invention, the next stage in processing the slice data contained in the linked lists is to delete insignificant (light) pixel gaps, determine which shapes can be represented by trapezoids, and create a new reconstructed "object", referred to as a METAOBJECT, that represents the object with far less data, again in the form of linked, "data driven" lists that enable a vectorization process to be performed without having to search in memory for individual pixels or slices or coordinates.

Figure 7:
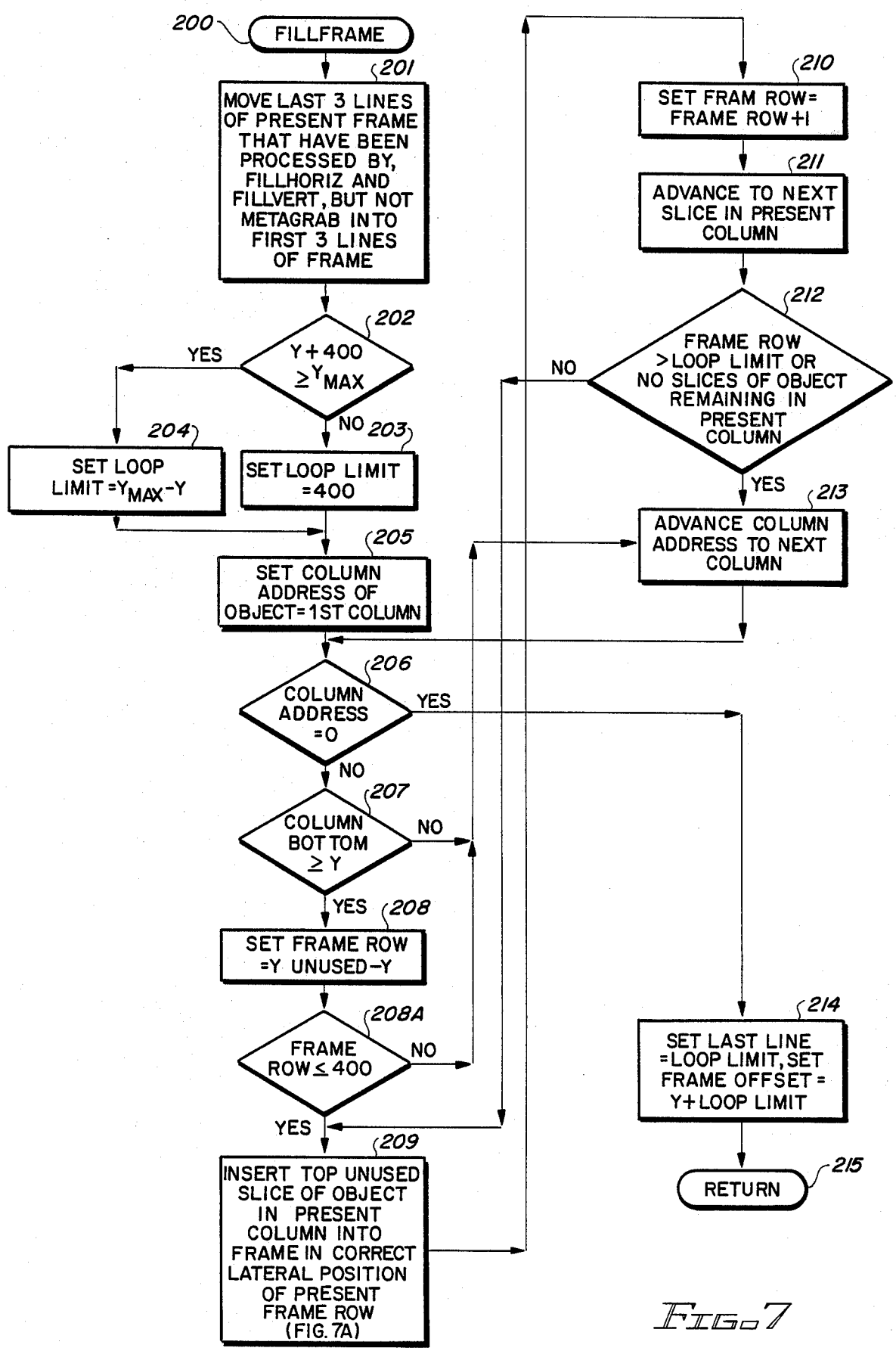
FIG. 7 is a flow chart of a subroutine called FILLFRAME.
Figure 20:
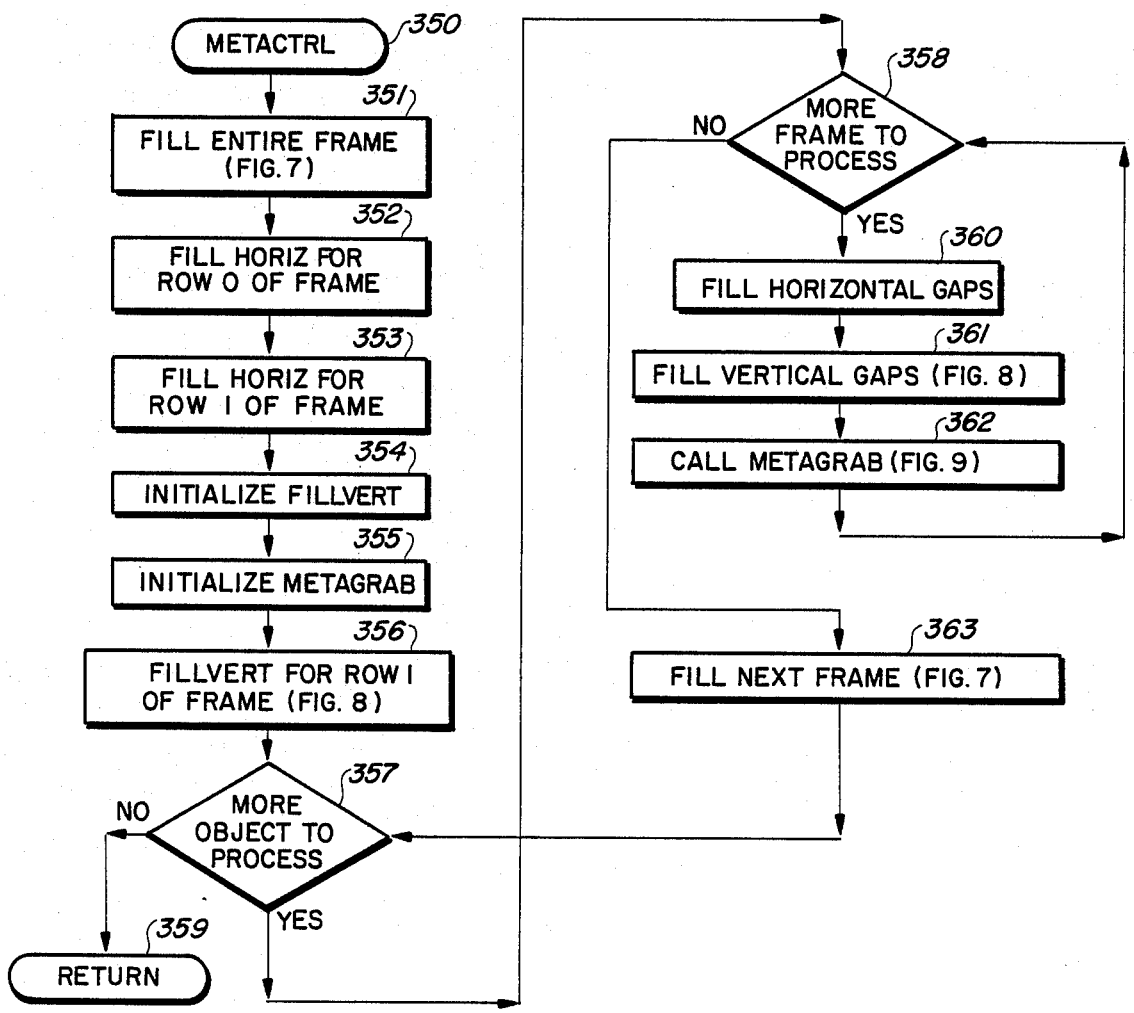
FIG. 20 is a diagram of a control routine called METACTRL that coordinates execution of the FILLFRAME, FILLHORIZ, FILLVERT, and METAGRAB routines.

Referring now to FIG. 7, the FILLFRAME subroutine is shown in flow chart form. It should be appreciated that the FILLHORIZ subroutine (which fills horizontal gaps of less than a few pixels width) and FILLVERT subroutine (which fills vertical gaps of less than three or four lines) are executed on a line-by-line basis, coordinated by the METACTRL routine of FIG. 20. It will be convenient to individually describe the FILLFRAME and FILLVERT subroutines individually before describing how they are coordinated by the METACTRL subroutine.

The FILLHORIZ subroutine is so trivial that it will not be described, as it simply connects slices on the same line that are closer than, say four pixels apart. In FIG. 7, the FILLFRAME routine is entered at label 200 In block 201 an operation is performed that is somewhat peripheral to the main function of the routine. If a previous frame has been processed by FILLFRAME, but its last three lines have not yet been processed by the routine METAGRAB, the last three lines of that frame need to be moved into the first three lines of the frame about to be filled, in order to allow vertical gaps to be filled before METAGRAB processes a line.

Then, the FILLFRAME routine goes to decision block 202 and it determines if $Y+400$ is less than $Y_{MAX}$. $Y_{MAX}$ is the maximum dimension of the present object in the Y direction. 400 scan rows or pixels is the height of each frame. Y is the vertical coordinate, increasing in the downward direction.

Decision block 202 determines if the present object terminates in the present frame which is about to be filled. If this determination is positive, a logic variable called LOOP LIMIT is set to the value $Y_{MAX}-Y$. If the object being scanned does not terminate in the present frame, LOOP LIMIT is set to 400, the number of rows in the present frame, to indicate that the FILLFRAME routine is executed to work through all 400 rows of the present frame, rather than stopping short of that, if the object terminates in the present frame.

Figure 6:
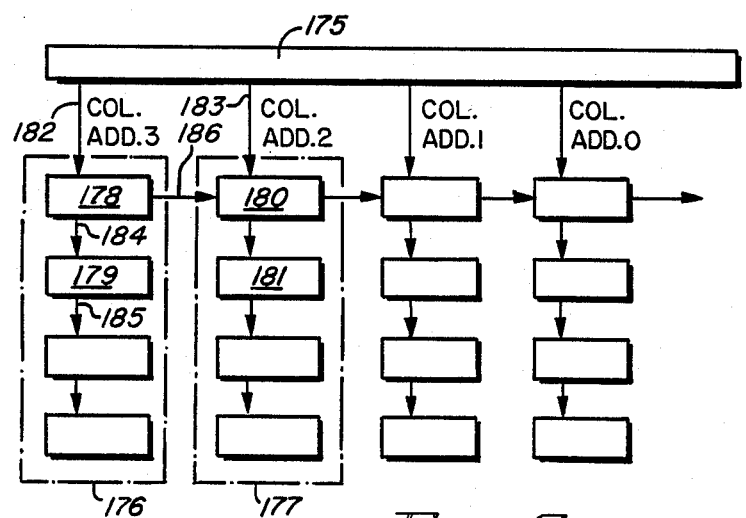
FIG. 6 is a diagram illustrating a linked list of linked lists constituting an "object" built from raw runlength data by the OBGRAB routine of FIG. 4 and the OBGRAB FCN subroutines of FIGS. 4A-4L.

In either case, the FILLFRAME routine goes to block 205 and sets a variable COLUMN ADDRESS to the initial column address, i.e., to the address of the first column of the list of linked lists shown in FIG. 6.

Referring briefly to FIG. 6, which shows the general structure or "geometry" of the "object" (list of linked lists) built, the left-hand column has the address (i.e., an address pointer) of the next column in it. For each column to the right, this pattern is repeated until the right-hand column is reached. Each list of the list of linked lists corresponds to a feature of the image originally scanned.

Once the initial column position for FILLFRAME is set to the left-hand column of the object or list of linked lists, the FILLFRAME routine goes to decision block 206 and determines if the present column address is 0, i.e., is beyond the right-hand column of the list of linked lists. If this determination is affirmative, it means that as much of the object has been entered into the present frame as can be entered. If this is the case, the program goes to block 214, sets a variable called LAST LINE to LOOP LIMIT, which is either 400 or $Y_{MAX}-Y$, and also sets a variable called FRAME OFFSET equal to Y+LOOP LIMIT and exits via label 215.

If the present frame has not been filled, the routine goes to decision block 207 and determines if a variable called COLUMN BOTTOM is greater than or equal to Y. The determination made here is whether the present slice of the object in the present column is at the bottom of that column. If it is, the determination of block 207 is negative, and the routine goes to block 213 and advances COLUMN ADDRESS to the next column, i.e., advances one column to the right, and returns to decision block 206. If the bottom of the present column has not yet been reached, the FILLFRAME routine goes to block 208 and sets FRAME ROW equal to $Y_{UNUSED}-Y$, where $Y_{UNUSED}$ is the "row number" or Y coordinate of the next slice of the present branch which has not yet been entered into the present frame.

The routine then goes to decision block 208A and determines if FRAME ROW is less than or equal to 400, and if this determination is negative, goes to block 213 and updates COLUMN ADDRESS to advance to the next column. Otherwise the routine goes to block 209 and executes a subroutine to insert the top unused slice of the object in the present column into the present frame in the correct lateral position of the present frame row pointed to by FRAME ROW. Block 209 is described in detail with reference to FIG. 7A.

Next, FILLFRAME goes to block 210 and increments FRAME ROW, goes to block 211, and increments Y to advance to the next slice in the present column of the object or list of linked lists.

Then FILLFRAME goes to decision block 212 and determines whether the present value of FRAME ROW is greater than the earlier set value of LOOP LIMIT, or alternately, whether no slices of the object remain in the present column. If this determination is negative, i.e., there are more rows to be filled in the frame and there are more slices remaining in the present column of the present object, the program returns to block 209 and inserts the next top unused slice into the correct lateral position of the present row of the frame and repeats. Otherwise the program goes to block 213 and advances to the right to the next column of the object.

Next, before completing the description of FIG. 7, the process of block 209 of FIG. 7 will be described in more detail with reference to FIG. 7A, wherein a subroutine called PUT SLICE INTO FRAME ROW IN PROPER LEFT-TO-RIGHT ORDER is entered at label 209 and goes to decision block 250. Decision block 250 determines if the present frame row is empty. If this determination is affirmative, the subroutine goes to block 251 and puts a new slice of the data in the frame in the beginning of the present frame row, and returns to the calling subroutine.

Otherwise, the subroutine of FIG. 7A goes to decision block 252 and determines if the X coordinate of new slice is less than that of the current frame slice. If this determination is negative, the subroutine goes to block 255, and moves the slices already in the frame to the right of the current frame position by one horizontal slice position. The subroutine then goes to block 256, and inserts the new slice into the opening created in step 255, and returns to the calling subroutine. If the determination of decision block 252 is affirmative, the subroutine goes to decision block 253 and determines if the present position is at the beginning of the row. If this determination is affirmative, the subroutine goes to previously-described block 255. If the determination is negative, the subroutine goes to block 254, obtains the slice in the frame to the left of the current frame slice, and returns to decision block 252.

Figure 8M:
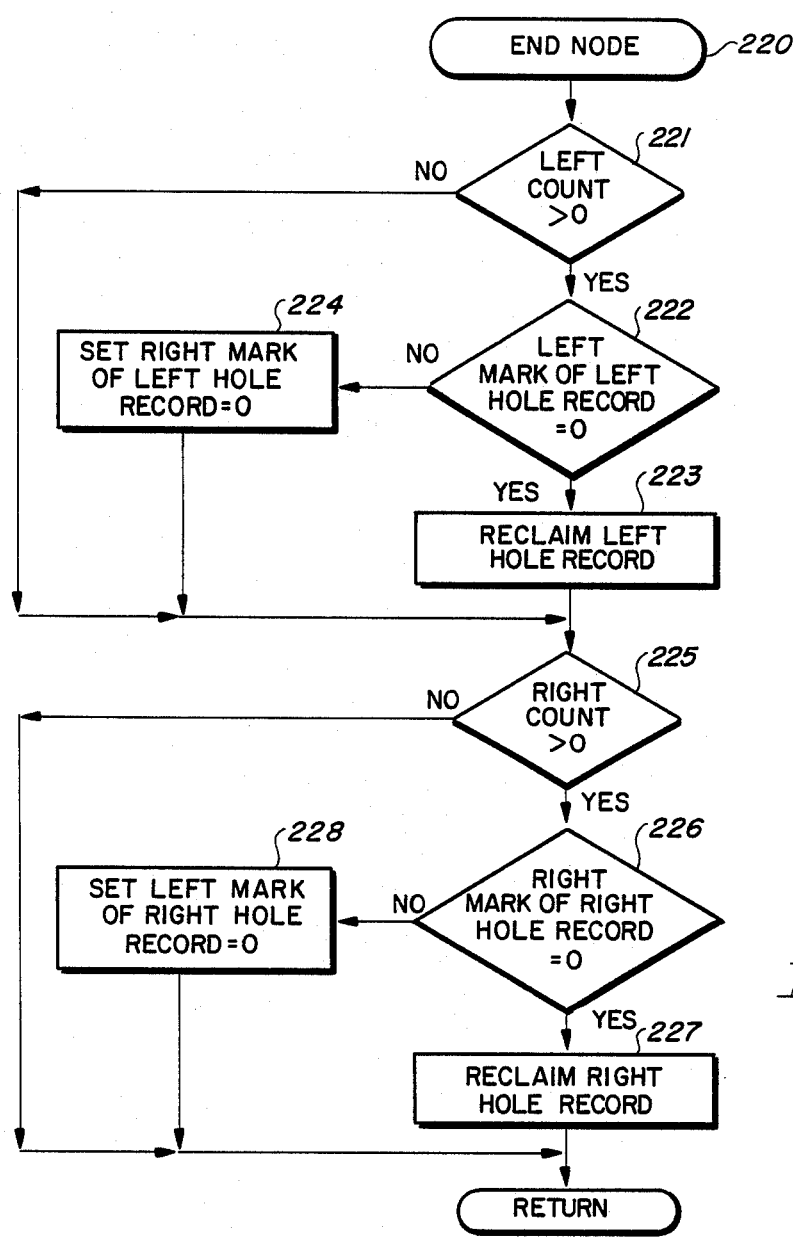
FIG. 8 is a flow chart of a subroutine called FILLVERT.
FIGS. 8A-BP are flow diagrams called by the FILLVERT subroutine of FIG. 8 to fill insignificant vertical gaps between slices of an object.
Figure 8N:
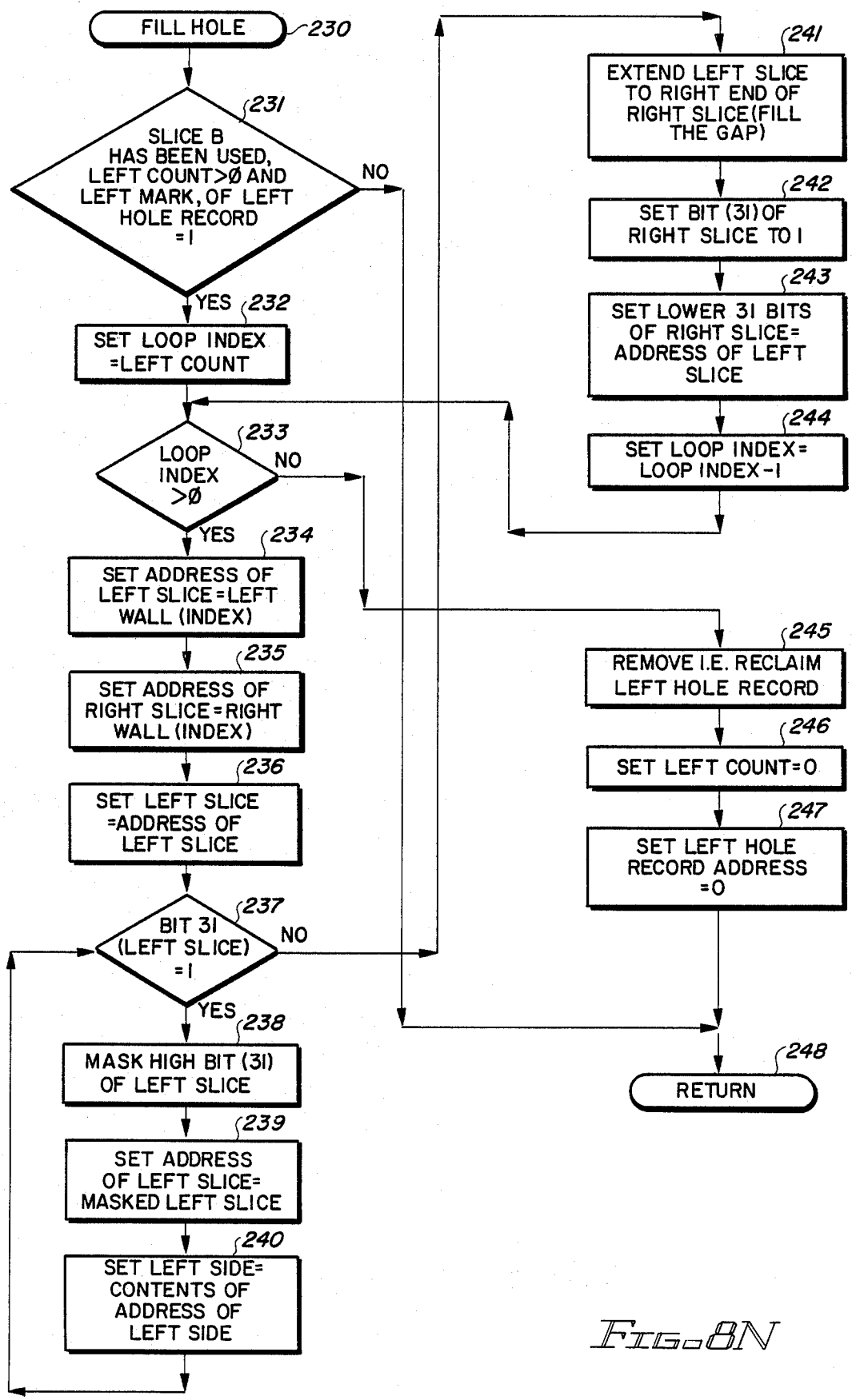
Figure 80:
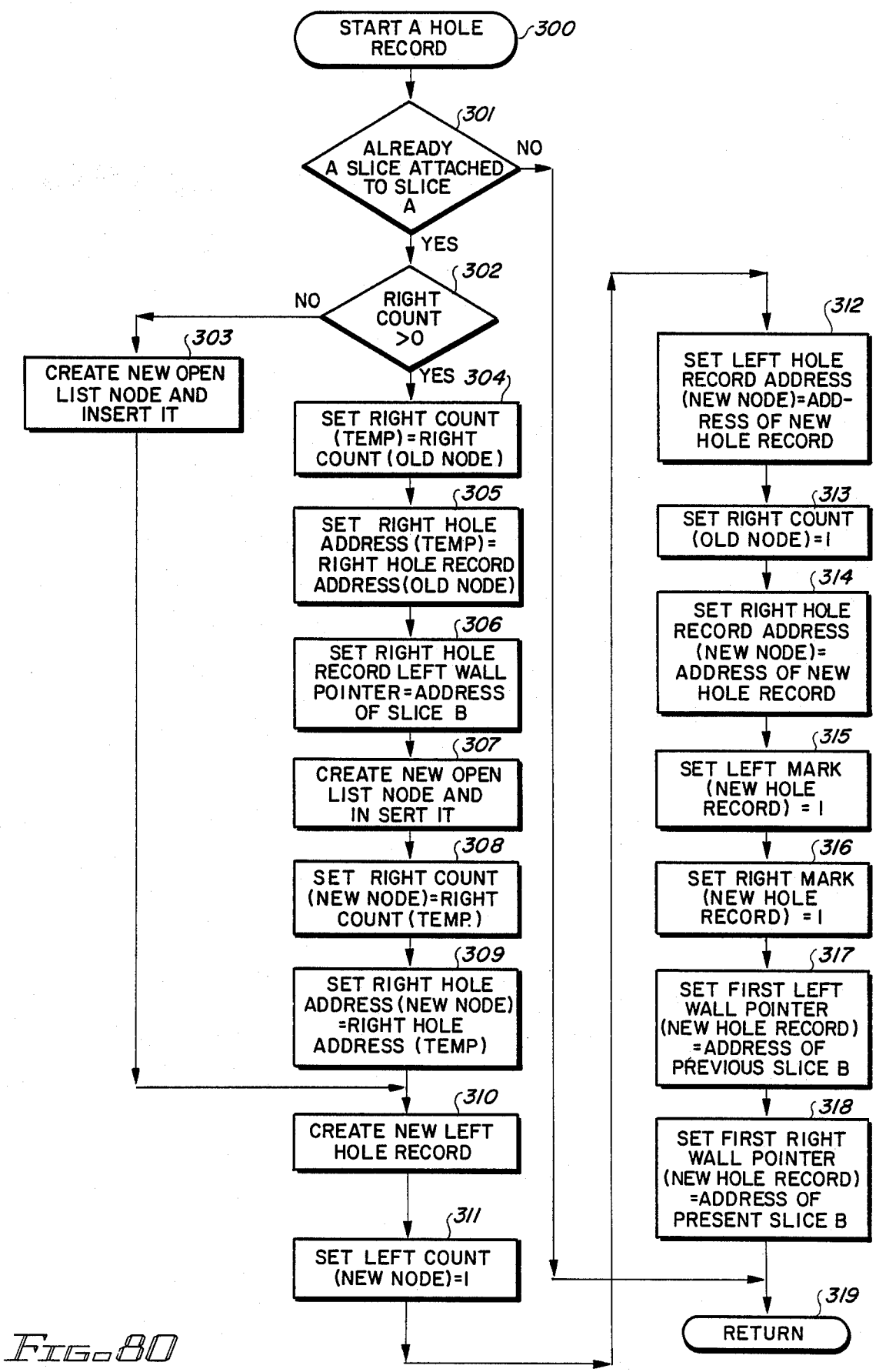
Figure 8P:
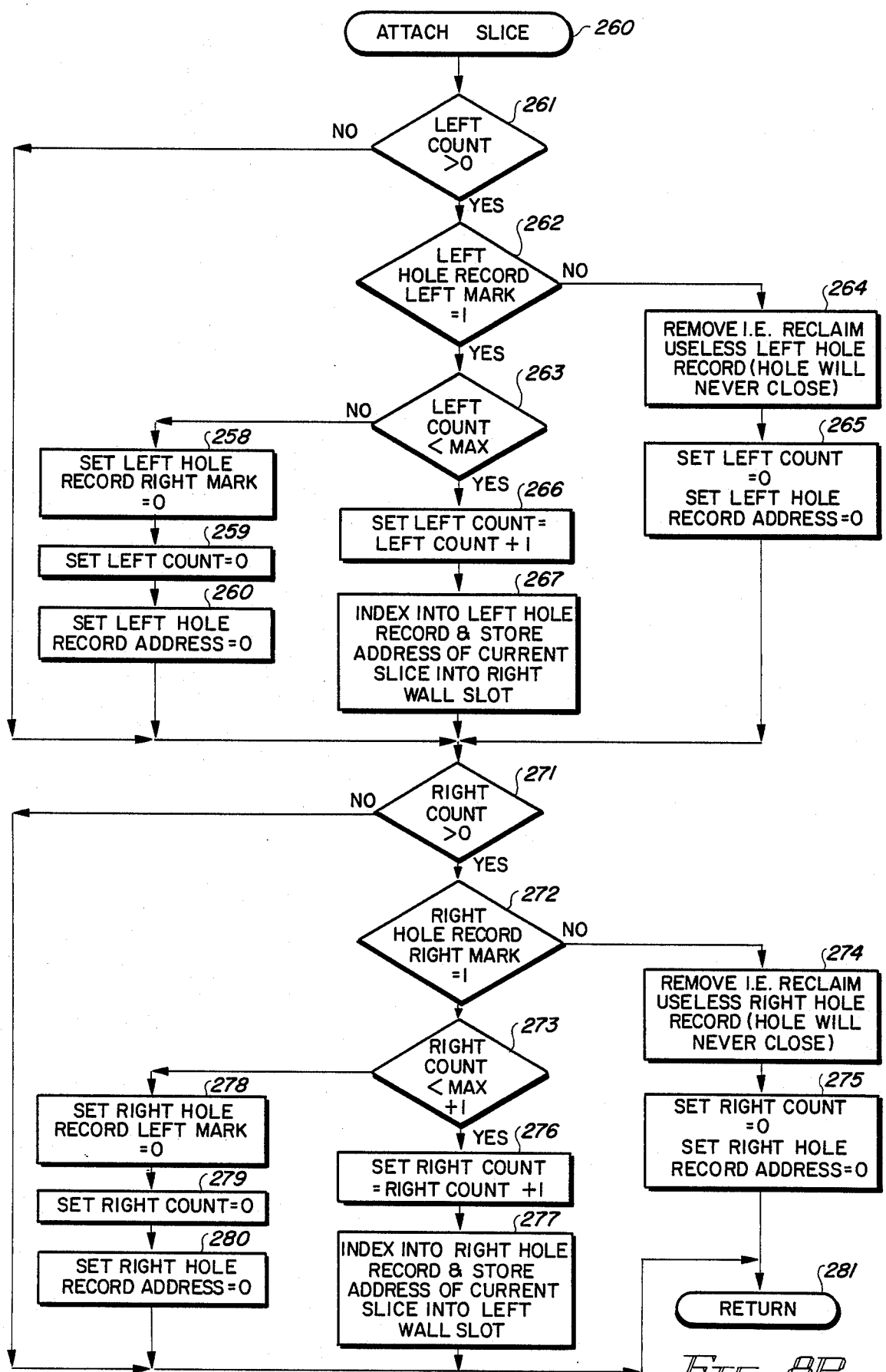

Referring now to FIG. 8, FILLVERT is the routine that fills vertical gaps smaller than a predetermined number of rows and heights, for example, smaller than four rows in height. The subroutine is entered via label 216 in FIG. 8 and goes to block 217, which reads the last row of the frame that has been filled in and reads the present row of the "object" built by OBGRAB, i.e., the list of linked lists shown in FIG. 6 executes the PROCESS ONE LINE subroutine of FIG. 4A and thereby executes the CLASSIFIER subroutine of FIG. 4B and selected FCN routines of FIGS. 8A–8P, and then exits via label 218.

When the CLASSIFIER decision tree of FIG. 4B calls FILLVERT FCN0, that subroutine enters decision bock 133 of FIG. 8A and determines if slice A has previously been attached to any other slice of the present row of the object linked lists corresponding to the present FRAME ROW. If slice A has previously been attached, the FILLVERT FCN0 subroutine reads the next slice A from the list constituting the next row of the object linked list and returns to the decision tree CLASSIFIER. If the determination of decision block 133 is negative, the FILLVERT FCN0 subroutine goes to block 135 and executes the "END NODE" subroutine of FIG. 8M, goes to block 136 and removes a variable called "SLICE A" from the open list node of the "open list" associated with the frame that is presently being filled and filtered. The subroutine then returns to the beginning of the decision tree classifier of FIG. 4B.

Next, it will be convenient to describe the END NODE subroutine of FIG. 8M. But in order to understand this subroutine and also the subroutines of FIGS.

Figure 19:
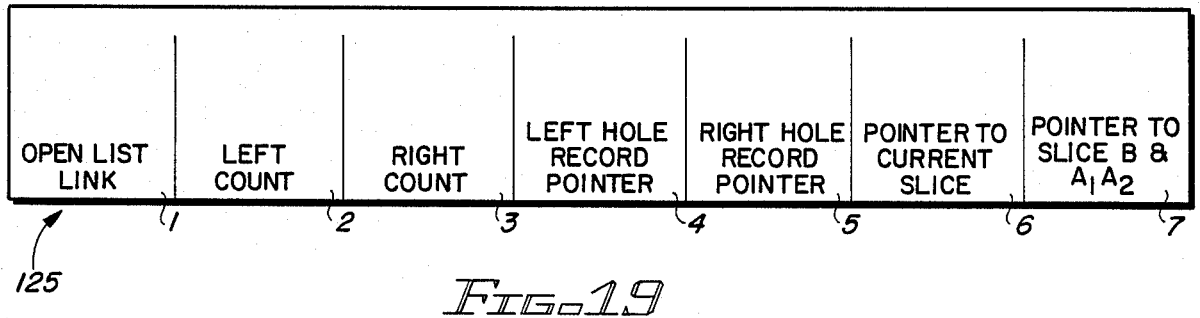
FIG. 19 is a diagram useful in explaining "hole records" and "open list records".
Figure 18:
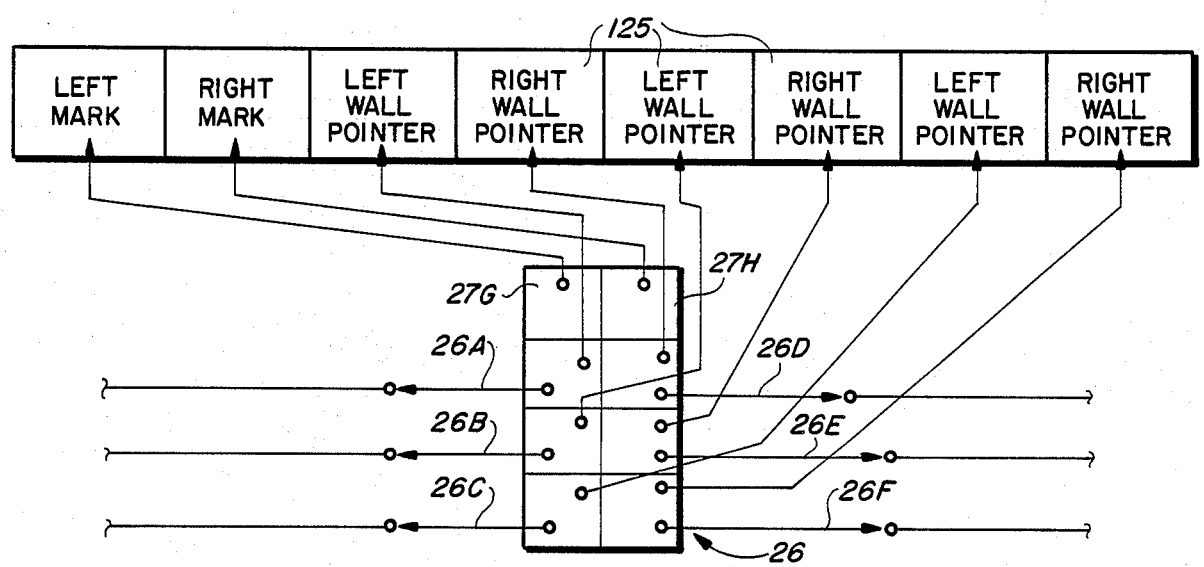
FIG. 18 is a diagram illustrating the data fields of an open list node.

8N, 8O, and 8P, it is necessary to understand the diagrams and terminology of FIGS. 18 and 19.

FIG. 19 shows the data fields of the "open list node" that must be used in executing the decision tree classifier of FIG. 4B during execution of the FILLVERT routine of FIG. 8 and the subroutines of FIGS. 8A–8P. In FIG. 19, data field 1 contains an open list link, which is an address pointing to the beginning of the next open list record (on the same line). Data field 2 contains the value of a variable called LEFT COUNT. Data field 3 contains a variable called RIGHT COUNT. Data fields 4 and 5 contain a "left hole record pointer" and a "right hole record pointer", respectively. Data field 6 contains an address pointer to the present slice A. Data field 7, the last data field of the present open list node, also contains an address pointer to the present slice B, and contains A1 and A2, the end points of the present slice A.

The open list record maintains a "hole record" of each "hole" or vertical gap between slices of consecutive rows. FIG. 18 illustrates such a "hole record". In FIG. 18, reference numerals 125 point to different "hole records". Reference numeral 26 designates a vertical "hole record". The "left count" and "right count" variables mentioned above indicate how high the corresponding vertical hole has grown so far. Reference numerals 26A–F represent pointers to slices bounding that hole. The purpose of the hole record is to keep track of "loose ends", i.e., unconnected ends of slices that bound the growing vertical hole. By using the hole records, the END NODE subroutine of FIG. 8M and the FILL HOLE subroutine of FIG. 8N, a determination can be made whether to fill the hole.

Since each open list node represents a growing part or "branch" of an object, each open list node must be monitored to determine where walls are formed which may potentially enclose a hole. Only some such nodes represent the growing walls of a potential hole. A hole record such as the one indicated by reference numeral 26 of FIG. 18 is needed to keep track of the ragged edges of a growing hole. Should the hole be "closed" or "filled" by the two walls "growing together", the hole record stores slice address to allow FILLVERT (FIG. 8) and FILL HOLE (FIG. 8N) to fill in the void that was the hole. The left and right "wall" pointers 26A–F are the addresses of the loose ends of the slices that form the hole. The left mark 27G and right mark 27H of each hole record are "1"s if the left and right "walls" are "intact". In FIG. 18, reference numerals 125 designate "hole record pointers" that are contained in an openlist record, one being a right hole record pointer and the other being a left hole record pointer.

Reference numeral 1 in FIG. 18 refers to an open list link. Therefore, the overall diagram in FIG. 18 represents a linked list of open list nodes representing "growing walls" which point to hole records representing "growing holes".

The purpose of the END NODE subroutine of FIG. 8M is simply to "reclaim" memory and eliminate invalid hole records, typically releasing a 64 byte portion of memory being used to define an insignificant vertical hole and its hole record, and put the reclaimed memory back onto a reusable memory list that then can be used by the computer operating system for some other purpose.

A growing wall of a growing vertical hole is actually a part of a growing node of the open list node being used as FILLVERT is being executed. If, as the nodes grow it is determined that a divergence is being formed instead of a hole, or if a hole is to be filled, the hole records are no longer needed.

Referring now to FIG. 8M, the END NODE subroutine is entered via label 220, goes to decision block 221, and determines if the variable LEFT COUNT is greater than 0. If it is not, the subroutine goes to decision block 225, because there is no left hole record attached to the present node. However, if LEFT COUNT is greater than 0, this means there is a left hole record such as 26 in FIG. 18 attached to the present open list node, i.e., to the growing part of the object in the frame being filled and representing a wall of the growing void that may be a hole or a junction of a divergence. The END NODE subroutine then goes to decision block 222 and determines if the "left mark of left hole record" is 0.

If this determination is negative, it means that the growing void is still recognized as having the potential to become a hole by another node of the open list. Therefore, the memory occupied by the present hole record cannot yet be reclaimed because the hole record must still be accessed by the open list node associated with the opposite wall of the hole record. Therefore, the subroutine goes to block 224 and sets the right mark of the hole record equal to "0" and goes to decision block 225. If the determination of decision block 225 is affirmative, this means that both walls of the hole record have become disassociated with the hole record, and memory used to maintain the record of that former association is no longer needed and can be reclaimed.

The END NODE subroutine then goes to decision block 223 and "reclaims" the memory used for storing the left hole record and returns it to the computer operating system, and goes to decision block 225.

In decision blocks 225 and 226 and blocks 228 and 227, essentially the same procedure is repeated to determine if there is any need for the right hole record, and if not, the memory used for it is reclaimed for the operating system.

Referring now to FIG. 8B, if the decision tree CLASSIFIER of FIG. 4B selects FILLVERT FCN1, that subroutine goes to decision block 137 and determines if the slice A previously under consideration was previously attached to any other slice on line of present slice B. If this determination is affirmative, the subroutine starts a hole record by executing the subroutine of FIG. 8O, and returns to the calling subroutine. If slice A was not previously attached, the program attaches slice B to slice A by executing the attached slice B subroutine of FIG. 8P, and returns to the beginning of CLASSIFIER.

At this point, it will be convenient to describe the START HOLE RECORD subroutine of FIG. 8O. Referring to FIG. 8O, this subroutine is called by CLASSIFIER when it is called by FILLVERT if the relationship of slices A and B causes FILLVERT FCN1, 3, or 4 to be called. In each of these cases, there is the possibility of a divergence of the object being formed. As soon as that occurs, it is necessary to begin a hole record of the type described with reference to FIG. 18, recording the growth of the hole by generating the left and right wall pointers. The routine first goes to decision block 301 and determines if there is a slice on the same scan line as slice B already attached to slice A. If this is the case, attachment of another slice to slice A would begin the growth of a void, i.e., a potential hole or divergence. If the determination of decision block 301 is negative, the subroutine is exited. If the determination is affirmative, the routine goes to decision block 302 and determines if a variable RIGHT COUNT, which may have a value up to a maximum permissible fillable vertical hole height, is greater than 0.

If the determination of decision block 302 is negative, the program goes to block 303 and creates a new open list node and inserts it in the open list consisting of all open list nodes associated with the frame being filled. The program then goes to block 310.

If RIGHT COUNT is greater than 0, this means that a hole is already growing on its right side. To understand this, perhaps it will be helpful to realize that the open list to the left of the current node represents the "history" that includes slices B from the current data buffer and prior to it. The open list to the right and including the present node represents the history of the most recent data buffer. The history of the present node may represent the wall of a growing hole, and if RIGHT COUNT is greater than 0, this means that a hole is already growing on its right side.

If RIGHT COUNT is greater than 0, the routine goes to block 304 and in block 304, sets a temporary variable called RIGHT COUNT (TEMP) equal to RIGHT COUNT (OLD NODE), which is the present value of RIGHT COUNT for the already-growing hole, i.e., the value of RIGHT COUNT in the present open list record. The reason for this step is so that the value of RIGHT COUNT can be used in a new open list node that is subsequently created and inserted into the open list.

The routine then goes to block 305 and sets a temporary address variable RIGHT HOLE ADDRESS (TEMP) equal to the value of the right hole record address in the present open list node, namely to the value of RIGHT HOLE RECORD ADDRESS (OLD NODE). In this block, a temporary variable RIGHT HOLE RECORD ADDRESS (TEMP) is set equal to RIGHT HOLE RECORD ADDRESS (OLD NODE), again to save the value for use in a new open list node to be created.

Next, the routine goes to block 306 and sets a pointer called RIGHT HOLE RECORD LEFT WALL POINTER equal to the address of slice B. Since the space inside the growing hole is being divided by a diverging new branch of the object, this fact must be reflected in the hole record. Then the routine goes to block 307 and creates a new open list node and inserts it into the present open list being grown in order to fill the frame. Then the routine goes to block 308 and sets a RIGHT COUNT of the new node created in block 307 equal to the value of the temporary RIGHT COUNT set in block 304, and in block 309 the routine sets the RIGHT HOLE ADDRESS of the new node created in block 307 to RIGHT HOLE ADDRESS (TEMP). The routine then goes to block 310 and creates a new left hole record.

The following steps make the left count and the left hole record address of the new open list record equal to a "1" and the address of the new hole record, respectively. This is done in blocks 311 and 312. In block 313 RIGHT COUNT (OLD NODE) is set to a "1". In block 314, RIGHT HOLE RECORD ADDRESS for the old node is set to the address of the new hole record. It should be noted that blocks 311 and 313 refer to the same hole. The old open list node and the new open list node represent the left wall and right wall of the new hole. However, there is only one hole, so both walls "see" or point to the same hole. In block 315, LEFT MARK for the new hole record is set to a "1", and in block 316 RIGHT MARK for the new hole record is set to a "1".

These steps are taken so that now both the new open list node created in either block 303 or 310 and the old open list node from which slice A was taken now both point at the same new hole record created in block 310. The fact that LEFT MARK of the new hole record and RIGHT MARK of the new hole record are both equal to "1" indicates that the hole being created is in existence.

In blocks 317 and 318, the first left wall pointer of the new hole record is set to the address of the previous slice B to which slice A was already attached, as determined in decision block 301 above, and the first right wall pointer of the new hole record is set to the address of the present slice B. Note that there may be additional left wall pointers and right wall pointers, one for each row of height of the hole up to maximum permissible vertical height of an insignificant hole which is to be filled.

The subroutine then returns to the FILLVERT function subroutine that called it.

Next, the ATTACH SLICE routine of FIG. 8P will be described. The subroutine of FIG. 8 for attaching a slice during the growing of a hole effectuates attaching a slice to a "column" in the frame forming one side of a vertical hole. The subroutine first goes to decision block 261. When this subroutine is called by one of FILLVERT FCN1 or FILLVERT FCN3-10, a hole record has already been started. Decision block 261 determines if LEFT COUNT of that hole is greater than 0. If this determination is negative, it means that there is no hole growing on the left of this growing node or branch.

If the determination of decision block 261 is affirmative, it means that there is a hole growing on the left of this growing node. In this case, the routine goes to decision block 262 and determines if the LEFT MARK of the left hole record is equal to "1". If it is not, this means that the hole will never close. The portion of memory in which the left hole record is stored therefore is reclaimed, as indicated in block 264, and LEFT COUNT is set to 0 and LEFT HOLE RECORD ADDRESS is also set to 0, as indicated in block 265. The routine then goes to decision block 271 to repeat the process for the hole that lies to the right of the present growing node. The reader should bear in mind that the definitions of left and right above are relative terms taken with respect to a particular growing node or column or branch of slices.

If the determination of decision block 262 is affirmative, this means that the column is still growing, and has a left hole record still associated with it. The subroutine then goes to decision block 263 to determine if the vertical height of the hole associated with the growing column is less than a maximum value MAX which typically is set to be three or four horizontal scan lines. LEFT COUNT and RIGHT COUNT are simply counts of how high the vertical hole has grown so far. If the LEFT COUNT variable in decision block 263 is less than MAX, the routine goes to block 266 and increments LEFT COUNT and then goes to block 267 and indexes to the left hole record and stores the address of the current slice B forming the right wall.

The program then goes to decision block 271 to repeat the foregoing process for the right hole record.

If LEFT COUNT is not less than MAX, this means that the growing hole is greater in height than the criterion for an inconsequential or insignificant hole, so that hole will not be "filled". Therefore, all hole records associated with the hole are eliminated, and the associated memory is reclaimed for use by the operating system. The routine then sets LEFT HOLE RECORD RIGHT MARK equal to "0", sets LEFT COUNT equal to "0", and sets LEFT HOLE RECORD ADDRESS equal to "0", as indicated in blocks 258, 259, and 260.

The program then goes to decision block 271. Decision blocks 271-280 repeat the foregoing process for the RIGHT HOLE RECORD, reclaiming the memory in which it is stored in block 274 and resetting its associated variables equal to "0" in block 275 if the RIGHT HOLE RECORD MARK is not equal to "1", returning to the calling routine if RIGHT COUNT is "0", as indicated in decision block 271, incrementing RIGHT COUNT if the hole has not reached its maximum permissible value of MAX+1 and storing the address of the current slice in the left wall slot as indicated in block 277, and otherwise resetting the variables associated with the RIGHT HOLE RECORD, in blocks 278-280.

Returning now to the description of the FILLVERT FCN subroutines, in FIG. 8C, if the FILLVERT FCN3 is called, the FILLVERT FCN1 subroutine of FIG. 8B is executed, and then the next slice B is read, as indicated in block 140.

FIG. 8D shows the FILLVERT FCN4 subroutine, wherein in decision block 141 it is determined whether slice A was previously attached to a slice on the present B scan line. If this determination is affirmative, this subroutine calls up the above-described subroutine of FIG. 8O and starts a hole record, as indicated in block 142. If the determination of decision block 141 is negative, slice B is attached by calling up the above-described subroutine of FIG. 8P, as indicated in block 143. In either case, the next slice B is read from the input buffer, as indicated in block 144.

If the FILLVERT FCN5 subroutine of FIG. 8E is called, slice B is attached to slice A by calling up the above-described subroutine of FIG. 8P, as indicated in block 145, and the next slice A is read from the next open list node.

Referring to FIG. 8F, if the FILLVERT FCN6 subroutine is called by CLASSIFIER, slice B is attached to slice A by executing the subroutine of FIG. 8P, as indicated in block 147. The next slice A and slice B then are obtained, as indicated in blocks 148 and 149.

Referring to FIG. 8G, if the FILLVERT FCN7 subroutine is called, slice B is attached to slice A, as indicated in block 150 and the next slice B is read from the input buffer, as indicated in block 151.

Referring to FIG. 8H, the FILLVERT FCN8 subroutine determines if slice B was previously attached to another slice A on the present slice A scan line, as indicated in decision block 152. If this determination is affirmative, the hole is filled by executing the FILL HOLE subroutine of FIG. 8N, subsequently described, as indicated in block 153, and slice A is removed from the open list node, as indicated in block 154. If the determination of decision block 152 is negative, slice B is attached to slice A, as indicated in block 155. In either case, decision block 156 determines if slice A is attached to a slice B on the present scan line. If this determination is affirmative, the next slice A is read from the open list node, as indicated in block 157.

At this point, it will be convenient to describe the FILL HOLE subroutine of FIG. 8N. This subroutine is entered via label 230 and first goes to decision block 231 Decision block 231 determines that the hole should not be filled, FILL HOLE "returns" via label 248 unless the condition exists that slice B has been attached to another slice on the present scan line (so that a vertical hole has been formed), LEFT COUNT is greater than 0, and LEFT MARK of the LEFT HOLE RECORD is equal to 1. If this is the case, the determination is made that the hole is to be filled. The subroutine goes to block 232 and sets LOOP INDEX equal to LEFT COUNT, the height of the vertical hole, and goes to decision block 233 and determines if LOOP INDEX is greater than 0.

If LOOP INDEX is greater than 0, it means that the hole is not yet filled, and the subroutine sets the address of the left slice of the hole equal to the LEFT WALL INDEX in block 234, sets the address of the right slice equal to the RIGHT WALL INDEX in block 235, and sets LEFT SLICE to the contents of the address of the LEFT SLICE in block 236. What is happening in the above loop is that the hole is being filled. Each pass through the above loop "splices" together the slice on the left side of the hole and the slice on the right side of the hole of the present line to create a single slice. Blocks 234, 35, and 236 are set up so that the next execution of the loop can find the slice representing the left wall. This is necessary since the left wall may have had gaps filled in leaving "false slices" behind.

Next, the subroutine goes to decision block 237. If LEFT SLICE, which is a 32 bit word, has its highest bit, bit 31, set to a "1", it means that the next lower 31 bits of LEFT SLICE are the address of LEFT SLICE. If bit 31 of LEFT SLICE is a "0", the remaining 31 lower bits are the data of the left slice. If LEFT SLICE is an address of the next LEFT SLICE, the subroutine goes to block 238 and masks bit 31 of LEFT SLICE, goes to block 239 and sets ADDRESS OF LEFT SLICE equal to MASKED LEFT SLICE, which is the 31 lower bits of LEFT SLICE. The subroutine then goes to block 240 and sets LEFT SLICE equal to address of LEFT SLICE. The routine then returns to decision block 237. Since holes may have occurred to the left of the present node, it cannot be assumed that the current left slice is "valid", so a search of slices to the left of the present node is conducted until a real "valid" slice is found on the present line. The "invalid" slices are leftover slices that result from filling in of other holes, wherein two slices are merged into one, leaving an invalid pointer to the slice created when the two slices are joined to fill a hole.

Eventually, the determination of decision block 237 will be negative, and this will mean that the actual LEFT SLICE has been found. In block 241, the routine fills the gap between the present RIGHT SLICE and LEFT SLICE by extending the LEFT SLICE to the right end of the RIGHT SLICE.

The subroutine then goes to block 242 and sets bit 31 of RIGHT SLICE to a "1" and goes to block 243. In block 243 the subroutine sets the lower 31 bits of RIGHT SLICE equal to ADDRESS .OF RIGHT SLICE. What this accomplishes is to mark the RIGHT SLICE as invalid and to store the address of the valid LEFT SLICE into what was the address of the RIGHT SLICE. The subroutine then goes to block 244, decrements LOOP INDEX, and returns to decision block 233. Eventually, when it is determined by decision block 233 that the hole is filled, the subroutine goes to block 245 and reclaims the portion of memory in which the left hole record was stored to make it available to the operating system. The subroutine then sets LEFT COUNT and LEFT HOLE RECORD ADDRESS to 0, as indicated in blocks 246 and 247 and returns to the calling routine via label 248.

Referring again to the FILLVERT FCN subroutines, the FILLVERT FCN9 subroutine is shown in FIG. 8I, wherein decision block 158 determines if slice B has been previously used. If so, the hole is filled by calling the above described FILL HOLE subroutine of FIG. 8N, as indicated in block 159. Slice A is removed from the open list node, as indicated in block 160. If the determination of decision block 158 is negative, slice B is attached to slice A, as indicated in block 161. In either case, the subroutine goes to decision block 162 and determines if slice A was previously used. If this determination is affirmative, the next slice A is read from the open list node, as indicated in block 163. In either case, the next slice B is read from the input buffer, as indicated in block 164.

Referring next to FIG. 8J, the FILLVERT FCN10 subroutine determines if slice B was previously attached in decision block 165. If so, the FILL HOLE subroutine is called, as indicated in block 166. If not, slice B is attached to slice A by the subroutine of FIG. 8P, as indicated in block 167. In either case, the next slice B is read from the input buffer, as indicated in block 168.

Referring to FIG. 8K, the FILLVERT FCN12 subroutine determines in decision block 169 if slice B was previously attached, and if it was, goes to block 171 and reads the next slice B. If slice B was not previously attached, the subroutine creates a new open list node item and inserts slice B in it, as indicated in block 170, and then goes to block 171 and returns.

Referring to FIG. 8L, the FILLVERT FCN13 subroutine is called if it is determined prior to entering the decision tree CLASSIFIER routine of FIG. 4B that there is no slice A, only slice B. If this is the case, the subroutine enters block 172 and creates a new open list node item and inserts slice B in it, and then reads the next slice B, as indicated in block 173 and returns.

Figure 9:
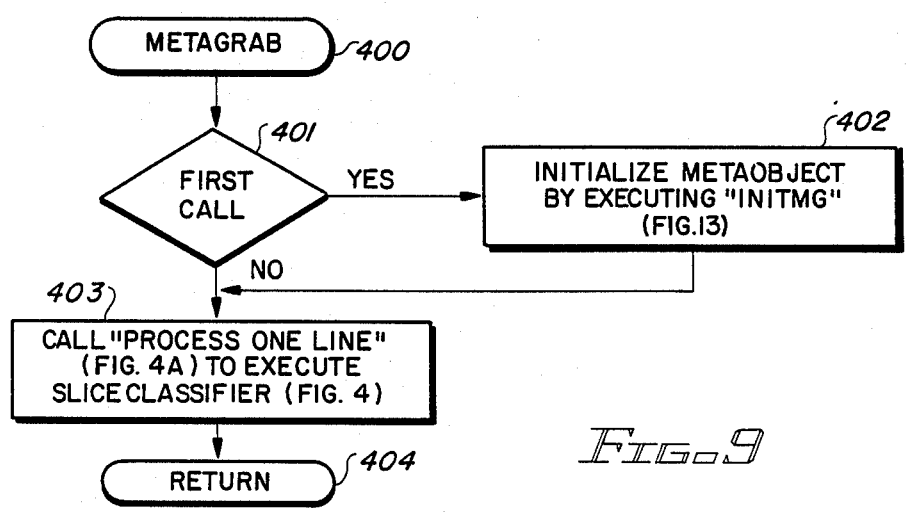
FIG. 9 is a flow diagram of a routine called METAGRAB which reconstructs a software object from filtered data of the object.

Referring next to FIG. 9, the flow chart of the subroutine METAGRAB is shown. This subroutine performs the function of "reconstructing" the "filtered" (by FILLHORIZ and FILLVERT) and "geometrically" reorganized data object in the form of a "directed graph" of the boundary of the data in the frame after horizontal and vertical holes have been filled and the correct left-to-right relationship (relative to the scanned image) between slices on the same scan line has been restored. The METAGRAB routine also converts all shapes or blobs having sufficiently linear sides into trapezoids, greatly reducing the amount of data required to represent "well behaved" objects.

The METAGRAB subroutine of FIG. 9 is entered at label 400 and goes to decision block 401 and determines if the present pass through METAGRAB is the first pass for the present object. If it is, the subroutine goes to block 402 and calls up an initialization subroutine INITMG to initialize the object to be reconstructed by generating an open list. The subroutine then returns to block 403. If the present pass is not the first pass, the subroutine goes to block 403, and calls the PROCESS ONE LINE subroutine of FIG. 4A, which in turn calls the CLASSIFIER subroutine of FIG. 4B and appropriate ones of its METAGRAB FCN subroutines to assemble columns of data headed by an open list header to represent the original image scanned. In block 402 the METAGRAB subroutine initializes its variables for the processing of one row of data. The METAGRAB subroutine is executed on a line-by-line basis following the line-by-line execution of FILLHORIZ and FILLVERT.

It should be noted that the data consisting of slice A and slice B move through the above-described decision blocks in a "data driven" fashion because the decision classifier tree of FIG. 4B is executed entirely on the basis of the relationship between slice A and slice B, as later explained with reference to the PROCESS ONE LINE subroutine of FIG. 4A.

Figure 9A:
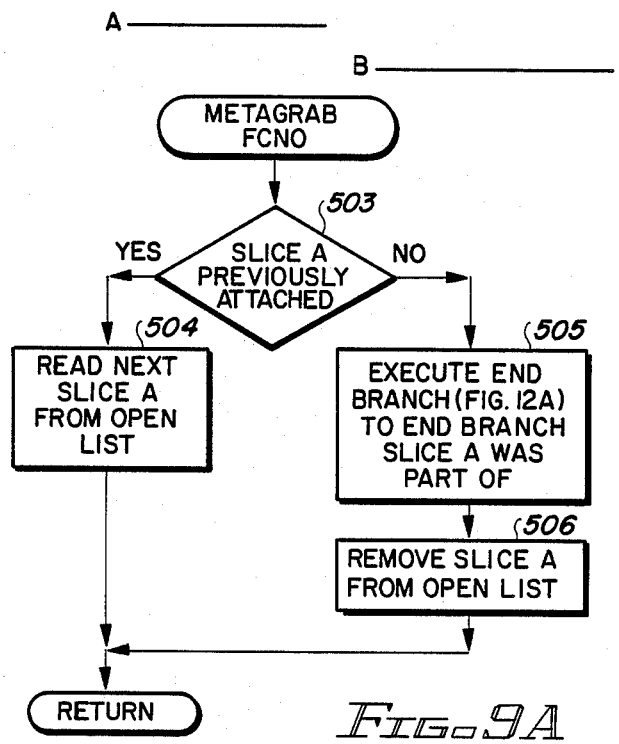

At this point, the METAGRAB FCN0-13 subroutines will be described with reference to FIGS. 9A-9L. If the decision tree classifier of FIG. 4 selects FCN0 when called by METAGRAB, decision block 503 of FIG. 9A is entered and a determination is made as to whether slice A was previously attached to any slice on the row of present slice B. If this determination is affirmative, the subroutine goes to block 504 and reads the next slice A from the open list and returns. Otherwise, the subroutine goes to block 505, executes the END BRANCH subroutine of FIG. 12A, and then removes slice A from the open list, as indicated in block 506, and returns to METAGRAB.

Figure 9C:
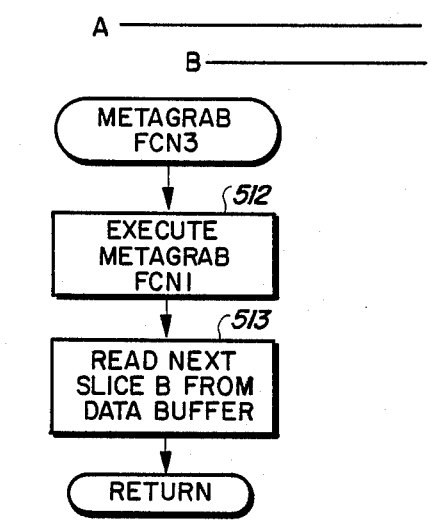
Figure 9B:
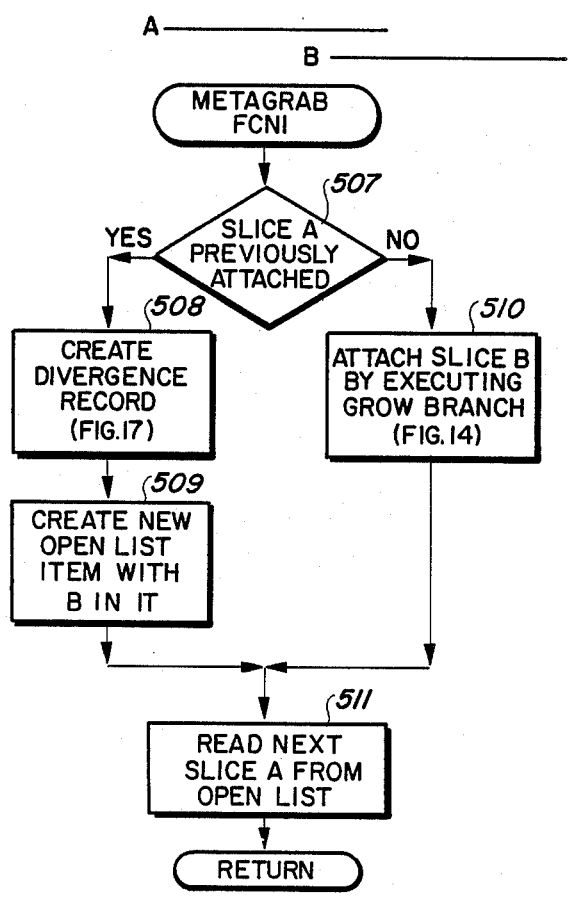

Referring to FIG. 9B, if METAGRAB FCN1 is selected, decision block 507 determines if slice A was previously attached, and if this is the case, creates a divergence record, as indicated in block 508, and creates a new open list node or item and inserts slice B therein, as indicated in block 509. If slice A was not previously attached, the subroutine goes to block 510 and grows the branch by attaching slice B to slice A. This is accomplished by executing the GROW BRANCH subroutine of FIG. 14. In any case, the subroutine reads the next slice A from the open list and returns to METAGRAB.

Figure 9D:
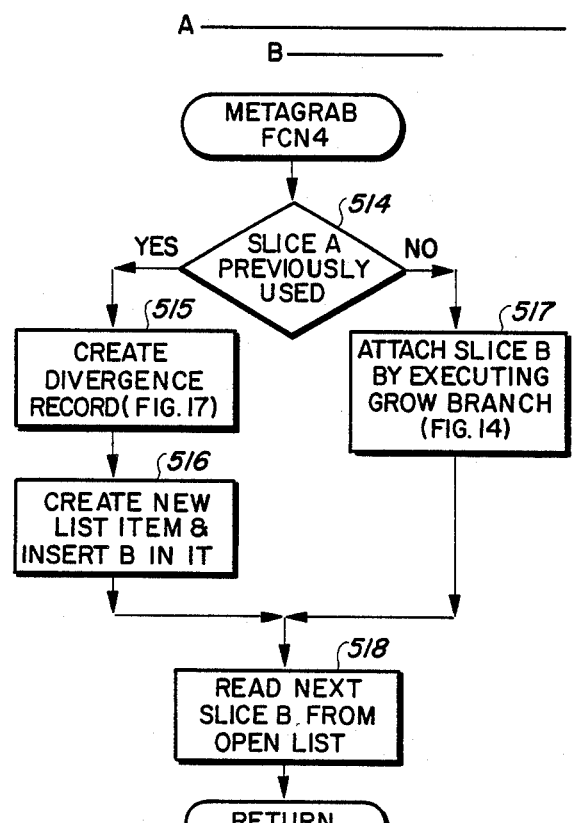
Figure 9I:
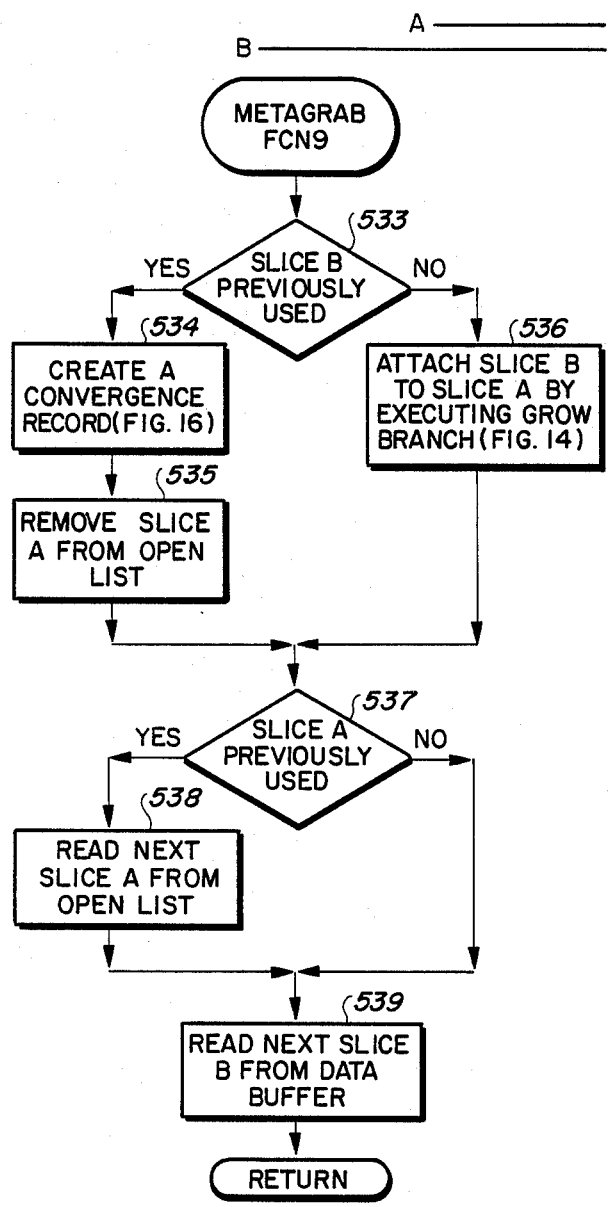
Figure 9J:
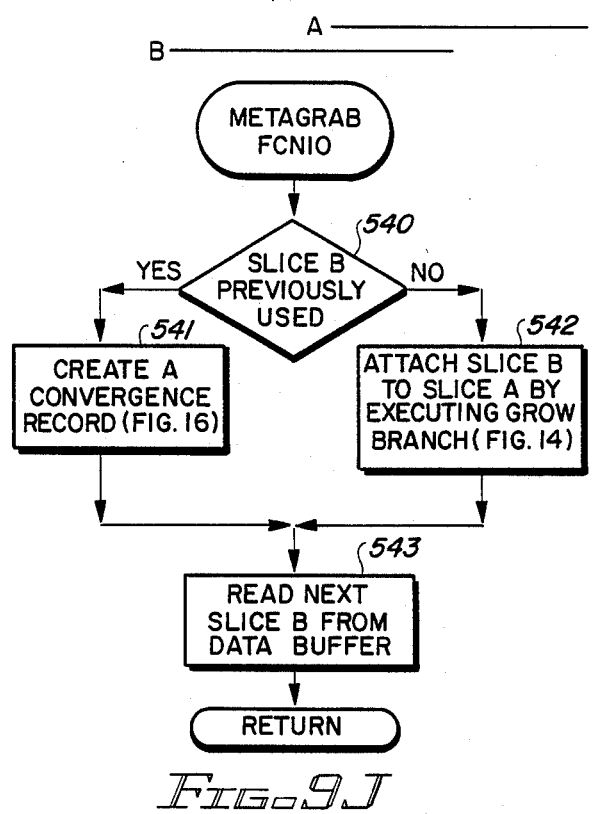
Figure 17:
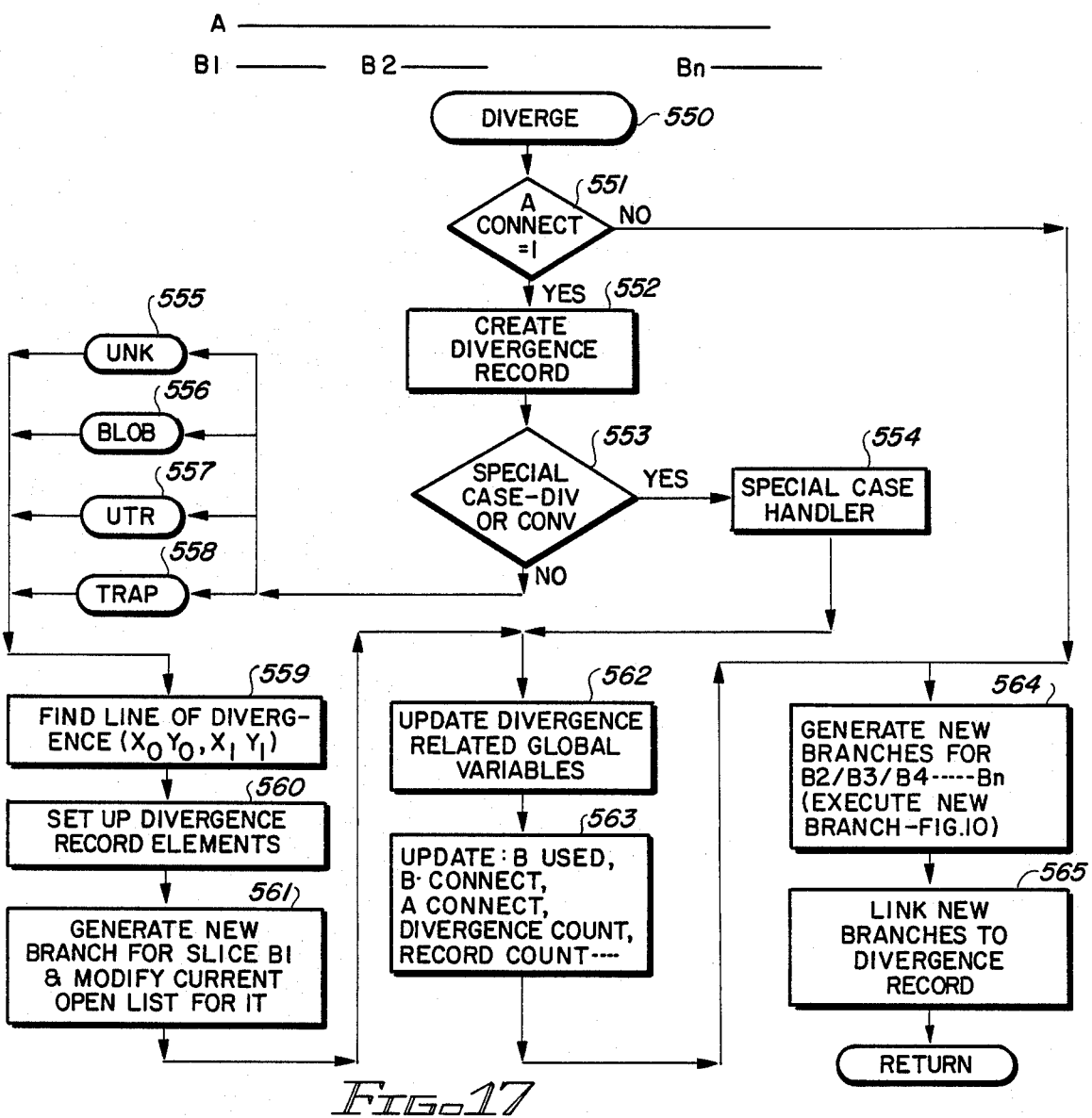
FIG. 17 is a flow chart of a subroutine called DIVERGE executed by the METAGRAB routine of FIG. 9. an open list node.

The subroutine of FIG. 17 is executed to create a divergence record in block 508 of FIG. 9B, 515 of FIG. 9D and the subroutine of FIG. 16 is executed to create a convergence record in block 527 of FIG. 9H, and block 541 of FIG. 9J, and block 534 of FIG. 9I.

Referring to FIG. 9C, if the METAGRAB FCN3 is selected, a subroutine essentially identical to METAGRAB FCN1 is executed, as indicated in block 512, and then the next slice B is read from the data buffer, which contains the next unused slice from the frame. The subroutine then returns to METAGRAB.

Referring to FIG. 9D, the METAGRAB FCN4 subroutine determines whether slice A was previously attached in decision block 514, and if this is the case, creates a divergence record, as indicated in block 515, and creates a new open list node and inserts slice B in it, as indicated in block 516, and then reads the next slice B from the open list.

If slice A was not previously attached, then the subroutine goes to block 517 and attaches slice B to slice A by growing the branch. This is done by executing the GROW BRANCH subroutine of FIG. 14. The subroutine then goes to block 518 and returns.

Referring to FIG. 9E, the METAGRAB FCN5 subroutine attaches slice B to slice A by executing GROW BRANCH, as indicated in block 519, and reads the next slice A from the open list, as indicated in block 520, and returns.

Referring to FIG. 9F, the METAGRAB FCN6 subroutine attaches slice B to slice A by executing GROW BRANCH as indicated in block 521, reads the next slice A, as indicated in block 522 and reads the next slice B from the data buffer, as indicated in block 523, and returns.

Referring to FIG. 9G, the METAGRAB FCN7 subroutine attaches slice B to slice A by means of GROW BRANCH, as indicated in block 524, and reads the next slice B, as indicated in block 525, and returns.

Referring to FIG. 9H, the METAGRA FCN8 subroutine determines whether slice B was previously attached to another slice on the same line. If so, a convergence record is created as in block 527, and slice A is removed from the open list, as indicated in block 528. The subroutine then goes to decision block 530. If slice B was not previously attached to another slice on the same line, slice B is attached to slice A by GROW BRANCH, as indicated in block 529, and the program then goes to decision block 530 Decision block 530 determines if slice A is attached to any slice B. If so, the subroutine reads the next slice A from the open list, as indicated in block 531, and returns. Otherwise, the subroutine just returns to METAGRAB.

Referring now to FIG. 9I, the METAGRAB FCN9 subroutine determines if slice B was previously attached in decision block 533, and if this determination is affirmative, creates a convergence record executing the subroutine of FIG. 16, as indicated in block 534, and removes slice A from the open list, as indicated in block 535, and then goes to decision block 537. If slice B was not previously attached, the subroutine grows the branch by attaching slice A to slice B, as indicated in block 536, and goes to decision block 537. Decision block 537 determines if slice A was previously attached, and if this is the case, reads the next slice A from the open list and goes to block 539. Otherwise the subroutine simply goes from decision block 537 to block 539 and reads the next slice B from the data buffer and returns.

Referring to FIG. 9J, the METAGRAB FCN10 subroutine determines if slice B was previously attached in decision block 540, and if this is the case, creates a convergence record by executing the subroutine of FIG. 16, and then goes to block 543 and reads the next slice B from the data buffer and returns If slice B was not previously attached, slice B is attached to slice A, as indicated in block 542. The subroutine then goes to block 543.

Figure 9K:
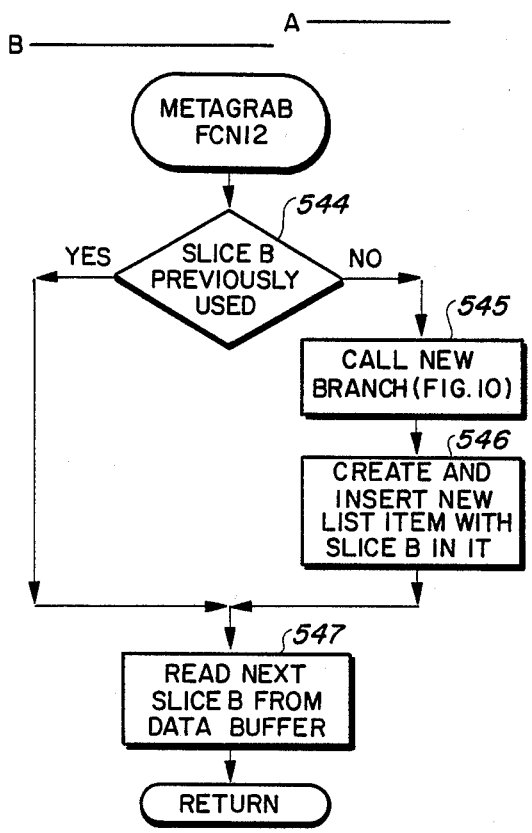

Referring to FIG. 9K, the METAGRAB FCN12 subroutine determines in decision block 544 if slice B was previously attached. If this is the case, the subroutine goes to block 547, reads the next slice B from the data buffer, and returns. Otherwise, the subroutine creates a new branch or node in the open list as indicated in block 545 by calling the subroutine of FIG. 11, and inserts slice B in it, as indicated in block 546. The subroutine then goes to block 547, and returns.

Figure 9L:
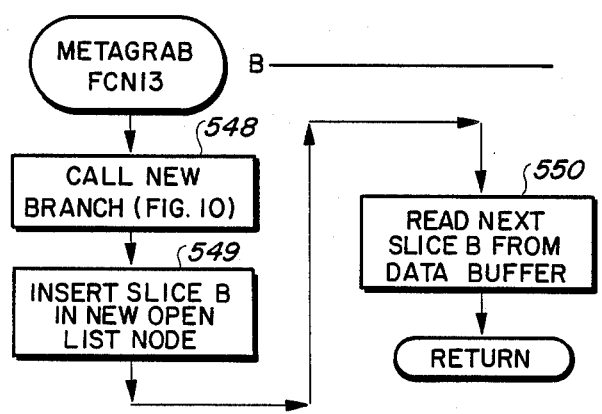
Figure 10:
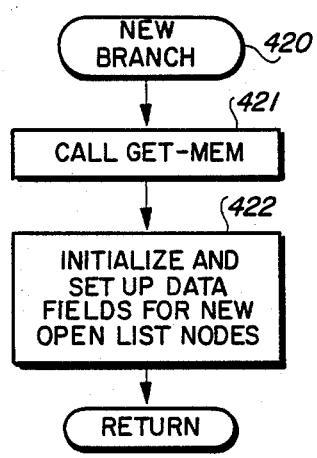
FIG. 10 is a flow chart of a subroutine called NEW BRANCH executed by the METAGRAB routine of FIG. 9.

Finally, in FIG. 9L, the METAGRAB FCN13 subroutine creates a new branch, as indicated in block 548, by executing the NEW BRANCH subroutine of FIG. 10, and then, in block 549, inserts slice B in the open list as a new open list node. More precisely, METAGRAB FCN13 appends a new open list node with slice B in it to the end of the open list. The program then reads the next slice B from the data buffer and returns to METAGRAB. Note that creating a new branch is different than creating a new open list node and inserting slice B in it in that a branch is a permanent part of the growing METAOBJECT, while the open list node that represents it is temporary and eventually will cease to exist and the memory required therefor will be reclaimed.

Referring now to FIG. 10, the program NEW BRANCH is entered via label 420. The NEW BRANCH subroutine is called up by METAGRAB as part of a special version of PROCESS ONE LINE subroutine of FIG. 4A that is called by METAGRAB. The NEW BRANCH subroutine creates a new branch record. Stated differently, the subroutine NEW BRANCH obtains an appropriate section of memory, in block 421, by executing an ordinary subroutine (not disclosed in detail) called GET MEM, and sets up certain data fields in the branch record.

Figure 11:
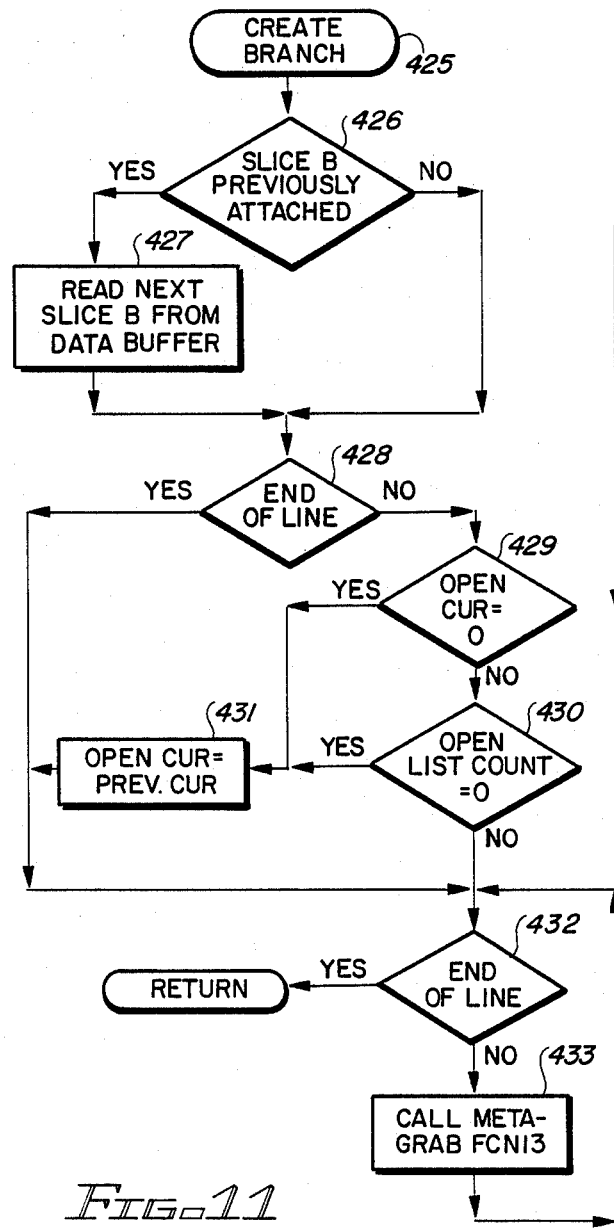
FIG. 11 is a flow chart of a subroutine called CREATE BRANCH executed by the METAGRAB routine of FIG. 9.

After the present scan line has been processed, the CREATE BRANCH subroutine of FIG. 11 is called as a part of a special version of the PROCESS ONE LINE subroutine of FIG. 4A, that is called METAGRAB. Blocks 650, 657, 658, and 659 of FIG. 4A correspond to blocks 426, 427, 428, and 433, respectively, Of FIG. 11. The purpose of CREATE BRANCH is to create a new branch for all of the unused B slices that are "left over" after finishing the scanning of a line of A slices from the open list header. The CREATE BRANCH subroutine of FIG. 11 goes from label 425 to decision block 426 and determines if the present slice B has been previously attached. If this determination is affirmative, it reads the next slice B from the data buffer as indicated in block 427. If the determination of decision block 426 is negative, the program goes to decision block 428, if the present slice B has not been previously attached to a slice A. Decision block 428 determines if the scanning is at the end of the present line yet. If this determination is affirmative, the subroutine goes to block 432, makes the same determination again, and returns to the calling routine. If the determination of decision block 428 is negative, the subroutine goes to decision block 429 and asks if an open cursor variable OPEN CUR is equal to 0 to determine if the subroutine is at the end of the open list. If this is the case. The subroutine goes to block 431 and sets OPEN CUR equal to a previous value called PREV CUR, and goes to decision block 432. If the determination of decision block 430 is negative, the subroutine goes to block 432 and obtains a negative determination, and therefore the subroutine goes to block 433 and calls METAGRAB FCN13, previously described. In either case, the subroutine then goes to decision block 432 and determines if the present slice B is at the end of the present scan line. If this determination is affirmative, the subroutine returns to the calling subroutine. Otherwise, the CREATE BRANCH subroutine calls the METAGRAB FCN13 subroutine of FIG. 9L and sets up the new node in the open list corresponding to slice B and a new branch record.

Figure 12:
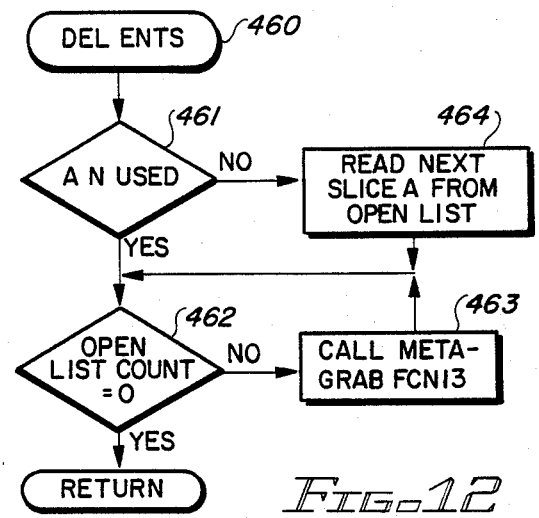
FIG. 12 is a flow chart of a subroutine called DEL ENTS executed by the METAGRAB routine of FIG. 9.

Referring now to FIG. 12, the DEL ENTS subroutine is part of the above-mentioned special version of the PROCESS ONE LINE subroutine of FIG. 4A that is called by METAGRAB. More specifically, blocks 662, 663, 664, and 664 of FIG. 4A correspond to blocks 461, 464, 465, and 463, respectively, of FIG. 12. The DEL ENTS subroutine is entered via label 460 after the last slice B of the present branch has been attached. The DEL ENTS subroutine goes to decision block 461 and determines if slice A is attached to another slice. If this determination is negative, the DEL ENTS subroutine goes to block 464 and reads the next slice A from the open list. In either case, the subroutine then goes to decision block 412 and determines if a variable OPEN LIST COUNT is 0. (Control of the DEL ENTS subroutine is accomplished by count down of OPEN LIST COUNT from an initial value to 0.) If this determination is affirmative, the subroutine returns to the calling routine, but otherwise goes to block 463 and calls the above-described METAGRAB FCN13 subroutine of FIG. 9L.

Figure 12A:
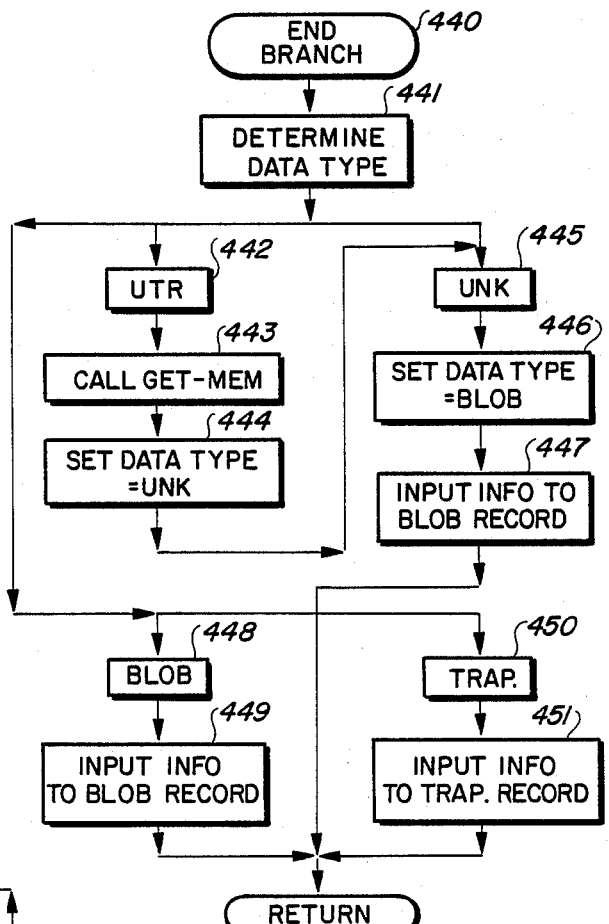
FIG. 12A is a flow chart of a subroutine called END BRANCH executed by the METAGRAB routine of FIG. 9.

Referring now to FIG. 12A, the END BRANCH subroutine is entered at block 440. This subroutine is called by METAGRAB FCN0 subroutine of FIG. 9A and by the DEL ENT (delete entities) subroutine of FIG. 12. The END BRANCH subroutine goes into block 441 and determines if the present data type of the branch being ended is a "unknown trapezoid", an "unknown type", a blob, or a trapezoid in the same manner as in the GROW BRANCH subroutine of FIG. 14. If the type of the present branch is an unknown trapezoid (UTR), the subroutine goes through label 442 to block 443 and executes a subroutine GET MEM to make available a 64 byte section of memory, and sets the data type of the branch being ended to UNK, and goes to label 445

If the situation is that the data type of the present branch is an unknown type, the program goes to block 446 and sets the data type as a blob, meaning that all slices in the present branch must be stored in the record. The program then goes to block 447 and inputs the slices of the present branch into the blob record being completed. The program then returns to the calling subroutine. If the situation is that it is determined in block 441 that the present branch being ended is a blob, the end branch subroutine goes via label 448 to block 449, and inputs the data of the present branch into the blob record being completed. If it is determined in block 441 that the data type of the present branch is a trapezoid, the subroutine goes via label 450 to block 451, and enters the last two corner points of the trapezoid into the trapezoid record being completed, and returns.

Referring next to FIG. 13, the INITMG subroutine is called by block 402 of the METAGRAB subroutine of FIG. 9 and goes through label 470 to block 471. The purpose of the INITMG subroutine is to properly initialize the open list node, the frame and the "metaobject header record". Once the data structures are properly initialized, the subroutines operate in a "data driven" mode, without the need to search the memory to find each new slice as the metaobject is built.

In block 471, the subroutine clears the local RAM areas for the variables used in the METAGRAB subroutine of FIG. 9. The local variables then are initialized, as indicated in block 472. The subroutine then goes to block 473 and reads the next slice B from the data buffer. The program then goes to block 474 and sets up a new 64 byte section of memory in which to create a new record for the metaobject header record, and goes to block 475. In block 475 the subroutine sets up the metaobject header record, which includes pointers to the beginnings of the different branches of the object after the metaobject has been created by the METAGRAB subroutine of FIG. 9. Then all access to the metaobject will be through the metaobject header record.

Next, the INITMG subroutine goes to decision block 476 and determines if the first line executed by the METAGRAB subroutine of FIG. 9 has been completed. This is necessary because the INITMG procedure is only executed during the first line. If the determination of decision block 476 is affirmative, the subroutine goes to block 481 and writes the present metaobject header count (i.e., the number of branches on open list nodes) into the metaobject header record. Then the subroutine goes to block 482 and inputs the header record address into a variable location called MOB PTR (metaobject pointer). The program then returns to the calling subroutine.

If the determination of decision block 476 is negative, the program goes to block 477 and updates the metaobject header counter. The program then calls the NEW BRANCH subroutine of FIG. 10, executes it to make a new branch record, goes to block 479 and calls the subroutine INS OPL that inserts a new node into the open list, and then reads the next slice B from the data buffer, as indicated in block 480, and returns to decision block 476. This is repeated until the end of the first line.

Thus, the subroutine INITMG creates new branches and open list nodes for all existing slices in the first row of the frame input from the METACTRL subroutine of FIG. 21, and also sets up the metaobject header.

Figure 14A:
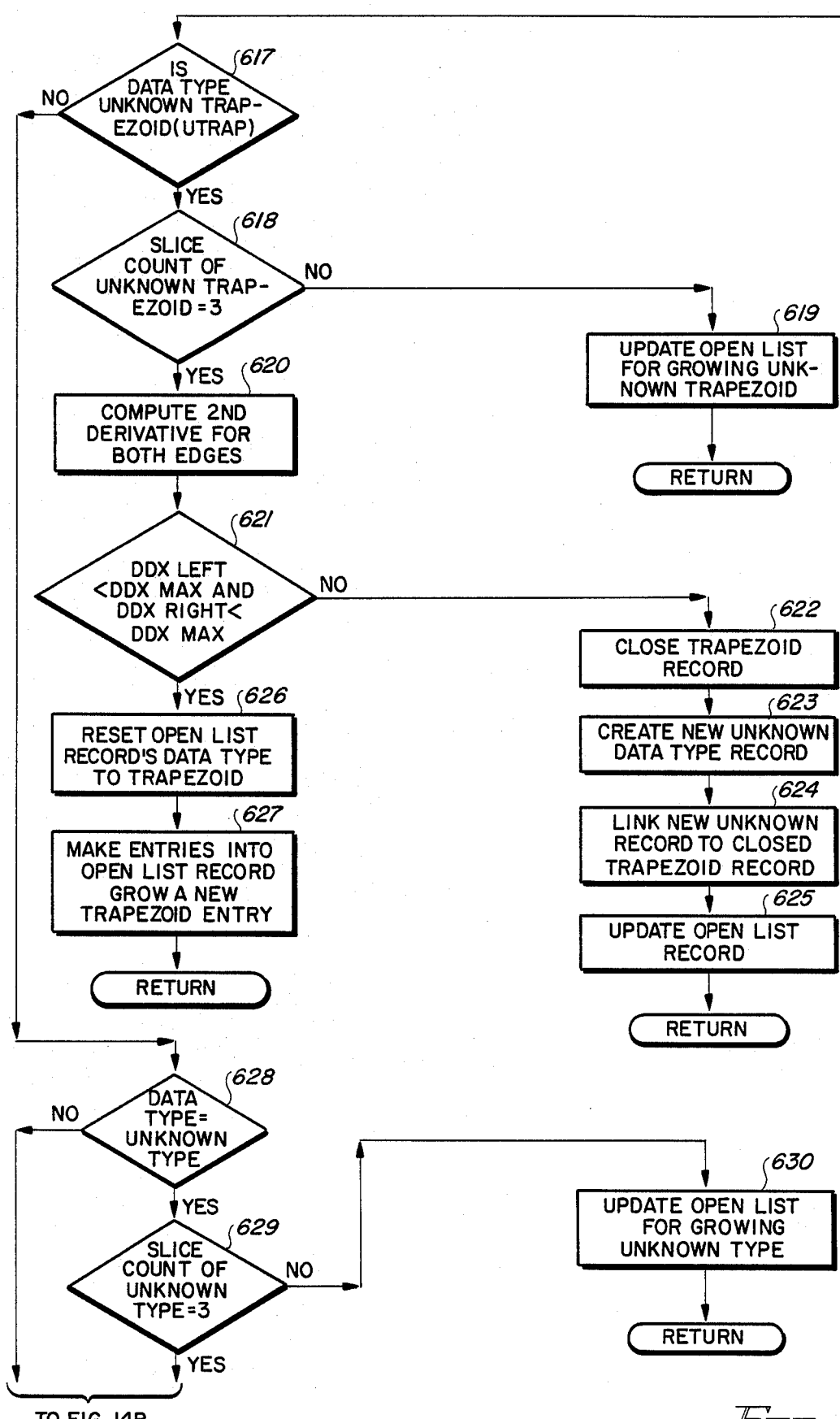
Figure 14B:
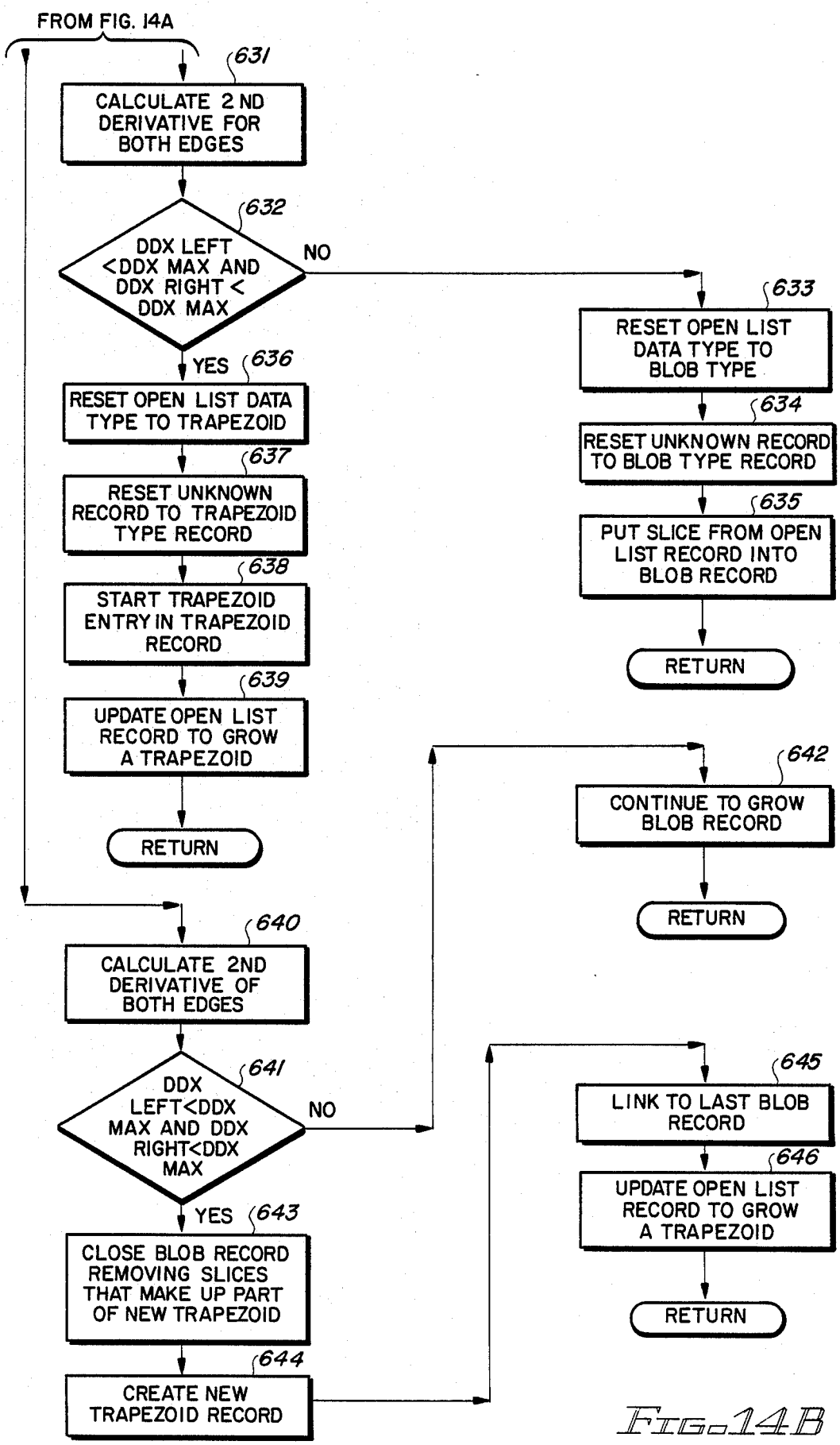

Referring next to FIGS. 14, 14A and 14B, the GROW BRANCH subroutine called by METAGRAB as explained above is entered at label 600 of FIG. 14 and goes first to block 601 In block 601 GROW BRANCH sets a slice B flag called B USED to a "1", and goes to block 602 where a slice A flag called A USED is set to a "1". The program then goes to block 603 and increments a "connect counter" associated with slice B, i.e., setting B CONNECT to B CONNECT+1. The subroutine then goes to block 604 and increments the connect counter A CONNECT by setting it equal to A CONNECT+1.

It should be appreciated that in a branch of the "metaobject" or directed graph being built by METAGRAB, slice A, which is the most recent slice of the open list of the frame, has to be connected to something, namely a node of the open list, and the most recently read slice B. which has been obtained from the input buffer, is the "next" slice on the present line of the object previously built by OBGRAB.

The first four steps of blocks 601–604 correspond to this situation, because when convergences and divergences occur, the state of the connectivities of the A slices and B slices must be known. The slice A connect counter and the slice B connect counter represents such connectivities. The counters being referred to record how many branches converge into a convergence and diverge from a divergence.

The GROW BRANCH subroutine goes from block 604 to decision block 605 and tests a variable called DATA TYPE to see if it has assigned to it a code indicating that the present branch is a trapezoid. If this determination is negative, GROW BRANCH goes to block 617. If the present growing branch is a trapezoid, the program goes to decision block 606, the purpose of which is to quickly determine if there has been a sudden occurrence of a "corner" in the boundary of the growing branch.

Decision block 606 accomplishes this by taking the absolute value of the change in the length of slices A and B. If it is not less than a predetermined constant it means there is a sharp change in one boundary of the growing shape, and a present trapezoid must end.

If that is the case, the program goes into blocks 608–611 and ends the current trapezoid record, creates a new unknown type record in block 609, links the new unknown record to the closed trapezoid record from which the new unknown type record is growing, as indicated in block 610, and updates the open list record.

That is, in block 610 the program creates an address pointer that shows that the new record is a continuation of the trapezoid. Then the program updates the open list record, in block 611, meaning that it sets the data type to "unknown type" (UNK) The open list node of the new unknown shape is the same as for the trapezoid to which it is connected. After block 611, the GROW BRANCH subroutine returns to the calling routine.

If the test of decision block 606 is affirmative, the program goes to decision block 607 and checks to determine if the edges of the growing shape which is now known to still be a trapezoid are "well behaved" in that the first derivatives of their edges are less than a predetermined value. If this determination is negative, the program goes to previously-described block 608. If the determination of decision block 607 is affirmative, the program goes to block 612. In decision block 612 the program determines if the second derivatives of the front and rear edges of the growing trapezoids are less than a predetermined value, and if they are not the program goes to blocks 613 to end the growing trapezoid entry and continue growth of the present trapezoid, as indicated in block 614. In this particular case, the present trapezoid passed the first derivative test, and only failed the second derivative test, so its edges are not changing radically, but they are changing so there is a good likelihood that its boundaries are still sufficiently well behaved that it can continued to be represented as another trapezoid. So the initial growing trapezoid is ended and another "continuing" trapezoid extends from the first one. The grow branch routine then returns to the calling routine.

If the determination of decision block 612 is affirmative, the program goes to block 615 and updates the open list record, which means that the same trapezoid is being continued by storing the present slice information in it so that next time the program gets the next A slice it will be the present slice. i.e., the two ends of the current B slice will be the next A slice in the present open list node.

Updating the open list record in block 615 also includes storing ΔX, the change in the X coordinate of the growing trapezoid for each new B slice that is stored for the presently growing branch.

If the determination of decision block 605 was that the present data type is not a trapezoid, the program goes to decision block 617 and determines if the data type is an "unknown trapezoid" (UTRAP). If this determination is negative, the program goes to decision block 628, because the present data type is an unknown type (UNK). If the present data type is an unknown trapezoid, as determined in decision block 617, the program goes to decision block 618 and determines if the slice count of the unknown trapezoid is equal to 3. If the slice count of the unknown trapezoid is less than 3, the determination of decision block 618 is negative, and he program goes to block 619 and updates the open list for a growing unknown trapezoid and returns to the calling subroutine.

If the slice count of the unknown trapezoid is 3, as determined in decision block 618, then the program goes to block 620 and computes the second derivative for both the leading and trailing edge of the unknown trapezoid. The GROW BRANCH subroutine then goes to decision block 621 and determines whether the second derivative of the left edge is less than a predetermined limit and also determines if the second derivative of the right edge is less than a predetermined limit. In essence, decision block 621 determines if the growing unknown trapezoid has well behaved leading and trailing edges. If this determination is negative, GROW BRANCH goes to block 622 and closes the trapezoid record, then in block 623 creates a new "unknown data type" record, goes to block 624 and links the new unknown record to the closed trapezoid record by creating a pointer between the new unknown data type record and the closed trapezoid record. Then, in block 625 GROW BRANCH updates the open list record and returns to the calling routine.

If the determination of decision block 621 is affirmative, the program goes to block 626 and resets the open list records to indicate that the growing unknown trapezoid is actually a known trapezoid. The program then goes to block 627 and makes entries into the open list record necessary to continue growth of a new trapezoid, and returns to the calling routine.

If decision block 617 determines that the data type of the presently growing branch is an "unknown type", GROW BRANCH goes to decision block 628 and determines if the data type is an unknown type. If this determination is affirmative, the routine goes to decision block 629 and determines if the slice count of the unknown type is equal to 3. If it is less than 3, the program goes to block 630 and updates the open list to indicate that the growing branch is an unknown type, and returns to the calling subroutine If the slice count of the unknown type is determined by decision block 629 to be equal to 3, the program goes to block 631 and computes the second derivative of both the front and rear edges, and goes to decision block 632 and tests those derivatives to determine if they are both less than certain predetermined limits, to thereby determine if the front and rear edges of the unknown growing shape of the present branch are "well behaved". If this determination is negative, the program goes to block 633, resets the open list data type to indicate that the present shape is a blob, and, in block 634 resets the unknown record to indicate that the growing shape of the present branch is a blob.

The program then goes to block 635 and puts the slice from the open list record into the blob record, and returns to the calling routine. If the edges are determined in decision block 632 to be well behaved, the program goes to block 636, resets the open list data type to indicate that the growing shape is a trapezoid and goes to block 637. In block 637 GROW BRANCH resets the unknown record to be a trapezoid record, and then, in block 638, begins a trapezoid entry in the trapezoid record reset in block 637. The program then updates the open list record to grow a trapezoid, as indicated in block, 639, and returns to the calling routine.

If in block 628 it was determined that the data type was unknown, the only possibility remaining is that the shape of the lowest portion of the presently growing branch is a blob, and GROW BRANCH in this event goes to block 640 and computes the second derivative of the front and rear edges of that branch, and then goes to decision block 641 and it determines if those two second derivatives are both less than a predetermined limit to determine if the front and rear edges are "well behaved" If they are not, the program goes to block 642 and adds slice B to the growing blob record. If the determination of decision block 641 is affirmative, it means that the blob edges are straightening out, so the blob record is closed, as indicated in block 643, and slices in the blob record that can make up part of a new trapezoid are removed. The program then goes to block 644 and creates a new trapezoid record, goes to block 645, and links the new trapezoid record to the prior blob record by creating an address pointer in the new trapezoid record to the last blob, and then goes to block 646 and updates the open list record to facilitate growing the new trapezoid. The program then returns to the calling routine.

To summarize the GROW BRANCH subroutine, the trapezoids that accurately and efficiently describe the boundaries of the metaobjects created by META-GRAB are created The manner in which the trapezoids are "recognized" is by "monitoring" both the left and right boundaries of a growing branch of the METAOBJECT being created for nonlinear regions. As long as both boundaries are behaving quite linearly, GROW BRANCH causes the trapezoid to continue to grow. When either the front edge boundary or rear edge boundary behaves sufficiently nonlinearly, the present boundary coordinates, i.e., the end points of the current slices which form the growing ends of the front and rear edges, are recorded as the bottom of the trapezoid. The linearity of the front and rear edge boundaries of the growing branch are monitored by (1) computing and testing the change in length between attached slices of the growing branch, (2) computing the cumulative instantaneous second derivative given by the equation $$\Delta^2 X = \Delta X(MAX) - \Delta X(MIN),$$

and (3) computing the cumulative low frequency derivative given by the equation $$\Delta^2 X = \sum_{i=1}^{n} \Delta X = \sum_{1=n+1}^{2n} \Delta X.$$

If the front and rear edge boundaries both satisfy preselected maximum limits for the foregoing three tests, then both edges are considered to be linear, and the branch continues to be a growing trapezoid. Present limits for the change in length of test (1) are about 10 to 15 pixels for the edge to be considered linear. Present limits for the second derivative of test (2) are 2 to 3 pixels for the edge to be considered linear. The limits of test (3) are still under experimentation.

The subroutine used to check the second derivatives of the front and rear edges of the growing branch is called DX-DDX, and is shown in FIG. 15. This subroutine finds the minimum and maximum value of DX0, which is the row to row change in the X coordinate of the front or left edge of the shape and DX1, which is the row to row change in the rear or right edge of the growing branch. The value of the second derivative of the front edge is DDX0, which is $DX0_{MAX} - DX_{MIN}$. The second derivative of the rear edge of the growing branch is DDX1, and is equal to $DX1_{MAX} - DX1_{MIN}$.

The DX-DDX subroutine of FIG. 15 can be entered via labels 520, 522, or 524, depending upon which operation is presently needed. In block 521, all of the first derivatives are computed and stored in a "global table", so that the routines calling DD-DDX and have access to these results. Block 523 of FIG. 15 computes the minimum and maximum values of the first derivatives. In block 525 of FIG. 15, the overall minimum value of DX0 and the overall maximum value of DX0 are computed and stored, and similarly, the overall minimum and maximum values of DX1 are computed and stored. The second derivatives are computed as the difference between the overall maximum and minimum values of DX0. The second derivative D5, of the rear edge of the growing branch, is the difference between the maximum and minimum values of DX1.

Referring next to FIG. 16, the CONVERGE subroutine called by the METAGRAB FCN8-10 subroutines is entered via label 530, and goes to decision block 531. The subroutine is called when the present slice B is attached to more than one slice A of the present open list node.

Block 531 determines if a variable called B CONNECT is equal to "1". If this determination is affirmative, it means that a convergence record has not yet been created because B must be connected at least twice to be a convergence. If B CONNECT is not equal to "1", the CONVERGENCE subroutine goes to block 543 and updates variables called A CONNECT, B CONNECT, CONVERGENCE COUNT, and various other counters. The subroutine then goes to block 544 and closes the branch records for all of the branches connected to the present convergence created by slice B, and links those branches to the present convergence record, and then returns to the calling subroutine.

If B CONNECT is equal to "1", the subroutine goes to block 532 and creates a new convergence record, and goes to block 533.

If the determination of decision block 533 is affirmative, the subroutine goes to block 534 and performs a "special case" subroutine, the special case being that if A1 is a convergence or divergence slice; then the present convergence record is linked to that convergence or divergence slice.

If the determination of decision block 533 is negative, the CONVERGE subroutine performs a classification function on the branch data type corresponding to the previous slice A and indicates whether the previous shape is an unknown type (UNK), a blob (BLOB), an unknown trapezoid (UTR), or a trapezoid (TRAP). The subroutine then goes to block 539 and finds the end points of the line of convergence for slice B. The subroutine then goes to block 540 and sets up convergence record fields, and then goes to block 541 and generates a new branch for the last slice, slice B, and modifies the open list record for the new branch. The program then goes to block 542 and updates the convergence record variables, goes to block 543 and updates A CONNECTED, B CONNECTED, CONVERGENCE COUNT, and RECORD COUNT, and goes to block 544 and ends that branch according to what type it is by executing END BRANCH, FIG. 12A.

Referring next to FIG. 17, the DIVERGE subroutine called by the METAGRAB FCN1, 3, and 4 subroutines is entered via label 550, and goes to decision block 551 and determines if A CONNECT is equal to a "1". If A CONNECT is equal to 1, this means that the divergence has just occurred, since slice A has only been connected once. Therefore, special actions must be taken, including creating a divergence record, as in block 552.

If A CONNECT is not equal to a "1", the DIVERGE subroutine goes to block 565 and generates a new branch by executing NEW BRANCH for the next B1, B2, etc., and returns.

If A CONNECT is equal to a "1", it means the divergence has just begun and the subroutine creates a divergence record in block 552. Creating a divergence record involves obtaining a 64 byte record from available memory (by executing a subroutine called GET MEM) and formatting it. Then the program goes to block 553 and determines if the previous slice B was of a convergent record. If the determination of decision block 553 is affirmative, the program goes to block 554 and performs the function of linking the present divergence record to the previous convergent record, and then goes to block 562.

If the determination of block 553 is negative, the program classifies the previous branch (corresponding to the previous slice B) into one of the categories UNK, BLOB, UTR, OR TRAP, as indicated in by reference numerals 555, 556, 557, and 558, respectively, and ultimately (in block 565) generates a new branch with the current slice B in it by executing NEW BRANCH (FIG. 10).

The DIVERGE subroutine then goes to block 559 and finds the end points of the line of divergence constituted by slice A, and then initializes the divergence record elements, as indicated in block 560. The subroutine then goes to block 561 and generates a new branch for slice B1 and modifies the current open list accordingly. (The other slices B3 . . . BN are dealt with on other calls to the DIVERGE subroutine.) The subroutine then goes to block 62, and updates the various divergence related global pointers and counters. The subroutine then goes on to block 563, updates B USED, A CONNECT, B CONNECT, DIVERGENCE COUNT, RECORD COUNT, and then goes to block 565 and generates a new branch with slice B2 in it by executing NEW BRANCH, FIG. 10.

As mentioned above, the METACTRL subroutine of FIG. 20 coordinates the operation of the above-described FILLFRAME, FILLHORIZ, FILLVERT, AND METAGRAB subroutines. The METACTRL subroutine is entered via label 350, goes to block 351, and executes the FILLFRAME subroutine of FIG. 7 to fill the entire frame. After the frame is filled, the METACTRL subroutine goes to block 352 and executes FILLHORIZ for the first row of the frame, deleting any gaps between slices of the same row that are closer than, say, three or four pixels apart. (Executing FILLFRAME in essence "pours" the slices of the object built by the OBGRAB routine of FIG. 4A into the frame, in such a manner that the proper left to right arrangement of all of the branches and the proper vertical arrangements of slices in all of the branches corresponds to the geometry of the originally scanned objects on the document.)

The METACTRL subroutine then goes to block 353 and executes the FILLHORIZ subroutine for row 1 of the frame, again filling any insignificant three or four pixel wide gaps. Next, the subroutine goes to block 354 and initializes the FILLVERT subroutine of FIG. 8, and then initializes the METAGRAB subroutine of FIG. 9 in block 355. Initializing of FILLVERT and METAGRAB is performed for each object, as there are various global variables that must be set. The open list must be started so as to include the first row of the object. For both FILLVERT and METAGRAB there are separate entry points for initialization. For METAGRAB, the object header record is started. The METACTRL subroutine synchronizes FILLFRAME, FILLHORIZ, FILLVERT, and METAGRAB. The METCTRL subroutine first takes enough of the data from the object built by OBGRAB to completely fill the present frame up, all in one step.

When that is accomplished, METACTRL begins at the top of the filled frame and goes through and calls up, in a synchronized fashion, on a line-by-line basis, the subroutines FILLHORIZ, FILLVERT, and METAGRAB in the manner described below. The described technique has the advantage of reducing the need to use separate loops for each of those functions and results in a substantial savings in the amount of memory space required and in an increase in the speed.

Next, the METACTRL subroutine goes to block 356 and executes the FILLVERT subroutine of FIG. 8 for row 1 of the frame. Thus, it can be seen that METACTRL effectuates filling the frame and eliminates all insignificant horizontal and vertical gaps, a line at a time, just ahead of and in synchronization with the METAGRAB process.

The METACTRL subroutine then moves from block 356 to decision block 357 and determines if any more of the present object remains to be processed.

Note that FILLHORIZ needs to be executed for each row of the frame before FILLVERT in order to achieve optimum effect of the FILLVERT subroutine. Initializing METAGRAB in block 355 simply means that the object header record needs to be created and the open list initialized to contain the slices of row 0 and the global variables initialized. Once this initialization is done, the METACTRL subroutine goes to decision block 357 and determines if any more of the object remains to be processed. This is determined by a counter that initially stores the height of the object and is decremented as the object is processed. If the object is completely processed in the present frame, the subroutine returns via label 359.

Otherwise, the subroutine goes to decision block 358 and determines if more of the present frame remains to be processed. If this determination is negative, the subroutine goes to block 363 and executes FILLFRAME for the next frame, and returns to decision block 357. If the determination of decision block 358 is affirmative, the program goes to block 360, fills horizontal gaps for a row, fills vertical gaps for a row of the frame, as indicated in block 361, and executes METAGRAB, as indicated in block 362. The METAGRAB subroutine will always be a predetermined number of rows behind the FILLHORIZ and FILLVERT subroutines, so that METAGRAB only operates on "filtered" data. After METAGRAB has been executed, the METACTRL subroutine returns to decision block 358.

Thus, it can be seen that the METAGRAB subroutine, operating on data taken from the object created by OBGRAB and entered into the frame and filtered to eliminate any insignificant horizontal and vertical gaps, results in "reconstruction" of a directed graph of the object produced by OBGRAB that is faithful to the topology of the object scanned from the original document and which requires vastly less data to represent the object.

This "metaobject" produced by the METAGRAB subroutine is in the form of blob records, trapezoid records, convergence records, and divergence records that can be readily used by the vectorization program described in the above-referenced copending application without the need for a tremendous amount of data for storing the object and without the need to utilize a lot of computer time searching memory to obtain sliced data as it is needed in the vector generating process.

The approach taken to processing of runlength data and vectorization described above and in the copending Louis Lien application is substantially different than that described in the closest prior art known to us, which is the Okamoto article. The Okamoto article does not approach vectorization from a "global" perspective in which the global geometry of the visible image being scanned is preserved throughout the processing of the runlength data and vectorization thereof. Instead of assuming that accurate vectorization of the image can occur based on local conditions using a complex set of syntactic rules, the present application and the copending Louis Lien application first sort the runlengths into "macroscopic" objects that are visible and understandable as boundaries which are visible and understandable to the human eye, in the form of a linked list of linked lists, the boundaries of which are meaningful. This is performed by the object grabber subroutine OBGRAB. Then, "high frequency" meaningless microscopic "glitches" in the runlength data are filtered out so that the actual resulting boundaries of the directed graph or metaobject reconstructed from the object or list of linked lists produced by the OBGRAB routine closely match what the human eye perceives as the originally scanned image. This separated, clean and smooth macroscpic "metaobject" has its boundaries reduced to the vertices of trapezoids all linked together in a directed graph which directly represents the topology of the macroscopic object produced by the METAGRAB routine. This boundary encoding and compression is achieved by three simple tests that check variations in slice lengths of a growing branch, tests of the first derivative, and tests of the second derivatives, as opposed to the hundreds of syntactic tests used by the Okamoto approach. We have found that the foregoing boundary encoding preserves the topology of the object scanned while vastly decreasing the processing required by the subsequent vectorization program.

The improvements of the present invention include much higher accuracy, higher speed representation of raw runlength data with lower memory requirements than previously has been achievable.

While the invention has been described with reference to a particular embodiment thereof, those skilled in the art will be able to make various modfications to the described invention without departing from the true spirit and scope thereof. It is intended that all techniques which are equivalent to those described herein in that they perform substantially the same function in substantially the same way to achieve the same result are within the scope of the invention.

Attached hereto is Appendix A, containing printouts of programs corresponding to the flow charts of the above figures.

APPENDIX A

OBJECT GRABBER

```
OBJGRAB    IDNT    3,10

****************************************************************************
*
*          MODULE NAME:   OBJGRAB.SA              (C) COPYRIGHT 1986 GTX CORP
*
*          REVISION HISTORY       V
*                                 E R
*                                 R E
*          AUTHOR       DATE      S V  - ADD CHANGES TO THE TOP
*          ------       ----      ---  ---------------------------------------
*          A. LAI       10/21/86  3.10- New scheme for releasing Raw Run-length
*          A. LAI       10/03/86  3.9 - Clear task flag before done flag
*          A. LAI       09/26/86  3.8 - Ignor object with linear size < 3 pixels
*          A. LAI       06/19/86  3.7 - Review entire OBJGRAB alogrithm and
*          A. LAI       06/01/86  3.6 - Fix bug when object is put to JOBQ or
*          L.MISH       04/25/86  3.5 - Correct YEND in column header
*          A. LAI       04/17/86  3.4 - Use GET64 of ADR system
*          A. LAI       04/11/86  3.3 - New Memory Managment Mechanism
*          A. LAI       04/11/86  3.2 - Add Graphic Capability
*          A. LAI       04/26/86  3.1 - Release the Raw Run Length Space
*          A. LAI       03/25/86  2,3 - Fix bugs in calculating mass,xcomp,ycomp
*          L.MISH       03/20/86  2,2 - Release noise object not put on job queue
*          L.MISH       03/18/86  2,1 - Initialize local variable space
*          L.MISH       03/11/86  2,0 - Change to run with multiple processors
*          L.MISH       02/13/86  1,4 - .TESTABT each col instead of each object
*          L.MISH       12/29/85  1,3 - Comments & data length suffixes
*          J.ROYE       12/26/85  1,2 - 68020 layout & 8 way connectivity
*          J.ROYE       12/06/85  0,? - Demo #1
*
*          MODULE DESCRIPTION:
*
*            ENTRY CONDITIONS:
*
*            EXIT CONDITIONS:
*
*               REGISTERS USED
*            0  1  2  3  4  5  6  7
*            -------------------------
*          A !                     !
*            -------------------------
```

```
*          D !
*          -------------------------------
*                  * = DESTROYED
*                  O = REGISTER USED BUT PRESERVED
*                  E = ENTRY PARAMETER - PRESERVED
*                  B = ENTRY PARAMETER & RETURN VALUE
*                  R = RETURN VALUE
*          NOTES:  USE A.CF OBJGRAB TO ASSEMBLE
*
************************************************************************
           TTL       ADR OBJECT GRABBER
GRAPH      EQU       0
TARGET     EQU       1
           PAGE
           XDEF      OBGRAB

XREF      .RAWRUN,.OGDONE,.NUMOBJ,.OBJRAM
           XREF      .P1STAT,.PRCNUM,.TASKS,OBJREL,.ABRTF,.ABRTPRC
           XREF      GET64,.QJOB,.SYSQ

INCLUDE   RELEASE
           PAGE
.SETFLTR   EQU       1
REC_LEN    EQU       64
SLICE_CN   EQU       8
REL_MAX    EQU       16

OFFSET    4
HEAD       DS.L      1
TAIL       DS.L      1
MASS       DS.L      1
XCOMP      DS.L      1
YCOMP      DS.L      1
XMIN       DS.W      1
XMAX       DS.W      1
YMIN       DS.W      1
YMAX       DS.W      1
VCNT       DS.W      1
HOLES      DS.W      1
OPNCNT     DS.W      1

OFFSET    4
HORIZ      DS.L      1
YSTART     DS.W      1
YEND       DS.W      1
RUN_TAIL   DS.L      4
S_SLICE    DS.L      9

OFFSET    4
OPEN_A1    DS.L      1
OPEN_A2    DS.L      1
SL_REC     DS.L      1
SL_CNT     DS.L      1
SL_PTR     DS.L      1
OBJ        DS.L      1
COL_PTR    DS.L      1

OFFSET    0
OPEN_CUR   DS.L      1
PREV_CUR   DS.L      1
C_OPENCT   DS.L      1
OPEN_CNT   DS.L      1
A.1        DS.L      1
A.2        DS.L      1
B.1        DS.L      1
B1.W       EQU       B.1+2
B.2        DS.L      1
B2.W       EQU       B.2+2
B_LENGTH   DS.L      1
BLEN.W     EQU       B_LENGTH+2
ROW        DS.L      1
ROW.W      EQU       ROW+2
A_OBJ      DS.L      1
B_OBJ      DS.L      1
OPEN_HD    DS.L      1
```

```
         RUN_LEN    DS.L    1
         A_N_USED   DS.B    1
         B_USED     DS.B    1
         EOF        DS.B    1
         EOL        DS.B    1
         PR_EOL     DS.B    4
         OP_HEAD    DS.L    1
                    DS.W    1
         REL_CNT    DS.W    1
         REL_TOP    DS.L    1

PAGE
         LOCAL      SECTION 14
         LOC.VAR    DS.B    (REL_TOP+4)-OPEN_CUR

SECTION 0
         OBGRAB     LEA     .P1STAT,A6
                    MOVEQ   #0,D6
                    MOVE.B  .PRCNUM,D6
                    MOVE.B  #5,(A6,D6)

LEA     LOC.VAR,A0

MOVEA.L A0,A2
                    MOVEQ   #(REL_TOP-OPEN_CUR)/4,D3
                    CLR.L   (A2)+
                    DBRA    D3,*-2

MOVEA.L .RAWRUN,A1
                    MOVE.L  A1,.OBJRAM

LEA     OP_HEAD(A0),A5
                    MOVE.L  A5,OPEN_HD(A0)
                    MOVE.L  A5,OPEN_CUR(A0)

BSR     GETNEXTB
                    BSR     NEW.BRAN

IFNE    GRAPH
                      XREF  INITGRAF
                      JSR   INITGRAF
                    ENDC

PAGE
         START      TST.B   EOF(A0)
                    BNE     BOTTOM2

ADDQ.W  #1,ROW.W(A0)
                    CLR.B   EOL(A0)
                    CLR.B   PR_EOL(A0)
                    CLR.L   B.2(A0)
                    MOVE.L  OPEN_HD(A0),OPEN_CUR(A0)
                    BSR     GETNEXTA
                    BSR     GETNEXTB
                    MOVE.L  OPEN_CNT(A0),C_OPENCT(A0)

TOP        TST.B   EOL(A0)
                    BNE     BOTTOM1
                    TST.L   C_OPENCT(A0)
                    BEQ     BOTTOM1
                    MOVEM.L A.1(A0),D1-D4

CMP.W   D3,D1
                    BEQ.S   A1.EQ.B1
                    BLO.S   A1.LT.B1
                    BHI.S   A1.GT.B1

FUNG1      TST.B   A_N_USED(A0)
                    BNE.S   LEM.25
                    BSR     NEW_COL
                    MOVEA.L OPEN_CUR(A0),A3
```

```
            BSR      INS_OPL
            MOVEA.L  OPEN_CUR(A0),A2
            MOVE.L   A2,PREV_CUR(A0)
            MOVE.L   (A2),OPEN_CUR(A0)
            RTS
LEM.25      BSR      ATACHB2A
            RTS

A1.EQ.B1    CMP.W    D4,D2
            BEQ.S    FUN6
            BHI.S    FUN7

FUN5        BSR      ATACHB2A
            BRA.S    NEXTA

FUN7        BSR      ATACHB2A
            BRA.S    NEXTB

FUN6        BSR      ATACHB2A
NEXTAB      BSR      GETNEXTA
NEXTB       BSR      GETNEXTB
GO.TOP      BRA.S    TOP
            PAGE
A1.LT.B1    CMP.W    D3,D2
            BHS.S    A2.GE.B1

A2.LT.B1    ADDQ.B   #.SFTFLTR,D2
            CMP.W    D3,D2
            BHS.S    FUN1

BSR.S    FUN0
            BRA.S    GO.TOP

A2.GE.B1    CMP.W    D4,D2
            BEQ.S    FUN3
            BHI.S    FUN4

FUN1        BSR.S    FUNG1
NEXTA       BSR      GETNEXTA
            BRA.S    GO.TOP

FUN3        BSR.S    FUNG1
            BRA.S    NEXTAB

FUN4        BSR.S    FUNG1
            BRA.S    NEXTB

A1.GT.B1    CMP.W    D4,D1
            BLS.S    A1.LE.B2

A1.GT.B2    ADDQ.B   #.SFTFLTR,D4
            CMP.W    D4,D1
            BLS.S    FUN10

BSR.S    FUN12
            BRA.S    GO.TOP

A1.LE.B2    CMP.W    D4,D2
            BEQ.S    FUN9
            BLO.S    FUN8

FUN10       TST.B    B_USED(A0)
            BEQ.S    FUN7
            MOVEQ    #0,D7
            BSR      MERG_OBJ
            BRA.S    NEXTB

FUN8        BSR.S    FUNG3
            BRA.S    GO.TOP

FUN9        BSR.S    FUNG3
            BRA.S    NEXTB
            PAGE
```

```
FUNG3       TST.B    B_USED(A0)
            BEQ.S    ATACH
            MOVEQ    #1,D7
            BSR      MERG_OBJ
            MOVEQ    #-1,D7
            BSR      DEL_OPL
            BRA.S    LEM.27
ATACH       BSR      ATACHB2A
LEM.27      TST.B    A_N_USED(A0)
            BNE.S    FUNG3.
LEM.29      BSR      GETNEXTA
FUNG3.      RTS

FUN0        TST.B    A_N_USED(A0)
            BEQ.S    LEM.29
            MOVEQ    #-1,D7
            MOVEA.L  A_OBJ(A0),A3
            SUBQ.W   #1,OPNCNT(A3)
            BNE.S    LEM.13
            IFNE     GRAPH
              MOVE.L A3,A5
              BSR    DRAW_OBJ
            ENDC
            BSR      DEL_OPL
            BSR      CLIP
            RTS
LEM.13      BSR      DEL_OPL
            RTS

FUN12       TST.B    B_USED(A0)
            BNE.S    FUN12.
            BSR      NEW_OBJ
            MOVEA.L  PREV_CUR(A0),A2
            MOVEA.L  A2,A3
            BSR      INS_OPL
            MOVE.L   (A2),PREV_CUR(A0)
FUN12.      BSR      GETNEXTB
            RTS

NEW.BRAN    TST.B    EOL(A0)
            BNE.S    FUNG3.

FUN13       BSR      NEW_OBJ
            MOVEA.L  OPEN_CUR(A0),A3
            BSR      INS_OPL
            MOVE.L   A3,PREV_CUR(A0)
            MOVE.L   (A3),OPEN_CUR(A0)
            BSR      GETNEXTB
            BRA.S    NEW.BRAN

GOSTART     BRA      START
            PAGE
BOTTOM1     TST.B    EOL(A0)
            BNE.S    DEL_ENTS
            TST.B    B_USED(A0)
            BEQ.S    LEM.28
            BSR      GETNEXTB

LEM.28      TST.B    EOL(A0)
            BNE.S    LEM.21
            TST.L    OPEN_CUR(A0)
            BEQ.S    LEM.20
            TST.L    C_OPENCT(A0)
            BNE.S    LEM.21

LEM.20      MOVE.L   PREV_CUR(A0),OPEN_CUR(A0)

LEM.21      BSR.S    NEW.BRAN
DEL_ENTS    TST.L    C_OPENCT(A0)
            BLS.S    GOSTART

TST.B    A_N_USED(A0)
            BNE.S    LEM.23
            BSR      GETNEXTA
```

```
LEM.23      TST.L      C_OPENCT(A0)
            BEQ.S      GOSTART
            BSR        FUN0
            BRA.S      LEM.23

BOTTOM2     TST.L      OPEN_CNT(A0)
            BLE.S      OBJEXT
            MOVE.L     OPEN_HD(A0),OPEN_CUR(A0)
            BSR        GETNEXTA
            MOVE.L     OPEN_CNT(A0),C_OPENCT(A0)

WHIL.1      TST.L      OPEN_CUR(A0)
            BEQ.S      OBJEXT
            MOVEQ      #0,D7
            MOVEA.L    A_OBJ(A0),A3
            SUBQ.W     #1,OPNCNT(A3)
            BNE.S      LEM.15
            TST.L      TAIL(A3)
            BEQ.S      LEM.15
            BSR        DEL_OPL
            BSR        CLIP
            BRA.S      WHIL.1
LEM.15      BSR        DEL_OPL
            BRA.S      WHIL.1

OBJEXT      LEA        .P1STAT,A6
            MOVEQ      #0,D6
            MOVE.B     .PRCNUM,D6
            CLR.B      (A6,D6)
            BCLR       #1,.TASKS
            ADDQ.B     #1,.OGDONE
            RTS
            PAGE
GETNEXTB    TST.B      PR_EOL(A0)
            BEQ.S      GET.RUN
            ADDQ.B     #1,EOL(A0)
            RTS

GET.RUN     MOVE.L     (A1),D3
            BMI.S      RUN.LEN
            TST.W      D3
            BMI.S      RUN.LEN
            SUBQ.W     #1,D3
            BNE.S      RUN.LEN
            TST.L      (A1)+

*****       Increment count and BSR RAWREL  if count = count max
            ADDQ.W     #1,REL_CNT(A0)
            CMP.W      #REL_MAX,REL_CNT(A0)
            BLT.S      GET.RUN
            CLR.W      REL_CNT(A0)
            IFNE       TARGET
            BSR        RAWREL
            ENDC

BRA.S      GET.RUN

RUN.LEN     MOVE.W     (A1)+,D3
            BPL.S      NOT.EOF
            ADDQ.B     #1,EOF(A0)
            AND.W      #$7FFF,D3

NOT.EOF     MOVE.W     (A1)+,D4
            MOVE.W     D4,BLEN.W(A0)
            BMI.S      CHK.EOL

BNE.S      LEN.NE.0
            MOVEQ.L    #15,D0
            JMP        .ABRTPRC

CHK.EOL     AND.W      #$7FFF,D4
            BNE.S      SET_PEOL
            ADDQ.B     #1,EOL(A0)
            BRA.S      LEN.NE.0
```

```
SET_PEOL   ADDQ.B    #1,PR_EOL(A0)

PAGE

LEN.NE.0   MOVE.W    D3,D5
           SUB.W     D4,D5
           ADDQ.W    #1,D5

CMP.W     B2.W(A0),D5
           BGT.S     SLICE.OK
           MOVEQ.L   #16,D0
           JMP       .ABRTPRC

SLICE.OK   MOVE.W    D5,B1.W(A0)
           MOVE.W    D3,B2.W(A0)
           SWAP      D5
           MOVE.W    D4,D5
           MOVE.L    D5,RUN_LEN(A0)
           CLR.B     B_USED(A0)

*****      Increment count and BSR RAWREL if count = count max
           ADDQ.W    #1,REL_CNT(A0)
           CMP.W     #REL_MAX,REL_CNT(A0)
           BLT.S     GETBEXIT
           CLR.W     REL_CNT(A0)
           IFNE      TARGET
             BSR     RAWREL
           ENDC GETBEXIT   RTS
           PAGE
GETA       MOVE.L    OPEN_CUR(A0),-(A7)
           MOVEA.L   (A7)+,A5
           BEQ.S     GETA.X
           TST.L     C_OPENCT(A0)
           BEQ.S     GETA.X

MOVE.L    OPEN_A1(A5),A.1(A0)
           MOVE.L    OPEN_A2(A5),A.2(A0)

TST.L     OBJ(A5)
           BEQ.S     LEM.10

MOVEA.L   OBJ(A5),A4

LEM.7      TST.L     HEAD(A4)
           BNE.S     LEM.9

SUBQ.W    #1,OPNCNT(A4)
           BNE.S     LEM.8

MOVE.L    TAIL(A4),-(A7)
           .RELEASE  A4
           MOVE.L    (A7)+,A4
           BRA.S     LEM.7

LEM.8      MOVEA.L   TAIL(A4),A4

BRA.S     LEM.7

LEM.9      MOVE.L    A4,A_OBJ(A0)

LEM.10     MOVE.L    A_OBJ(A0),OBJ(A5)
           ADDQ.B    #1,A_N_USED(A0)

RTS

GETNEXTA   SUBQ.L    #1,C_OPENCT(A0)
           MOVEA.L   OPEN_CUR(A0),A5
           MOVE.L    A5,PREV_CUR(A0)
           MOVE.L    (A5),OPEN_CUR(A0)
           BSR.S     GETA

GETA.X     RTS
           PAGE
```

```
ATACHB2A   MOVEA.L  OPEN_CUR(A0),A2
           MOVE.L   SL_CNT(A2),D4
           MOVEA.L  SL_REC(A2),A4
           MOVEA.L  SL_PTR(A2),A5
           MOVEM.L  B.1(A0),D1-D3

* THE FOLLOWING IF LINKS IN A NEW SLICE RECORD AND UPDATES D4,A4,A5

IF.B D4 (EQ) #16 THEN.S
            BSR    GET_MEM
            MOVE.L  A6,(A4)
            MOVEA.L A6,A4
            MOVEA.L A4,A5
            CLR.L   (A5)+
            MOVEQ   #2,D4
           ELSE.S
            ADDQ.B #1,D4
           ENDI

MOVE.L   RUN_LEN(A0),(A5)+

********* UPDATE OPEN LIST RECORD ###########

MOVE.L   D4,SL_CNT(A2)
           MOVE.L   A4,SL_REC(A2)
           MOVE.L   A5,SL_PTR(A2)
           MOVEM.L  D1-D2,OPEN_A1(A2)

********* UPDATE OBJECT HEADER   ##############

MOVEA.L  A_OBJ(A0),A2
           MOVE.W   ROW.W(A0),YMAX(A2)
           ADD.L    D3,MASS(A2)
           IF.W D1 (LT) XMIN(A2) THEN.S
            MOVE.W D1,XMIN(A2)
           ENDI
           IF.W D2 (GT) XMAX(A2) THEN.S
            MOVE.W D2,XMAX(A2)
           ENDI

BSR      GETXCOMP

ADD.L    D5,XCOMP(A2)
           MOVE.W   ROW.W(A0),D1
           MULS     D3,D1
           ADD.L    D1,YCOMP(A2)

ADDQ.B   #1,B_USED(A0)
           CLR.B    A_N_USED(A0)
           MOVE.L   A2,B_OBJ(A0)

RTS
           PAGE
MERG_OBJ   MOVEM.L  A_OBJ(A0),A5-A6
           IF.L A5 (NE) A6 THEN
            MOVEA.L TAIL(A6),A2
            MOVE.L HEAD(A5),HORIZ(A2)
            MOVE.L TAIL(A5),TAIL(A6)
            MOVE.W OPNCNT(A5),D5
            MOVE.W OPNCNT(A6),D6
            SUB.W  D7,D6
            ADD.W  D5,D6
            MOVE.W D6,OPNCNT(A6)
            MOVE.W VCNT(A5),D5
            MOVE.W VCNT(A6),D6
            ADD.W  D5,D6
            MOVE.W D6,VCNT(A6)
            MOVE.W XMIN(A5),D1
            IF.W D1 (LT) XMIN(A6) THEN.S
             MOVE.W D1,XMIN(A6)
            ENDI
            MOVE.W XMAX(A5),D1
            IF.W D1 (GT) XMAX(A6) THEN.S
             MOVE.W D1,XMAX(A6)
            ENDI
```

```
                MOVE.W   YMIN(A5),D1
                IF.W D1 (LT) YMIN(A6) THEN.S
                  MOVE.W D1,YMIN(A6)
                ENDI
                MOVE.W   YMAX(A5),D1
                IF.W D1 (GT) YMAX(A6) THEN.S
                  MOVE.W D1,YMAX(A6)
                ENDI
                MOVEM.L  MASS(A5),D4-D6
                ADD.L    D4,MASS(A6)
                ADD.L    D5,XCOMP(A6)
                ADD.L    D6,YCOMP(A6)
                SUBQ.W   #1,OPNCNT(A5)
                IF (EQ) THEN.S
                  .RELEASE    A5
                ELSE.S
                  MOVE.L A6,TAIL(A5)
                  CLR.L  HEAD(A5)
                ENDI
                MOVEA.L  OPEN_CUR(A0),A2
                MOVE.L   A6,OBJ(A2)
                MOVE.L   A6,A_OBJ(A0)
              ELSE.S
                MOVEA.L B_OBJ(A0),A2
                SUB.W   D7,OPNCNT(A2)
                ADDQ.W  #1,HOLES(A2)
              ENDI
              RTS
              PAGE
* INS_OPL - INSERT INTO THE OPEN LIST
* INS_OPL GETS:  A3 - ^ TO PRECEDING LIST ELEMENT
*                A4 - ^ TO OBJECT HEADER
*                A5 - ^ TO COLUMN HEADER
*                D1 - IS B1
*                D2 - IS B2
*                D3 - ^ TO SLICE RECORD
*                D4 - SLICE COUNT ON THIS RECORD
*                D5 - ^ TO SLICE FIELD

INS_OPL    ADDQ.L   #1,OPEN_CNT(A0)
           BSR.S    GET_MEM
           MOVE.L   (A3),(A6)
           MOVE.L   A6,(A3)
           MOVEM.L  D1-D5/A4-A5,OPEN_A1(A6)
           RTS

DEL_OPL    SUBQ.L   #1,OPEN_CNT(A0)
           SUBQ.L   #1,C_OPENCT(A0)
           MOVEA.L  OPEN_CUR(A0),A2
           MOVEA.L  (A2),A5

MOVEA.L  COL_PTR(A2),A6
           ADD.W    ROW.W(A0),D7
           MOVE.W   D7,YEND(A6)
           MOVE.L   SL_REC(A2),RUN_TAIL(A6)

.RELEASE    A2

MOVEA.L  PREV_CUR(A0),A4
           MOVE.L   A5,(A4)
           MOVE.L   A5,OPEN_CUR(A0)

BSR      GETA
           RTS

GET_MEM    JSR      GET64
           BEQ.S    NOMORE
           RTS

NOMORE     MOVEQ.L  #5,D0
GO.ABRT    JMP      .ABRTPRC
```

```
            PAGE
* NEW_COL : CREATE A NEW VERTICAL COLUMN HEADER AND LINK IT IN

* NEW_COL RETURNS A4 - ^ TO OBJECT HEADER
*                  A5 - ^ TO COLUMN HEADER
*                  D1 - IS B1
*                  D2 - IS B2
*                  D3 - ^ TO SLICE RECORD
*                  D4 - SLICE COUNT ON THIS RECORD
*                  D5 - ^ TO SLICE FIELD

NEW_COL     TST.B    .ABRTF
            BNE.S    GO.ABRT
            BSR.S    GET_MEM
            MOVE.W   ROW.W(A0),D6
            MOVE.W   D6,YSTART(A6)
            MOVE.W   D6,YEND(A6)
            MOVEM.L  B.1(A0),D1-D3
            LEA      S_SLICE(A6),A5
            MOVE.L   RUN_LEN(A0),(A5)+
            MOVEA.L  A_OBJ(A0),A4

* NOW APPEND THE NEW COLUMN HEADER TO THE TAIL OF OBJECT A'S LINKED LIST OF COLS

MOVEA.L  TAIL(A4),A2
            MOVE.L   A6,HORIZ(A2)
            MOVE.L   A6,TAIL(A4)

MOVE.W   D6,YMAX(A4)
            IF.W D1 (LT) XMIN(A4) THEN.S
              MOVE.W D1,XMIN(A4)
            ENDI
            IF.W D2 (GT) XMAX(A4) THEN.S
              MOVE.W D2,XMAX(A4)
            ENDI

BSR.S    GETXCOMP

ADD.L    D5,XCOMP(A4)
            MULS     D3,D6
            ADD.L    D6,YCOMP(A4)

ADD.L    D3,MASS(A4)
            ADDQ.W   #1,OPNCNT(A4)
            ADDQ.W   #1,VCNT(A4)
            ADDQ.B   #1,B_USED(A0)
            MOVE.L   A4,B_OBJ(A0)

MOVE.L   A6,D3
            MOVE.L   A5,D5
            MOVEA.L  A6,A5
            MOVEQ    #SLICE_CN,D4

RTS
            PAGE

CLIP:
            MOVE.W   XMAX(A3),D1
            SUB.W    XMIN(A3),D1
            SUBQ.W   #2,D1
            BMI.S    REL.OBJ
            MOVE.W   YMAX(A3),D1
            SUB.W    YMIN(A3),D1
            SUBQ.W   #2,D1
            BMI.S    REL.OBJ
            CMPI.L   #20,MASS(A3)
            BLO.S    REL.OBJ

MOVE.L   A3,-(A7)
            MOVE.L   #4,-(A7)
            PEA      .SYSQ
            JSR      .QJOB
            ADD.L    #12,A7
```

```
              ADDQ.W    #1,.NUMOBJ
              RTS

REL.OBJ       MOVE.L    A0,-(A7)
              MOVEA.L   A3,A0
              BSR       OBJREL
              MOVEA.L   (A7)+,A0
              RTS

GETXCOMP      EXT.L     D1
              MOVE.W    D3,D5
              ASR.W     #1,D5
              BCC.S     LEN.EVEN
              ADD.W     D1,D5
              MULU      D3,D5
              BRA.S     XCOMP.X
LEN.EVEN      ASL.W     #1,D5
              SUBQ.W    #1,D5
              MOVE.W    D5,D7
              ASR.W     #1,D5
              ADDQ.W    #1,D5
              ADD.W     D1,D5
              MULU      D7,D5
              ADD.L     D1,D5
XCOMP.X       RTS
              PAGE
* NEW_OBJ:  BUILDS NEW OBJECTS

* NEW_OBJ RETURNS A4 - ^ TO OBJECT HEADER
*                 A5 - ^ TO COLUMN HEADER
*                 D1 - IS B1
*                 D2 - IS B2
*                 D3 - PTR TO SLICE RECORD
*                 D4 - SLICE COUNT ON THIS RECORD
*                 D5 - PTR TO SLICE FIELD

NEW_OBJ       BSR       GET_MEM
              MOVEA.L   A6,A4
              BSR       GET_MEM
              MOVEA.L   A6,A5
              MOVE.L    A5,HEAD(A4)
              MOVE.L    A5,TAIL(A4)
              MOVE.L    #-1,(A4)
              MOVE.W    ROW.W(A0),D6
              MOVE.W    D6,YSTART(A5)
              MOVE.W    D6,YEND(A5)
              MOVEM.L   B.1(A0),D1-D3
              MOVE.L    RUN_LEN(A0),S_SLICE(A5)
              MOVEQ     #1,D7
              MOVE.W    D7,OPNCNT(A4)
              MOVE.W    D7,VCNT(A4)
              MOVE.W    D6,D7
              MOVEM.W   D1-D2/D6-D7,XMIN(A4)
              MULS      D3,D7
              MOVE.L    D7,YCOMP(A4)
              MOVE.L    D3,MASS(A4)

BSR.S     GETXCOMP

MOVE.L    D5,XCOMP(A4)
              MOVE.L    A5,D3
              MOVEQ     #SLICE_CN,D4
              MOVE.L    D3,D5
              ADD.L     #S_SLICE+4,D5
              RTS

PAGE
***** RAWREL ************************************************************
* PGM:   RAWREL - Release Raw Run Length
*
* ENT:   A1 -) The following raw run length not to be released
*
* RTN:   All registers not changed
*        .OBJRAM is updated to the current Raw Run-length
*************************************************************************
```

```
RAWREL    MOVE.L     A1,.OBJRAM

RTS

*****  END OF RAWREL  *****************************************************

IFNE       GRAPH
          PAGE
DRAW_OBJ  MOVEM.L    A0-A2/D0-D7,-(A7)

MOVE.W     YMAX(A5),D2
          SUB.W      YMIN(A5),D2
          IF.W   D2  (LT)  #32   THEN.S
            BRA.S    DRAW.X
          ENDI
          XREF       CLR_QUME
          JSR        CLR_QUME

MOVE.W     YMIN(A5),D7
          MOVE.W     XMIN(A5),D6
          MOVEA.L    HEAD(A5),A0

WHILE.L  A0  (NE)  #0   DO.S
            MOVE.W   YSTART(A0),D5
            MOVEA.L  A0,A1
            LEA      S_SLICE(A1),A2
            MOVEQ    #SLICE_CN-1,D4

WHILE.L  A1  (NE)  #0   DO.S
              WHILE.B  D4  (LT)  #16   DO.S

TST.L            (A2)+
                BEQ.S            LEM.11
                TST.L            -(A2)
                MOVEM.W          (A2)+,D0/D2
                ADD.W            D0,D2
                SUBQ.W           #1,D2
                MOVE.W           D5,D1
                SUB.W            D7,D1
                SUB.W            D6,D0
                SUB.W            D6,D2
                MOVE.W           D1,D3
                XREF             OUTLIN
                JSR              OUTLIN
                ADDQ.W           #1,D5
                ADDQ.B           #1,D4
                BRA.S            LEM.12
LEM.11          MOVEQ            #16,D4

LEM.12        ENDW
              MOVEA.L          (A1),A1
              LEA              4(A1),A2
              MOVEQ            #1,D4
            ENDW

MOVEA.L HORIZ(A0),A0
          ENDW
DRAW.X    MOVEM.L    (A7)+,A0-A2/D0-D7
          RTS
          ENDC

END
```

```
OBJREL              IDNT    0,3
```

```
************************************************************************
*
*           MODULE NAME:   OBJREL.SA              (C) COPYRIGHT 1986 GTX CORP
*
*           REVISION HISTORY         V
*                                    E R
*                                    R E
*           AUTHOR        DATE       S V - ADD CHANGES TO THE TOP
*           ------        ----       ---------------------------------
*           A. LAI        10/17/86   0,3 - Make codes in loop more efficient
*           A. LAI        04/14/86   0,2 - New Memory Management Mechanism
*           L. MISH       03/19/86   0,1 - Separated OBJREL from METACTRL
*
*           MODULE DESCRIPTION:
*
*             ENTRY CONDITIONS:
*
*             EXIT CONDITIONS:
*
*                  REGISTERS USED
*                  0  1  2  3  4  5  6  7
*                  ----------------------
*              A  !E        *  *  *  *     P!
*                  ----------------------
*              D  !                          !
*                  ----------------------
*                   *  = DESTROYED
*                   P  = REGISTER USED BUT PRESERVED
*                   E  = ENTRY PARAMETER - PRESERVED
*                   B  = ENTRY PARAMETER & RETURN VALUE
*                   R  = RETURN VALUE
*
*           NOTES:   USE A.CF OBJREL TO ASSEMBLE
*
************************************************************************
            TTL     RELEASE SPACE OCCUPIED
            PAGE

XDEF    OBJREL

INCLUDE RELEASE

HORIZ       EQU     4
RUN_TAIL    EQU     12

HEAD        EQU     4
            PAGE
OBJREL      MOVEM.L D0/A2-A5,-(A7)
            MOVE.L  A0,D0
            BEQ.S   OBJRELX

MOVEA.L HEAD(A0),A5
            MOVEA.L RUN_TAIL(A5),A3
REL_COL     MOVEA.L RUN_TAIL(A5),A2

MOVE.L  A4,(A2)
            MOVEA.L A5,A4
            MOVE.L  HORIZ(A5),D0
            MOVE.L  D0,A5
            BNE.S   REL_COL

MOVE.L  A4,(A0)
            MOVEA.L A0,A4

.RLSTRNG A4,A3

OBJRELX     MOVEM.L (A7)+,D0/A2-A5
            RTS

END
```

META OBJECT GRABBER

```
METACTRL        IDNT  1,12

************************************************************************
*
*       MODULE NAME:  METACTRL.SA              (C) COPYRIGHT 1986 GTX CORP
*
*       REVISION HISTORY        V
*                               E R
*                               R E
*       AUTHOR     DATE         S V - ADD CHANGES TO THE TOP
*       ------     --------     --------------------------------------->
*       A. LAI     10/14/86     1,12- Set RELEASE$ status for OBJREL and MOBREL
*       A. LAI     08/08/86     1,11- Set BLOB only when object is small
*       A. LAI     07/25/86     1,10- Set processor status for Meta Obj Routines
*       A. LAI     05/19/86     1,9 - Cancel call to FILLSLIC of FILLVERT
*       A. LAI     05/05/86     1,8 - New FILLVERT which fills all closed holes
*       A. LAI     04/30/86     1,7 - Combine FILVERT1 and FILVERT2
*       A. LAI     04/22/86     1,6 - Multi-row Overlap of Consecutive Frames
*       A. LAI     04/18/86     1,5 - Rename to METACTRL and add Conditional
*       A. LAI     04/17/86     1,4 - Two FILLVERT logics
*       A. LAI     04/09/86     1,3 - Adopting multi-row FILLVERT
*       A. LAI     04/07/86     1,2 - Adjust Frame Row Pointer for METAGRAB
*       LEM        03/19/86     1,1 - Separate OBJREL from METACTRL
*       LEM        03/11/86     1,0 - Separate FILLFRAM & FILLHORZ from METACTRL
*       LEM        03/06/86     0,10- Fix FIL_FRAM bug: move last row to 0
*       LEM        02/24/86     0,9 - Double FRAME width, halve FRAME height
*       LEM        02/21/86     0,8 - Fix FIL_FRAM hang on horiz lines
*       LEM        02/15/86     0,7 -   Add code to display FRAME
*       LEM        02/13/86     0,6 - Revise "     "  release OBJECT space
*       LEM        02/11/86     0,5 -   Add  "     "      "        "    "
*       LEM        02/06/86     0,4 - Return FRAME size to       1"
*       LEM        02/04/86     0,3 - Temporary VECGEN linkage, 10" FRAME
*       LEM        01/25/86     0,2 - Add FIL_FRAM
*       LEM        01/18/86     0,1 - Original writing
*
*       MODULE DESCRIPTION:             D0.W = SWATH CEILING   A0 ^ TO LOCAL VARS
*         ENTRY CONDITIONS:             D2.W = LOOP LIMIT      A2 WORK REG
*         EXIT CONDITIONS:              D4.W = SLICE COUNT     A4 ^ TO FRAME
*            REGISTERS USED             D6.W = Y               A6 ^ TO FREE SPACE
*            0  1  2  3  4  5  6  7     D7.W = MAX Y
*            ------------------------
*       A  |*  *  *  *  *  *  B  P|
*            ------------------------
*       D  |*  *  *  *  *  *  *  *|
*            ------------------------
*          * = DESTROYED
*          P = REGISTER USED BUT PRESERVED
*          E = ENTRY PARAMETER - PRESERVED
*          B = ENTRY PARAMETER & RETURN VALUE
*          R = RETURN VALUE
*
*       NOTES:  USE A.CF METACTRL TO ASSEMBLE
*
************************************************************************
        TTL     META OBJECT GRABBER
TARGET  EQU     1

INCLUDE  RELEASE

PAGE
        XDEF    METACTRL,MOB_PTR,LAST.ROW,BLOB

XREF    FILLFRAM,FILLHORZ,METAGRAB,VECGEN
        XREF    INITFV,FILLVERT
        XREF    OBJREL,MOBREL

HORIZ   EQU     4
BEGY    EQU     8
WORK.C  EQU     16
WORK.Y  EQU     18
WORK.RP EQU     20
WORK.FP EQU     24
SLICEC  EQU     28
```

```
HEAD        EQU     4
MASS        EQU     12
MINX        EQU     24
MINY        EQU     28
MAXY        EQU     30

LAST.ROW    DS.L    1
MOB_PTR     DS.L    1
BLOB        DS.L    1
BLOBSIZE    EQU     120

INCLUDE METADATA
            PAGE

SECTION 0

METACTRL    .ENTER  CTRLSTA$
            LEA.L   BLOB,A2
            MOVE.L  MASS(A0),(A2)
            MOVEM.W MINX(A0),D0-D3
            SUB.W   D0,D1
            SUB.W   D2,D3
            MOVE.W  #BLOBSIZE,D4
            CMP.W   D4,D1
            BGT.S   BEGIN
            CMP.W   D4,D3
            BGT.S   BEGIN
            CLR.L   (A2)

BEGIN       MOVE.W  MINY(A0),D1
            MOVE.W  D1,D6
            MOVE.W  D1,D5
            MOVE.W  MAXY(A0),D7
            MOVEA.L HEAD(A0),A2
            MOVEQ   #7,D3
            SWAP    D3
FIL_WORK    MOVE.W  BEGY(A2),D3
            MOVE.L  D3,WORK.C(A2)
            MOVE.L  A2,WORK.RP(A2)
            LEA     SLICEC(A2),A3
            MOVE.L  A3,-(A3)
            MOVEA.L HORIZ(A2),A2
            MOVE.L  A2,D0
            BNE.S   FIL_WORK

CLR.L   MOB_PTR
            LEA     FRAME,A4
            BSR     FILLFRAM
            SUBQ.W  #1,D2
            BSR     FILLHORZ
            BSR     INITFV

PAGE
            IFEQ    TARGET
            XREF    CLR_QUME.OUTLIN
            JSR     CLR_QUME
            ENDC.

REPEAT      MOVEM.L D2/A4,-(A7)

REPEATFV    LEA     4*FRAMESIZ(A4),A4
            BSR     FILLHORZ
            BSR     FILLVERT
            DBRA    D2,REPEATFV

MOVEM.L (A7)+,D2/A4

IFEQ    TARGET
            MOVEM.L D0-D5/A3-A5,-(A7)
            LEA     -(HOLE_CNT-1)*4*FRAMESIZ(A3),A3
            MOVE.L  #SWATHSIZ-1,D5
            LEA.L   FRAME-(4*FRAMESIZ),A4
REPEATGR    LEA.L   4*FRAMESIZ(A4),A4
            CMP.L   A3,A4
```

```
                BHS.S    OVERLAPG
                MOVE.L   A4,A5
                TST.L    (A5)+
                MOVE.L   #FRAMESIZ-3,D4
NXT.SLIC        MOVE.L   (A5)+,D0
                BEQ.S    END.ROW
                BMI.S    SKIP
                MOVE.W   D0,D2
                SWAP     D0
                ADD.W    D0,D2
                SUBQ.W   #1,D2
                SUB.W    MINX(A0),D0
                SUB.W    MINX(A0),D2
                SUB.W    MINY(A0),D1
                MOVE.W   D1,D3
                JSR      OUTLIN
                ADD.W    MINY(A0),D1
SKIP            DBRA     D4,NXT.SLIC
                MOVE.L   (A5),D0
                BEQ.S    END.ROW
                MOVE.L   D0,A5
                MOVE.L   #CONTSIZE-2,D4
                BRA.S    NXT.SLIC
END.ROW         ADDQ.W   #1,D1
OVERLAPG        DBRA     D5,REPEATGR
                MOVEM.L  (A7)+,D0-D5/A3-A5
                ENDC

MOVE.L   A3,-(A7)
                LEA.L    -(HOLE_CNT-1)*4*FRAMESIZ(A3),A3
                MOVE.L   #SWATHSIZ-1,D2
                LEA.L    FRAME-(4*FRAMESIZ),A4
REPEATMG        LEA.L    4*FRAMESIZ(A4),A4
                CMP.L    A3,A4
                BHS.S    OVERLAP
                BSR      METAGRAB
                ADDQ.W   #1,D1
OVERLAP         DBRA     D2,REPEATMG
                MOVE.L   (A7)+,A3

LEA      FRAME+(4*FRAMESIZ*HOLE_CNT),A4
                BSR      FILLFRAM
                LEA      -4*FRAMESIZ(A4),A4
                TST.L    LAST.ROW
                BNE      REPEAT

LEA.L    FRAME+(HOLE_CNT*4*FRAMESIZ),A4
                BSR      FILLVERT

MOVE.L   #HOLE_CNT,D2
                LEA.L    FRAME-4*FRAMESIZ,A4
REPEATEN        LEA.L    4*FRAMESIZ(A4),A4
                BSR      METAGRAB
                ADDQ.W   #1,D1
                MOVE.L   (FRAMESIZE-1)*4(A4),D3
NXT_LNK         BEQ.S    REPEATC
                MOVE.L   D3,A6
                MOVE.L   LINK(A6),D3
                .RELEASE A6
                TST.L    D3
                BRA.S    NXT_LNK

REPEATC         DBRA     D2,REPEATEN

MOVEM.W  MINX(A0),D4-D7

.ENTER   RELEASE$
                BSR      OBJREL

MOVEA.L  MOB_PTR,A0
                BSR      VECGEN
```

```
        .ENTER  RELEASE$
        BSR     MOBREL

.EXIT
        SUBA.L  A0,A0
        RTS

END

FILLFRAM        IDNT    2,5

************************************************************************
*
*       MODULE NAME:   FILLFRAM.SA              (C) COPYRIGHT 1986 GTX CORP
*
*       REVISION HISTORY       V
*                              E R
*                              R E
*       AUTHOR    DATE         S V - ADD CHANGES TO THE TOP
*       ------    --------     ------------------------------------------
*       A. LAI    06/19/86     2,5 - Check if # of slices in column record
*       A. LAI    06/01/86     2,4 - Force zero slice length to 1
*       A. LAI    05/19/86     2,3 - Call FILLSLIC in FILLFRAM
*       A. LAI    05/07/86     2,2 - New Memory Management Mechanism
*       A. LAI    05/01/86     2,1 - New FILLVERT which fills all closed holes
*       A. LAI    04/26/86     2,0 - Reconstruction of logics for fetching
*       A. LAI    04/24/86     1,3 - Multi-row Overlap of Consecutive Frames
*       A. LAI    04/19/86     1,2 - Reconstruct Frame Row Link Pointer
*       A. LAI    04/15/86     1,1 - Conditional Extension of Frame Row Size
*       LEM       03/11/86     1,0 - Separated from METACTRL
*
*       MODULE DESCRIPTION:
*
*         ENTRY CONDITIONS:         D1.W =  ROW # FOR 1ST ROW OF FRAME
*
*         EXIT CONDITIONS:          A3   -) LAST ROW OF NEW FRAME
*
*              REGISTERS USED
*          0  1  2  3  4  5  6  7
*         ----------------------------
*       A  !E  P  P  B  E  P  P  P!
*       D  !P  E  R  P  P  P  P  P!
*         ----------------------------
*              * = DESTROYED
*              P = REGISTER USED BUT PRESERVED
*              E = ENTRY PARAMETER   PRESERVED
*              B = ENTRY PARAMETER & RETURN VALUE
*              R = RETURN VALUE
*
*       NOTES:  USE A.CF FILLFRAM TO ASSEMBLE
*
************************************************************************
        TTL     META OBJECT FILL FRAME
        XDEF    FILLFRAM
        XREF    LAST.ROW,FILLSLIC
        XREF    GET64
        PAGE

INCLUDE RELEASE
        PAGE

MAX.SLIC EQU    16

OFFSET  0
        DS.L    1
HEAD    DS.L    1

OFFSET  0
        DS.L    1
HORIZ   DS.L    1
BEGY    DS.W    1
ENDY    DS.W    1
        DS.L    1
```

```
WORK.C      DS.W    1
WORK.Y      DS.W    1
WORK.RP     DS.L    1
WORK.FP     DS.L    1

INCLUDE    METADATA

SECTION 0
BEG_ROW     DS.W    1
END_ROW     DS.W    1

PAGE
FILLFRAM    MOVEM.L  D0-D1/D3-D4/A0-A2/A4-A6,-(A7)
            CLR.L    LAST.ROW
            MOVE.W   D1,BEG_ROW
            ADD.W    #SWATHSIZ-1,D1
            MOVE.W   D1,END_ROW
            CMP.L    #FRAME,A4
            BEQ      CLR_FRAM
            ADD.W    #HOLE_CNT,BEG_ROW
            ADD.W    #HOLE_CNT,END_ROW

*****       Release all cont' records of rows except last N rows (overlap rows)
            LEA.L    -(HOLE_CNT-1)*4*FRAMESIZ(A3),A1
            LEA.L    FRAME,A2
            CMP.L    A2,A1
            BLS      FILFRAMX
            MOVE.L   #SWATHSIZ-1,D1
            SUBQ.L   #4,A2
FOR.1       LEA.L    4*FRAMESIZ(A2),A2
            CMP.L    A1,A2
            MOVE.L   (A2),D0
NEXT_REC    BEQ.S    NO_LINK
            MOVE.L   D0,A6
            MOVE.L   LINK(A6),D0
            .RELEASE A6
            TST.L    D0
            BRA.S    NEXT_REC
NO_LINK     DBRA     D1,FOR.1

*****       Move last N rows (overlap rows) of previous frame to top of frame
            LEA.L    -(HOLE_CNT-1)*4*FRAMESIZ(A3),A1
            LEA.L    -HOLE_CNT*4*FRAMESIZ(A4),A2
            MOVE.L   A1,A6
            SUB.L    A2,A6
            MOVEQ.L  #(HOLE_CNT-1),D0
FOR.3       MOVEQ.L  #(FRAMESIZ-1),D1
FOR.5       MOVE.L   (A1)+,(A2)+
            BPL.S    FOR.5C
            MOVE.L   -(A2),D2
            LSL.L    #1,D2
            SUB.L    A6,D2
            LSR.L    #1,D2
            MOVE.L   D2,(A2)+
            TAS.B    -4(A2)
FOR.5C      DBRA     D1,FOR.5
            BEQ.S    FOR.3C
            PAGE

*****       Loop to adjust slice ptr in cont' record
            MOVE.L   -4(A2),A5
FOR7INIT    MOVE.L   #CONTSIZE-1,D1
FOR.7       MOVE.L   (A5)+,D2
            BPL.S    FOR.7C
            LSL.L    #1,D2
            CMP.L    #FRAME,D2
            BLO.S    SKIP
            CMP.L    #FRAME+4*FRAMESIZ*(SWATHSIZ+HOLE_CNT),D2
            BHS.S    SKIP
            SUB.L    A6,D2
```

```
SKIP        LSR.L       #1,D2
            MOVE.L      D2,-(A5)
            TAS.B       (A5)
            ADDQ.L      #4,A5
FOR.7C      DBRA        D1,FOR.7
            MOVE.L      D2,A5
            BNE.S       FOR7INIT

FOR.3C      DBRA        D0,FOR.3

*****       Update slice ptrs in FILLVERT hole records
            BSR         FILLSLIC

*****       Clear frame starting from Beginning pointer in A4
CLR_FRAM    MOVE.L      A4,A2
            MOVE.L      #(FRAMESIZ*SWATHSIZ)-1,D3
FOR.9       CLR.L       (A2)+
            DBRA        D3,FOR.9

*****       Mark end of rows in the new frame by $80000000
            MOVE.L      #SWATHSIZ-1,D3
            SUBQ.L      #4,A2
FOR.11      TAS.B       4*FRAMESIZ(A2),A2
            DBRA        D3,FOR.11

PAGE
*****       Search through object columns to fetch slices
            MOVE.L      A0,A1
NXT_COL     MOVE.L      HORIZ(A1),D0
            BEQ.S       NO_COL
            MOVE.L      D0,A1

NXT_SLIC    MOVE.W      WORK.Y(A1),D1
            CMP.W       BEG_ROW,D1
            BLT.S       NXT_COL
            CMP.W       END_ROW,D1
            BGT.S       NXT_COL

MOVE.W      WORK.C(A1),D4
            MOVE.L      WORK.RP(A1),A2
            MOVE.L      WORK.FP(A1),A3
            SUBQ.W      #1,ENDY(A1)
            BSR         GET_SLIC
            BNE.S       INS_SLIC
            MOVE.W      #-1,WORK.Y(A1)
            MOVE.W      ENDY(A1),D0
            ADDQ.W      #2,D0
            CMP.W       BEGY(A1),D0
            BEQ.S       NXT_COL
            MOVEQ.L     #17,D0
            JMP         .ABRTPRC

INS_SLIC    ADDQ.W      #1,WORK.Y(A1)
            MOVE.W      D4,WORK.C(A1)
            MOVE.L      A2,WORK.RP(A1)
            MOVE.L      A3,WORK.FP(A1)
            SUB.W       BEG_ROW,D1
            MOVE.L      A4,A3
            MULU.W      #4*FRAMESIZ,D1
            ADD.L       D1,A3

BSR.S       INSERT
            BRA         NXT_SLIC

PAGE

*****       Readjust link field of frame rows to normal linking addresses
NO_COL      MOVE.L      A4,A2
            MOVE.L      #SWATHSIZ-1,D3
            SUBQ.L      #4,A2
```

```
FOR.13    LEA.L     4*FRAMESIZ(A2),A2
          MOVE.L    (A2),D0
          LSL.L     #1,D0
          MOVE.L    D0,(A2)
NXT_REC   BEQ.S     NO_LNK
          MOVE.L    D0,A6
          MOVE.L    LINK(A6),D0
          LSL.L     #1,D0
          MOVE.L    D0,LINK(A6)
          BRA.S     NXT_REC
NO_LNK    DBRA      D3,FOR.13

FILFRAMX  MOVEA.L   LAST.ROW,A3
          MOVE.L    A3,D2
          MOVEM.L   (A7)+,D0-D1/D3-D4/A0-A2/A4-A6
          SUB.L     A4,D2
          DIVU.W    #4*FRAMESIZ,D2
          RTS

******************************************************************************
*         END OF FILLFRAM MAIN
******************************************************************************
          PAGE

******************************************************************************
* PGM:    INSERT - Insert working slice of a object column into FRAME
*
* ENT:    A3    -) current working FRAME row
*         D3.L  =  slice to be inserted into row
******************************************************************************
INSERT    LEA       4(A3),A5
          CMPA.L    LAST.ROW,A3
          BLS.S     LAI.1
          MOVE.L    A3,LAST.ROW
LAI.1     TST.L     (A5)
          BEQ.S     LAI.3
          BSR.S     LAI.10
          BMI.S     LAI.1
          CMP.L     (A5)+,D3
          BGE.S     LAI.1

SUBQ.L    #4,A5
LAI.2     MOVE.L    (A5),D0
          BEQ.S     LAI.3
          BSR.S     LAI.10
          BMI.S     LAI.2
          MOVE.L    D3,(A5)+
          MOVE.L    D0,D3
          BRA.S     LAI.2

LAI.3     MOVE.L    D3,(A5)
          ADDQ.L    #1,(A3)
          RTS

*****
*****     SUBROUTINE   LAI.10
*****
LAI.10    BPL.S     LAI.1X
          MOVE.L    (A5),D0
          LSL.L     #1,D0
          MOVE.L    D0,A6
          BNE.S     LAI.11
          BSR.S     GET_MEM
          TAS.B     LINK(A6)
          MOVE.L    A6,D0
          LSR.L     #1,D0
          MOVE.L    D0,(A5)
          TAS.B     (A5)
          MOVE.L    A5,D0
          SUBQ.L    #4,D0
          LSR.L     #1,D0
          MOVE.L    D0,(A6)
          TAS.B     (A6)
```

```
LAI.11      LEA.L       4(A6),A5
            MOVE.W      #%00001000,CCR
LAI.1X      RTS

PAGE
****************************************************************************
* PGM:      GET_SLIC - Get slice from object column
*
* ENT:      D4.W =  WORK.C  of the object column
*           A2   -> WORK.RP    ( working record pointer )
*           A3   -> WORK.FP    ( working field pointer )
*
* RTN:      Z-bit = 1   ==>   no more slice in column
*           Z-bit = 0   ==>   D3 contain working slice of the column
****************************************************************************
GET_SLIC    CMP.B       #MAX.SLIC,D4    )
            BLO.S       GET.SLIC TST.L       (A2)
            BNE.S       NXTSLREC
            MOVEQ       #0,D3
            BRA.S       GOT.SLIC NXTSLREC    MOVEA.L     (A2),A2
            MOVEA.L     A2,A3
            MOVEQ       #1,D4
GET.SLIC    ADDQ.B      #1,D4
            MOVE.L      (A3)+,D3

GOT.SLIC    RTS

*****       Obtain empty 64-byte record from system
GET_MEM     JSR         GET64
            BEQ.S       NOMEM
            RTS
NOMEM       MOVEQ.L     #6,D0
            XREF        .ABRTPRC
            JMP         .ABRTPRC

****************************************************************************
            END

FILLVERT    IDNT        2,14        META OBJECT

****************************************************************************
*
*           MODULE NAME:  FILLVERT.SA                (C) COPYRIGHT 1986 GTX CORP
*
*           REVISION HISTORY    V
*                               E R
*                               R E
*           AUTHOR      DATE    S V
*           ------      ----    ---
*           A. LAI      10/14/86    2,14- New memory release scheme
*           A. LAI      07/16/86    2,13- Fix bug in FIL_HOLE - set open list ptrs
*           A. LAI      06/04/86    2,12- Add test in FUN12 before INS_OPL
*           A. LAI      05/27/86    2,11- Fix Bug in END_WALL when Hole just filled
*           A. LAI      05/21/86    2,10- Fix bug in Special Case Handler in FUNG1
*           A. LAI      05/13/86    2,9 - Cancel Prev_Slice ptr in open list nodes
*           A. LAI      05/10/86    2,8 - New Memory Management Mechanism
*           A. LAI      05/05/86    2,7 - New FILLVERT which fills all closed holes
*           A. LAI      04/29/86    2,6 - Combine FILVERT1 and FILVERT2
*           A. LAI      04/23/86    2,5 - Multi-row Overlap of Consecutive Frames
*           A. LAI      04/21/86    2,4 - Accepting New Frame Row Link Structure
*           A. LAI      04/09/86    2,3 - Add special case handler in FUNG1
*           A. LAI      04/09/86    2,2 - Add Row_Ptr and Update Frame Slice Count
*           A. LAI      04/04/86    2,1 - Multi-Row Vertical Holes Filling
*           L. MISH     03/14/86    1,1 - Fixed faulty init of local variable table
*           L. MISH     03/11/86    1,0 - Changed to run with multiple processors
```

```
*       L.MISH      03/05/86    0,6 - Rewrote FIL_HOLE
*       L.MISH      02/25/86    0,5 - Fixed bugs causing bad prev ^
*       L.MISH      02/13/86    0,4 - Added .ABORT when out of RAM
*       L.MISH      02/09/86    0,3 - Replaced common code with OBGRAB version
*       L.MISH      01/26/86    0,2 - Altered to interface with METACTRL
*       J.ROYE      01/11/86    0,1 - Original version, a copy of OBGRAB
*
*       MODULE DESCRIPTION:  Fill multi-row holes of any size, which
*                            are totally spanned above and below.
*
*       ENTRY CONDITIONS:
*
*       EXIT CONDITIONS:
*
*              REGISTERS USED
*         0   1   2   3   4   5   6   7
*        ---------------------------------
*     A  |P   P   P   P   P   P   P   P|
*        ---------------------------------
*     D  |P   P   P   P   P   P   P   P|
*        ---------------------------------
*         * = DESTROYED
*         P = REGISTER USED BUT PRESERVED
*         E = ENTRY PARAMETER - PRESERVED
*         B = ENTRY PARAMETER & RETURN VALUE
*         R = RETURN VALUE
*
*       NOTES:  USE A.CF FILLVERT TO ASSEMBLE
*
*************************************************************************
             TTL       META OBJECT FILL XDEF      INITFV,FILLSLIC,FILLVERT
             XREF      GET64,.ABRTPRC
             PAGE
             INCLUDE   RELEASE

PAGE
.SFTFLTR     EQU       1

OFFSET    4
LFT_CNT      DS.W      1
RGT_CNT      DS.W      1
LFT_PTR      DS.L      1
RGT_PTR      DS.L      1
SLIC_PTR     DS.L      1
OPEN_A1      DS.W      1
             DS.W      1

OFFSET    0
             DS.L      1
LFT_MRK      DS.W      1
RGT_MRK      DS.W      1
LFT_PTR1     DS.L      1
RGT_PTR1     DS.L      1
             DS.L      12

OFFSET    0
OPEN_CUR     DS.L      1
PREV_CUR     DS.L      1
C_OPENCT     DS.L      1
OPEN_CNT     DS.L      1

A1.W         DS.W      1
A2.W         DS.W      1
B1.W         DS.W      1
B2.W         DS.W      1
B_S_PTR      DS.L      1
A_N_USED     DS.B      1
B_USED       DS.B      1
EOL          DS.B      1
FIL_FLAG     DS.B      1
ROW_PTR      DS.L      1
```

```
            DS.W      1
B_LENGTH    DS.W      1
GETBVARS    DS.L      3

OPEN_HD     DS.L      1
OP_HEAD     DS.L      1

INCLUDE   .METADATA
            PAGE

SECTION 0

LOC.VAR     DS.B      OP_HEAD-OPEN_CUR+4

INITSUB     LEA       LOC.VAR,A0
            MOVE.L    A4,ROW_PTR(A0)
            MOVEA.L   A4,A5
            TST.L     (A5)+
            MOVEQ     #FRAMESIZ-2,D7

MOVEM.L   D7/A4-A5,GETBVARS(A0)
            CLR.B     EOL(A0)
            MOVE.L    OPEN_HD(A0),OPEN_CUR(A0)

RTS

INITFV      MOVEM.L   D0-D7/A0-A5,-(A7)

LEA       LOC.VAR,A0
            MOVEA.L   A0,A2
            MOVEQ     #(OP_HEAD-OPEN_CUR)/4,D3
FOR1        CLR.L     (A2)+
            DBRA      D3,FOR1

LEA       OP_HEAD(A0),A5
            MOVE.L    A5,OPEN_HD(A0)

BSR.S     INITSUB
            BSR       GETNEXTB
            BSR       NEW.BRAN

FILLV.X     MOVEM.L   (A7)+,D0-D7/A0-A5
            RTS
            PAGE

FILLSLIC    MOVEM.L   D0-D3/A0-A2,-(A7)
            LEA.L     LOC.VAR,A0
            MOVE.L    OPEN_HD(A0),A0
            MOVE.L    (A0),A2
            LEA.L     4*FRAMESIZ(A3),A1
            SUB.L     A4,A1
            MOVE.L    A1,D2

NXT_OPL     TST.L     (A0)
            BEQ       FILSLICX
            MOVE.L    (A0),A0

CUR_SLC     MOVE.L    SLIC_PTR(A0),D1
            CMP.L     #FRAME,D1
            BLO.S     LFT_REC
            CMP.L     #FRAME+4*FRAMESIZ*(SWATHSIZ+HOLE_CNT),D1
            BHS.S     LFT_REC
            SUB.L     D2,SLIC_PTR(A0)

LFT_REC     MOVE.W    LFT_CNT(A0),D0
            BEQ.S     RGT_REC
            MOVE.L    LFT_PTR(A0),A1
            TST.W     RGT_MRK(A1)
            BEQ.S     RGT_REC
            LEA.L     RGT_PTR1(A1),A1
```

```
              CMP.W      RGT_CNT(A0),D0
              BGE.S      L_GE_R
              MOVE.W     RGT_CNT(A0),D0

L_GE_R        CMP.W      #HOLE_CNT,D0
              BLE.S      INT_LCNT
              SUBQ.W     #1,D0
INT_LCNT      SUBQ.W     #1,D0
NXT_RGT       MOVE.W     D0,D1
              LSL.W      #3,D1
              MOVE.L     (A1,D1),D3
              CMP.L      #FRAME,D3
              BLO.S      NXT_RGT1
              CMP.L      #FRAME+4*FRAMESIZ*(SWATHSIZ+HOLE_CNT),D3
              BHS.S      NXT_RGT1
              SUB.L      D2,(A1,D1)
NXT_RGT1      DBRA       D0,NXT_RGT
              PAGE

CMP.L      A2,A0
              BNE.S      RGT_REC
              MOVE.L     LFT_PTR(A0),A1
              LEA.L      LFT_PTR1(A1),A1
              ADD.L      #1,A2
              MOVE.W     LFT_CNT(A0),D0
              CMP.W      RGT_CNT(A0),D0
              BGE.S      L_GE_R
              MOVE.W     RGT_CNT(A0),D0
              BRA.S      L_GE_R

RGT_REC       MOVE.W     RGT_CNT(A0),D0
              BEQ        NXT_OPL
              MOVE.L     RGT_PTR(A0),A1
              TST.W      LFT_MRK(A1)
              BEQ        NXT_OPL
              LEA.L      LFT_PTR1(A1),A1
              CMP.W      LFT_CNT(A0),D0
              BGE.S      R_GE_L
              MOVE.W     LFT_CNT(A0),D0

R_GE_L        CMP.W      #HOLE_CNT,D0
              BLE.S      INT_RCNT
              SUBQ.W     #1,D0
INT_RCNT      SUBQ.W     #1,D0
NXT_LFT       MOVE.W     D0,D1
              LSL.W      #3,D1
              MOVE.L     (A1,D1),D3
              CMP.L      #FRAME,D3
              BLO.S      NXT_LFT1
              CMP.L      #FRAME+4*FRAMESIZ*(SWATHSIZ+HOLE_CNT),D3
              BHS.S      NXT_LFT1
              SUB.L      D2,(A1,D1)
NXT_LFT1      DBRA       D0,NXT_LFT

BRA        NXT_OPL

FILSLICX      MOVEM.L    (A7)+,D0-D3/A0-A2
              RTS

PAGE
FILLVERT      MOVEM.L    D0-D7/A0-A5,-(A7)

BSR        INITSUB
              BSR        GETNEXTA
              BSR        GETNEXTB
              MOVE.L     OPEN_CNT(A0),C_OPENCT(A0)

TOP           TST.B      EOL(A0)
              BNE        BOTTOM1
              TST.L      C_OPENCT(A0)
              BEQ        BOTTOM1

MOVEM.W    A1.W(A0),D1-D4
```

```
                CMP.W     D3,D1
                BEQ.S    A1.EQ.B1
                BLO.S    A1.LT.B1
                BHI.S    A1.GT.B1

FUNG1           TST.B    A_N_USED(A0)
                BEQ.S    LAI.1
                TST.B    FIL_FLAG(A0)
                BEQ.S    LEM.25

* SPECIAL CASE WHEN ANOTHER HOLE EXISTS AFTER A HOLE IS FILLED:
                CLR.B    FIL_FLAG(A0)
                SUBQ.L   #1,OPEN_CNT(A0)
                MOVE.L   OPEN_CUR(A0),A2
                MOVE.L   (A2),A5
                .RELEASE A2
                MOVE.L   PREV_CUR(A0),A4
                MOVE.L   A5,(A4)
                MOVE.L   A4,OPEN_CUR(A0)
*               BSR      GETA

LAI.1           ADDQ.B   #1,B_USED(A0)
                CLR.B    A_N_USED(A0)
                BSR      NEW_HOLE
                RTS
LEM.25          BSR      ATACHB2A
                RTS
                PAGE

A1.EQ.B1        CMP.W    D4,D2
                BEQ.S    FUN6
                BHI.S    FUN7

FUN5            BSR      ATACHB2A
                BRA.S    NEXTA

FUN7            BSR      ATACHB2A
                BRA.S    NEXTB

FUN6            BSR      ATACHB2A
NEXTAB          BSR      GETNEXTA
NEXTB           BSR      GETNEXTB
GO.TOP          BRA      TOP
                PAGE
A1.LT.B1        CMP.W    D3,D2
                BHS.S    A2.GE.B1

A2.LT.B1        ADDQ.B   #.SFTFLTR,D2
                CMP.W    D3,D2
                BHS.S    FUN1

BSR.S    FUN0
                BRA.S    GO.TOP

A2.GE.B1        CMP.W    D4,D2
                BEQ.S    FUN3
                BHI.S    FUN4

FUN1            BSR      FUNG1
NEXTA           BSR      GETNEXTA
                BRA.S    GO.TOP

FUN3            BSR      FUNG1
                BRA.S    NEXTAB
FUN4            BSR      FUNG1
                BRA.S    NEXTB

A1.GT.B1        CMP.W    D4,D1
                BLS.S    A1.LE.B2

A1.GT.B2        ADDQ.B   #.SFTFLTR,D4
                CMP.W    D4,D1
                BLS.S    FUN10
```

```
                BSR.S     FUN12
                BRA.S     GO.TOP

A1.LE.B2        CMP.W     D4,D2
                BEQ.S     FUN9
                BLO.S     FUN8

FUN10           TST.B     B_USED(A0)
                BEQ.S     FUN7

BSR       FIL_HOLE
                BRA.S     NEXTB

FUN8            BSR.S     FUNG3
                TST.B     A_N_USED(A0)
                BEQ.S     NEXTA
                BRA.S     GO.TOP

FUN9            BSR.S     FUNG3
                TST.B     A_N_USED(A0)
                BNE.S     NEXTB
                BRA.S     NEXTAB
                PAGE
FUNG3           TST.B     B_USED(A0)
                BEQ.S     ATACH
                BSR       FIL_HOLE

BSR       DEL_OPL
                BRA.S     LEM.27
ATACH           BSR       ATACHB2A
LEM.27          TST.B     A_N_USED(A0)
                BNE.S     FUNG3.
LEM.29          BSR       GETNEXTA
FUNG3.          RTS

FUN0            TST.B     A_N_USED(A0)
                BEQ.S     LEM.29
                BSR       END_WALL
                BSR       DEL_OPL
                RTS

FUN12           TST.B     B_USED(A0)
                BNE.S     FUN12.
                MOVEA.L   PREV_CUR(A0),A2
                MOVEA.L   OPEN_CUR(A0),A3

TST.W     RGT_CNT(A2)
                BEQ.S     DO_INS
                TST.W     LFT_CNT(A3)
                BEQ.S     DO_INS
                MOVE.L    LFT_PTR(A3),A3
                CMP.L     RGT_PTR(A2),A3
                BEQ.S     FUN12.

DO_INS          MOVEA.L   A2,A3
                BSR       INS_OPL
                MOVE.L    (A2),PREV_CUR(A0)
FUN12.          BSR.S     GETNEXTB
LEM.15          RTS

NEW.BRAN        TST.B     EOL(A0)
                BNE.S     LEM.15

FUN13           MOVEA.L   OPEN_CUR(A0),A3
                BSR       INS_OPL
                MOVE.L    A3,PREV_CUR(A0)
                MOVE.L    (A3),OPEN_CUR(A0)
                BSR.S     GETNEXTB
                BRA.S     NEW.BRAN

PAGE
BOTTOM1         TST.B     EOL(A0)
                BNE.S     DEL_ENTS
```

```
            TST.B     B_USED(A0)
            BEQ.S     LEM.28
            BSR.S     GETNEXTB

LEM.28      TST.B     EOL(A0)
            BNE.S     LEM.21
            TST.L     OPEN_CUR(A0)
            BEQ.S     LEM.20
            TST.L     C_OPENCT(A0)
            BNE.S     LEM.21

LEM.20      MOVE.L    PREV_CUR(A0),OPEN_CUR(A0)

LEM.21      BSR.S     NEW.BRAN

DEL_ENTS    TST.L     C_OPENCT(A0)
            BLS.S     GOEXIT

TST.B     A_N_USED(A0)
            BNE.S     LEM.23
            BSR.S     GETNEXTA

LEM.23      TST.L     C_OPENCT(A0)
            BEQ.S     GOEXIT
            BSR       FUN0
            BRA.S     LEM.23

GOEXIT      BRA       FILLV.X
            PAGE
GETNEXTB    MOVEM.L   GETBVARS(A0),D7/A1-A2

NEXTB_2     TST.B     D7
            BNE.S     GETB
            TST.L     (A2)
            BEQ.S     GETB

MOVEQ     #CONTSIZE-2,D7
            MOVEA.L   (A2),A2
            MOVEA.L   A2,A1
            ADDQ.L    #4,A2

GETB        SUBQ.B    #1,D7
            MOVE.L    A2,B_S_PTR(A0)
            MOVE.L    (A2)+,D1
            BMI.S     NEXTB_2
            BNE.S     PROCB
            ADDQ.B    #1,EOL(A0)
            BRA.S     GOTB

PROCB       MOVE.W    D1,B_LENGTH(A0)
            MOVE.W    D1,D2
            SWAP      D1
            ADD.W     D1,D2
            SUBQ.W    #1,D2
            MOVEM.W   D1-D2,B1.W(A0)

GOTB        CLR.B     B_USED(A0)
            MOVEM.L   D7/A1-A2,GETBVARS(A0)
            RTS

GETA        MOVEA.L   OPEN_CUR(A0),A5
            CLR.B     FIL_FLAG(A0)
            MOVE.L    A5,D1
            BEQ.S     GETA.X

MOVE.L    OPEN_A1(A5),A1.W(A0)

GETA.X      ADDQ.B    #1,A_N_USED(A0)
            RTS

GETNEXTA    SUBQ.L    #1,C_OPENCT(A0)
            MOVEA.L   OPEN_CUR(A0),A5
            MOVE.L    A5,PREV_CUR(A0)
            MOVE.L    (A5),OPEN_CUR(A0)
```

```
                BSR.S   GETA
                RTS
                PAGE
ATACHB2A        MOVEA.L OPEN_CUR(A0),A2

MOVE.L  B1.W(A0),OPEN_A1(A2)
                MOVE.L  B_S_PTR(A0),SLIC_PTR(A2)

ADDQ.B  #1,B_USED(A0)
                CLR.B   A_N_USED(A0)

BSR.S   PROC_LFT
                BSR     PROC_RGT

RTS

INS_OPL         ADDQ.L  #1,OPEN_CNT(A0)
                BSR.S   GET_MEM
                MOVE.L  (A3),(A6)
                MOVE.L  A6,(A3)

MOVE.L  B1.W(A0),OPEN_A1(A6)
                MOVE.L  B_S_PTR(A0),SLIC_PTR(A6)
                RTS

DEL_OPL         SUBQ.L  #1,OPEN_CNT(A0)
                SUBQ.L  #1,C_OPENCT(A0)

MOVEA.L OPEN_CUR(A0),A2
                MOVEA.L (A2),A5

.RELEASE A2

MOVEA.L PREV_CUR(A0),A4
                MOVE.L  A5,(A4)
                MOVE.L  A5,OPEN_CUR(A0)

BSR     GETA
                RTS

GET_MEM         JSR     GET64
                BEQ.S   NOMORE
                RTS

NOMORE          MOVE.B  #7,D0
                JMP     .ABRTPRC

PAGE

* Process the hole on the left side of the current slice
*       Input:   A2 -> open list node to be processed

PROC_LFT:

MOVE.W  LFT_CNT(A2),D0
                BEQ.S   PROC_LFX

MOVE.L  LFT_PTR(A2),A3
                TST.W   LFT_MRK(A3)
                BEQ.S   LMARK_0

CMP.W   #HOLE_CNT,D0
                BGE.S   LFT_FULL
                LEA.L   RGT_PTR1(A3),A4
                LSL.W   #3,D0
                MOVE.L  B_S_PTR(A0),(A4,D0)
                ADDQ.W  #1,LFT_CNT(A2)
                BRA.S   PROC_LFX

LFT_FULL        CLR.W   RGT_MRK(A3)
                CLR.W   LFT_CNT(A2)
                CLR.L   LFT_PTR(A2)
                BRA.S   PROC_LFX
```

```
LMARK_0   .RELEASE    A3
          CLR.W       LFT_CNT(A2)
          CLR.L       LFT_PTR(A2)

PROC_LFX  RTS

PAGE

* Process the hole on the right side of the current slice
*       Input:    A2 -> open list node to be processed

PROC_RGT:

MOVE.W      RGT_CNT(A2),D0
          BEQ.S       PROC_RGX

MOVE.L      RGT_PTR(A2),A3
          TST.W       RGT_MRK(A3)
          BEQ.S       RMARK_0

CMP.W       #HOLE_CNT,D0
          BEQ.S       RGT_FUL1
          BGT.S       RGT_FULL
          LEA.L       LFT_PTR1(A3),A4
          LSL.W       #3,D0
          MOVE.L      B_S_PTR(A0),(A4,D0)

RGT_FUL1  ADDQ.W      #1,RGT_CNT(A2)
          BRA.S       PROC_RGX

RGT_FULL  CLR.W       LFT_MRK(A3)
          CLR.L       RGT_PTR(A2)
          BRA.S       PROC_RGX

RMARK_0   .RELEASE    A3
          CLR.W       RGT_CNT(A2)
          CLR.L       RGT_PTR(A2)

PROC_RGX  RTS

PAGE

* If there exists a hole, generate hole record and open list node
*       Control comes here when A slice is used
*       more than once.

NEW_HOLE  MOVE.L      OPEN_CUR(A0),A3

MOVE.W      RGT_CNT(A3),D0
          BEQ.S       RGT_HOLE
          MOVE.L      RGT_PTR(A3),A4
          MOVE.W      D0,D1

CMP.W       #HOLE_CNT,D0
          BGT.S       CREATE

SUBQ.W      #1,D1
          LSL.W       #3,D1
          LEA.L       LFT_PTR1(A4),A2
          MOVE.L      B_S_PTR(A0),(A2,D1)
CREATE    BSR         INS_OPL
          MOVE.L      A3,PREV_CUR(A0)
          MOVE.L      A6,OPEN_CUR(A0)
          MOVE.W      D0,RGT_CNT(A6)
          MOVE.L      A4,RGT_PTR(A6)
          BRA.S       NEW_REC

RGT_HOLE  BSR         INS_OPL
          MOVE.L      A3,PREV_CUR(A0)
          MOVE.L      A6,OPEN_CUR(A0)

NEW_REC   MOVE.L      A6,A4
          BSR         GET_MEM
          MOVEQ.L     #1,D1
```

```
                MOVE.W      D1,LFT_CNT(A4)
                MOVE.L      A6,LFT_PTR(A4)
                MOVE.W      D1,RGT_CNT(A3)
                MOVE.L      A6,RGT_PTR(A3)

MOVE.W      D1,RGT_MRK(A6)
                MOVE.W      D1,LFT_MRK(A6)
                MOVE.L      SLIC_PTR(A3),LFT_PTR1(A6)
                MOVE.L      B_S_PTR(A0),RGT_PTR1(A6)
                RTS

PAGE
* Filling vertical hole if hole is valid
*        Control comes here when B slice
*        is used more than once.

FIL_HOLE    MOVE.L   OPEN_CUR(A0),A2
            MOVEA.L  SLIC_PTR(A2),A2
            LEA.L    -4(A2),A3
            ADDQ.B   #1,FIL_FLAG(A0)

NXT_SLIC    MOVE.L   (A3),D1
            BPL.S    GOT_SLIC
            LSL.L    #1,D1
            MOVE.L   D1,A3
            BRA.S    NXT_SLIC

GOT_SLIC    SWAP.W   D1
            SUB.W    D1,D2
            ADDQ.W   #1,D2
            MOVEM.W  D1-D2,(A3)

MOVE.L   A3,D1
            LSR.L    #1,D1
            MOVE.L   D1,(A2)
            TAS      (A2)
            MOVE.L   ROW_PTR(A0),A3
            LEA.L    -4*FRAMESIZ(A3),A3
            SUBQ.L   #1,(A3)

MTI_ROW     MOVE.L   OPEN_CUR(A0),A2
            MOVE.L   LFT_PTR(A2),A3

MOVE.W   LFT_CNT(A2),D0
            BEQ.S    FIL_HOLX
            TST.W    LFT_MRK(A3)
            BEQ.S    FIL_HOLX

SUBQ.W   #1,D0
            LEA.L    LFT_PTR1(A3),A4
            BSR.S    FIL_PAIR

.RELEASE A3
FIL_HOLX    MOVE.L   PREV_CUR(A0),A3
            MOVE.W   RGT_CNT(A2),RGT_CNT(A3)
            MOVE.L   RGT_PTR(A2),RGT_PTR(A3)

MOVE.L   A3,A2
            BSR      PROC_RGT
            RTS
            PAGE

*****    Filling Pairs of Slices in Hole
*****    Input:   A4 -) 1st left slice ptr in Hole Record
*****             D0 = Loop Count for # of Pairs in Record ( n-1 )

FIL_PAIR    MOVE.L   (A4)+,A5
            MOVE.L   (A4)+,A6
            MOVE.L   A5,-(A7)
            BEQ.S    MARKOUT
            MOVE.L   A6,D1
            BEQ.S    MARKOUT
            MOVE.L   (A5),D1
```

```
          BPL.S      RGT_SLC
LFT_SLC   LSL.L      #1,D1
          MOVE.L     D1,A5
          MOVE.L     (A5),D1
          BMI.S      LFT_SLC

RGT_SLC   MOVE.L     (A6),D2
          BMI.S      MARKOUT
          CLR.W      D1
          SUB.L      D1,D2
          MOVE.W     D2,D1
          SWAP.W     D2
          ADD.W      D2,D1

MOVE.L     D1,(A5)
          MOVE.L     A5,D1
          LSR.L      #1,D1
          MOVE.L     D1,(A6)
          TAS.B      (A6)
          MOVE.L     ROW_PTR(A0),A5
          MOVE.W     D0,D2
          ADDQ.W     #1,D2
          MULS.W     #-(4*FRAMESIZ),D2
          SUBQ.L     #1,(A5,D2)

GO_LFT    MOVE.L     -(A6),D2
          CMP.L      (A7),A6
          BEQ.S      MARKOUT
          TST.L      D2
          BMI.S      BACK_LNK
          MOVE.L     D1,(A6)
          TAS.B      (A6)
          BRA.S      GO_LFT
BACK_LNK  LSL.L      #1,D2
          MOVE.L     D2,A6
          ADDQ.L     #4,A6
          BRA.S      GO_LFT

MARKOUT   TST.L      (A7)+
          DBRA       D0,FIL_PAIR

RTS
          PAGE

* End a wall, or a vertival column of slices
*         Control comes here when no more
*         slice attach to the open list
*         node slice.

END_WALL  MOVE.L     OPEN_CUR(A0),A2
          TST.B      FIL_FLAG(A0)
          BNE.S      END_WALX

MOVE.W     LFT_CNT(A2),D0
          BEQ.S      END_RGT

MOVE.L     LFT_PTR(A2),A3
          TST.W      LFT_MRK(A3)
          BNE.S      RGT_0
          .RELEASE   A3
          BRA.S      END_RGT
RGT_0     CLR.W      RGT_MRK(A3)

TST.W      RGT_CNT(A2)
          BEQ.S      END_WALX
          MOVE.L     RGT_PTR(A2),A3
          TST.W      RGT_MRK(A3)
          BNE.S      FIL_WALL

END_RGT   TST.W      RGT_CNT(A2)
          BEQ.S      END_WALX
```

```
            MOVE.L      RGT_PTR(A2),A3
            TST.W       RGT_MRK(A3)
            BNE.S       LFT_0
            .RELEASE    A3
            BRA.S       END_WALX

END_WALX    RTS

PAGE

FIL_WALL    MOVE.L      LFT_PTR(A2),A3
            LEA.L       LFT_PTR1(A3),A4
            SUBQ.W      #1,D0
            BSR         FIL_PAIR
            .RELEASE    A3

MOVE.L      PREV_CUR(A0),A3
            CMP.L       OPEN_HD(A0),A3
            BEQ.S       END_WALX
            CLR.W       RGT_CNT(A3)
            CLR.L       RGT_PTR(A3)

MOVE.L      RGT_PTR(A2),RGT_PTR(A3)
            MOVE.W      RGT_CNT(A2),RGT_CNT(A3)
            ADDQ.W      #1,RGT_CNT(A3)
            MOVE.L      B_S_PTR(A0),A6
            MOVE.L      SLIC_PTR(A3),B_S_PTR(A0)
            BSR         PROC_RGT
            MOVE.L      A6,B_S_PTR(A0)

BRA.S       END_WALX

****************************************************************************
*           END OF FILLVERT   (VERSION 3)
****************************************************************************
            END

FILLHORZ              IDNT  1,3

****************************************************************************
*
*           MODULE NAME:  FILLHORZ.SA              (C) COPYRIGHT 1986 GTX CORP
*
*           REVISION HISTORY       V
*                                  E R
*                                  R E
*           AUTHOR      DATE       S V  - ADD CHANGES TO THE TOP
*           ------      ----       ---  --------------------------
*           A. LAI      05/01/86   1,3 - New FILLVERT which fills all closed holes
*           A. LAI      04/23/86   1,2 - Multi-row Overlap of Consecutive Frames
*           A. LAI      04/21/86   1,1 - Accepting New FRAME Structure of conditonal
*           LEM         03/11/86   1,0 - Separated from METACTRL
*
*           MODULE DESCRIPTION:        D0.W = SWATH CEILING   A0 ^ TO GLOBAL VARS
*              ENTRY CONDITIONS:       D2.W = LOOP LIMIT      A2 WORK REG
*              EXIT CONDITIONS:        D4.W = SLICE COUNT     A4 ^ TO FRAME
*                 REGISTERS USED       D6.W = Y               A6 ^ TO FREE SPACE
*               0 1 2 3 4 5 6 7        D7.W = MAX Y
*              ------------------
*           A |* * * * * * B P|
*              ------------------
*           D |* * * * * * * *|
*              ------------------
*                 * = DESTROYED
*                 P = REGISTER USED BUT PRESERVED
*                 E = ENTRY PARAMETER - PRESERVED
*                 B = ENTRY PARAMETER & RETURN VALUE
*                 R = RETURN VALUE
*
*           NOTES:  USE A.CF FILLHORZ TO ASSEMBLE
*
****************************************************************************
```

```
            TTL     META OBJECT FILL HORIZONTAL
            XDEF    FILLHORZ

PAGE
EPSILON     EQU     5

INCLUDE METADATA

SECTION 0
ROW_PTR     DS.L    1

PAGE
ADV_CUR1    MOVE.L  A5,D0
            BNE.S   LEM.2
            TST.L   4(A2)
            BEQ.S   LEM.2
            MOVEA.L 4(A2),A2
            MOVEA.L A2,A1
            MOVEQ   #CONTSIZE-2,D0
            MOVEA.L D0,A5
LEM.2       SUBQ.L  #1,A5
            TST.L   (A2)+
            MOVEM.W (A2),D0-D1
            ADDQ.L  #1,D6
            RTS

ADV_CUR2    MOVE.L  A6,D2
            BNE.S   LEM.3
            TST.L   4(A4)
            BEQ.S   LEM.3
            MOVEA.L 4(A4),A4
            MOVEA.L A4,A3
            MOVEQ   #CONTSIZE-2,D2
            MOVEA.L D2,A6
LEM.3       SUBQ.L  #1,A6
            TST.L   (A4)+
            MOVEM.W (A4),D2-D3
            ADDQ    #1,D7
            RTS

PAGE
FILLHORZ    MOVEM.L D0-D7/A0-A6,-(A7)
            MOVE.L  A4,ROW_PTR
            MOVEA.L A4,A1
            MOVEA.L A1,A3
            MOVEA.L A1,A2
            MOVEA.L A1,A4
            MOVEQ   #FRAMESIZ-2,D4
            MOVEA.L D4,A5
            MOVEA.L D4,A6
            MOVEQ   #1,D6
            MOVEQ   #0,D7

BSR.S   ADV_CUR1
ADV.2       BSR.S   ADV_CUR2

TOP         TST.W   D3
            BEQ.S   FIL_HORX

MOVE.W  D2,D4
            SUB.W   D0,D4
            SUB.W   D1,D4

CMP.W   #EPSILON,D4
            BHS.S   NOHOLE

MOVE.L  ROW_PTR,A0
            SUBQ.L  #1,(A0)
            ADD.W   D2,D3
            SUB.W   D0,D3
```

```
                SWAP       D0
                MOVE.W     D3,D0
                MOVE.L     D0,(A2)

LEM.1           MOVEM.W    (A2),D0-D1
                CLR.L      (A4)
                BRA.S      ADV.2

NOHOLE          CMP.L      D6,D7
                BMI.S      ADV.2

BSR        ADV_CUR1

TST.W      D1
                BNE.S      TOP

MOVE.L     (A4),(A2)
                BRA.S      LEM.1

FIL_HORX        MOVEM.L    (A7)+,D0-D7/A0-A6
                RTS

END

*****   INITMG - INITIALIZATION OF METAGRAB ROUTINE ******************
*
* ENT:   A4 = FRAME POINTER
*        D1.W = ROW #
*
* RET:   MOB_PTR - META OBJECT HEADER ADDRESS IS UPDATED
*
**********************************************************************
INITMG          LEA.L      GLO_RAM(PC),A0

*               ***** clear the local storage area - "global ram" :
                MOVE.W     #RAM_SIZE,D0
                SUBQ.W     #1,D0
CLR_NEXT        CLR.B      (A0,D0.W)
                DBRA       D0,CLR_NEXT

*               ***** initialize REC_LST record and related variables:
                JSR        GET64
                BEQ        NOMEM
                MOVE.L     A6,REC_LST(A0)
                MOVE.L     A6,LST_PTR(A0)
                ADDQ.L     #4,A6
                MOVE.L     A6,LST_FLD(A0)
                MOVE.W     #-1,LST_CNT(A0)

*               ***** initialize some of the local variables:
                LEA.L      OP_HEAD(A0),A1
                MOVE.L     A1,OPEN_HD(A0)
                MOVE.L     A1,OPEN_CUR(A0)
                EXT.L      D1
                MOVE.L     D1,ROW(A0)
                MOVE.L     A4,A5
                ADDQ.L     #4,A5
                MOVEQ.L    #FRAMESIZ-2,D7
                MOVEM.L    D7/A4/A5,GETBVARS(A0)
                BSR        GETNEXTB

*               ***** create meta object header:
                BSR        GET_MEM
                MOVE.W     #TYPE_HED,TYPE(A6)
                LEA.L      BBR_PTR(A6),A2
                MOVE.L     A2,MFLD_PTR(A0)
                MOVE.L     A6,META_HD(A0)
                MOVE.L     A6,MREC_PTR(A0)
                SUBQ.W     #1,MREC_CNT(A0)

*               ***** loop to set branch ptrs of header (in 1st row only):
                WHILE.B    EOL(A0) (EQ) #FALSE
                  ADDQ.W   #1,META_CNT(A0)
                  ADDQ.W   #1,MREC_CNT(A0)
```

```
*           ***** generate cont' record of header if need:
            BSR.S   CONT_HED

*           ***** create new branches and link to the header:
            BSR     NEW_BRAN
            MOVE.L  MFLD_PTR(A0),A2
            MOVE.L  A4,(A2)+
            MOVE.L  A2,D2
            ADDQ.L  #4,A2
            MOVE.L  A2,MFLD_PTR(A0)
            MOVE.L  OPEN_CUR(A0),A3
            BSR     INS_OPL
            MOVE.L  (A3),OPEN_CUR(A0)
            BSR     GETNEXTB

ENDW

*           ***** store branch # into header record:
            MOVE.L  META_HD(A0),A2
            MOVE.W  META_CNT(A0),(A2)
            MOVE.L  A2,MOB_PTR RTS
************************************************************************
*       END OF INITMG
************************************************************************

***** subroutine CONT_HED ********************************************
*       Check if continous record is needed for meta obj header:
*
CONT_HED    MOVE.L  A1,-(A7)
            IF.W    MREC_CNT(A0) (GT) #META_MAX
            BSR     GET_MEM
            MOVE.W  #TYPE_HED,TYPE(A6)
            MOVE.L  MREC_PTR(A0),A1
            MOVE.L  A6,LINK_FOR(A1)
            MOVE.L  A1,LINK_PRV(A6)
            MOVE.L  A6,MREC_PTR(A0)
            ADDQ.L  #4,A6
            MOVE.L  A6,MFLD_PTR(A0)
            CLR.W   MREC_CNT(A0)
            ENDI
            MOVE.L  (A7)+,A1
            RTS
***** END OF CONT_HED ************************************************

METAGRAB    IDNT    0,10

************************************************************************
*
*       MODULE NAME:   METAGRAB.SA             (C) COPYRIGHT 1986 GTX CORP
*
*       REVISION HISTORY      V
*                             E R
*                             R E
*       AUTHOR      DATE      S V  - ADD CHANGES TO THE TOP
*       ------      --------  --------------------------------------------
*       A. LAI      08/08/86  0,10- BLOB records only when object is small
*       A. LAI      05/15/86  0, 9 - Fix Bug in Special Case Handlers
*       A. LAI      05/08/86  0, 8 - New Memory Management Mechanism
*       A. LAI      05/01/86  0, 7 - New FILLVERT which fills all closed holes
*       A. LAI      04/21/86  0, 6 - Accepting New Frame Row Link Structure
*       A. LAI      04/08/86  0, 5 - Fix Converge to call EndBranch
*       A. LAI      03/20/86  0, 4 - Release Meta Object
*       A. LAI      03/17/86  0, 3 - Multiprocessing Modifications
*       A. LAI      02/26/86  0, 2 - NewBranch, EndBranch, GrowBranch
*       J. ROYE     01/11/86  0, 1 - Original version, copy of OBGRAB
*
*       MODULE DESCRIPTION:    INITMG IS A ROUTINE TO DEAL WITH THE
*                              FIRST ROW IN THE FRAME WHICH IS SET UP
*                              BY METACTRL ROUTINE. ITS FUNCTION IS TO
*                              GENERATE META OBJECT HEADER RECORD AND
*                              INITIALIZE THE WHOLE PROCESS.  THEN
```

```
*                    THE FOLLOWING ROWS ARE HANDLED BY
*                    METAGRAB, ONE ROW AT A TIME, TO GROW,
*                    TO END BRANCHES, OR TO SHOW INCIDENCES
*                    OF DIVERGENCE AND CONVERGENCE OF
*                    BRANCHES.
*
*         ENTRY CONDITIONS:   REFER TO DESCRIPTION IN HEADINGS OF
*                             INITMG  AND  METAGRAB  ROUTINES.
*
*         EXIT CONDITIONS:    REFER TO DESCRIPTION IN HEADINGS OF
*                             INITMG  AND  METAGRAB  ROUTINES.
*
*              REGISTERS USED
*           0  1  2  3  4  5  6  7
*          ---------------------------
*        A |P  P  P  P  P  P  P  P|
*          ---------------------------
*        D |P  P  P  P  P  P  P  P|
*          ---------------------------
*           * = DESTROYED
*           P = REGISTER USED BUT PRESERVED
*           E = ENTRY PARAMETER - PRESERVED
*           B = ENTRY PARAMETER & RETURN VALUE
*           R = RETURN VALUE
*
*         NOTES:
*
*************************************************************

XDEF    METAGRAB,MOBREL
          XREF    MOB_PTR,GET64,BLOB

INCLUDE RELEASE
          PAGE

*
*                    THIS SET OF EQU'S DEFINES THE OFFSETS INTO THE GLOBAL
*                    VARIABLE TABLE (IN LOCAL RAM).  THE ADDRESS THAT THESE
*                    OFFSETS ARE ADDED TO IS STORED INTO REGISTER A0.  A0
*                    WILL POINT TO THIS TABLE THROUGH OUT THIS PROGRAM.

OFFSET  0

C_OPENCT  DS.L    1
OPEN_CNT  DS.L    1
A.1       DS.L    1
A.2       DS.L    1
B1        DS.L    1
B2        DS.L    1
B_LENGTH  DS.L    1
ROW       DS.L    1
OPEN_CUR  DS.L    1
PREV_CUR  DS.L    1
OPEN_HD   DS.L    1
RUN_LEN   DS.L    1
OP_HEAD   DS.L    1

A_N_USED  DS.B    1
B_USED    DS.B    1
EOL       DS.B    1

GETBVARS  DS.L    3
A_CONECT  DS.L    1
B_CONECT  DS.L    1
DIV_CNT   DS.W    1
CON_CNT   DS.W    1
DIV_HD    DS.L    1
CON_HD    DS.L    1
DREC_PTR  DS.L    1
DFLD_PTR  DS.L    1
DREC_CNT  DS.W    1
CREC_CNT  DS.W    1
CREC_PTR  DS.L    1
CFLD_PTR  DS.L    1
```

```
META_HD    DS.L    1
META_CNT   DS.W    1
MREC_CNT   DS.W    1
MFLD_PTR   DS.L    1
MREC_PTR   DS.L    1

DX         DS.L    4

REC_LST    DS.L    1
LST_PTR    DS.L    1
LST_FLD    DS.L    1
LST_CNT    DS.W    1

RAM_SIZE   EQU     *
           PAGE

*                  THESE EQU'S ARE SYMBOLIC VALUES FOR BOOLEAN FLAGS.

TRUE       EQU     1
FALSE      EQU     0
META_MAX   EQU     6-1
TRAP_MAX   EQU     7-1
BLOB_MAX   EQU     14-1
DIV_MAX    EQU     6-1
CON_MAX    EQU     6-1
LST_MAX    EQU     15-1

DDX_MAX    EQU     3
DDX_LEN    EQU     14

*DX_MAX    EQU     1
*COUNT     EQU     4

***** Data types # for elements of meta object records:
TYPE_HED   EQU     0
TYPE_DIV   EQU     1
TYPE_CON   EQU     2
TYPE_TRP   EQU     3
TYPE_BLO   EQU     4
TYPE_UNK   EQU     5
TYPE_UTR   EQU     6

INCLUDE  METADATA
           PAGE
***** offsets to open list record:
           OFFSET  4
SLICE1     DS.L    1
SLICE2     DS.L    1
SLICE3     DS.L    1
SLICE4     DS.L    1
S_BUFCNT   DS.W    1
DAT_TYPE   DS.W    1
MIN.DX0    DS.B    1
MAX.DX0    DS.B    1
MIN.DX1    DS.B    1
MAX.DX1    DS.B    1    .     )
DAT_HEAD   DS.L    1
START_Y    DS.W    1
DATA_CNT   DS.W    1
REC_PTR    DS.L    1
FLD_PTR    DS.L    1
REC_CNT    DS.L    1
BRA_HEAD   DS.L    1
OPEN_A1    DS.L    1
OPEN_A2    DS.L    1
TAILP.P    DS.L    1

***** offsets to meta object header record:
           OFFSET  0
PTRCNT     DS.W    1
TYPE       DS.W    1
BBR_PTR    DS.L    1
EBR_PTR    DS.L    1
```

```
                DS.L    10
                DS.L    1
LINK_PRV        DS.L    1
LINK_FOR        DS.L    1

*****   offsets to (di, con)vergence header record:
                OFFSET  0
                DS.W    1
                DS.W    1
BEG_PTR         DS.L    1
END_PTR         DS.L    1
SLICE_LF        DS.W    1
SLICE_Y         DS.W    1
SLICE_RT        DS.W    1
                DS.W    1
PTR0_BEG        DS.L    1
PTR0_END        DS.L    1
PTR1_BEG        DS.L    1
PTR1_END        DS.L    1
                DS.L    4
                DS.L    1
                DS.L    1
                DS.L    1
            PAGE

*****   offsets to blob header record:
                OFFSET  0
                DS.W    1
                DS.W    1
DOWN_PTR        DS.L    1
UP_PTR          DS.L    1
Y_START         DS.W    1
Y_END           DS.W    1
                DS.L    1
SLICES          DS.L    10
                DS.L    1

*****   offsets to trapezoid header record:
                OFFSET  0
                DS.W    1
                DS.W    1
                DS.L    1
                DS.L    1
                DS.L    1
                DS.L    1
BASE_X1         DS.W    1
BASE_X2         DS.W    1
                DS.L    10
                DS.L    1

*****   The following equates are to assign different offset names
*       for the memory locations which are carrying two functions
*       during the process.
FIRST           EQU     SLICE3
FIRSTMP         EQU     MIN.DX0
DX_CNT          EQU     SLICE3+1
DX0_SUMP        EQU     REC_PTR
DX1_SUMP        EQU     REC_PTR+2
DX0_SUMC        EQU     SLICE4
DX1_SUMC        EQU     SLICE4+2

PAGE
            SECTION 0

GLO_RAM     DS.B        RAM_SIZE
*****   The following constants should be defined by equates,
*       but they are defined in memory for the purpose of debugging.
COUNT1      DC.W        0
COUNT       DC.B        0
COUNT4      DC.B        4
DX_MAX      DC.W        1
```

```
          INCLUDE   INITMG

PAGE
*****  METAGRAB  **********************************************
*
*  ENT:   A4 = FRAME POINTER
*         D1.W = ROW  *
*
***************************************************************

METAGRAB  MOVEM.L   A0-A6/D0-D7,-(A7)
          TST.L     MOB_PTR
          BNE.S     METAGRB
          BSR       INITMG
          BRA       METAGRB1

METAGRB   LEA.L     GLO_RAM(PC),A0
          EXT.L     D1
          MOVE.L    D1,ROW(A0)
          MOVE.L    A4,A5
          ADDQ.L    #4,A5
          MOVEQ.L   #FRAMESIZ-2,D7
          MOVEM.L   D7/A4/A5,GETBVARS(A0)

MOVE.B    #TRUE,A_N_USED(A0)
          MOVE.B    #FALSE,B_USED(A0)
          CLR.L     A_CONECT(A0)
          CLR.L     B_CONECT(A0)

MOVE.B    #FALSE,EOL(A0)
          MOVE.L    OPEN_HD(A0),OPEN_CUR(A0)
          BSR       GETNEXTA
          BSR       GETNEXTB
          MOVE.L    OPEN_CNT(A0),C_OPENCT(A0)

*              THIS WHILE PROCESSES THE PART OF A SCAN LINE THAT
*              GEOMETRICALLY OVERLAPS THE OPEN LIST.

TOP       WHILE.B EOL(A0) (NE) #TRUE

MOVEM.L  A.1(A0),D1-D4

*              A1   (   B1
          IF.W D1 (LT) D3 THEN.S

*          CASE OF A1 ( B1
*$$$$$$$$$$$$$$$$$$$$$$$$$$$$$$$$$$$$$$$$$$$$$$$$$$$$$$$$$$$$$$

*              A2   (   B1
           IF.W D2 (LT) D3 THEN.S
           ADDQ.L #1,D2
*          A2 =! B1
           IF.W D2 (NE) D3 THEN.S
            BSR FUN0
            BRA TOP
           ELSE.S
            BSR FUN1
            BRA TOP
           ENDI
          ELSE.S
*              A2   )   B2
           IF.W D2 (GT) D4 THEN.S
            BSR FUN4
            BRA TOP
           ELSE.S
*              A2   ==  B2
            IF.W D2 (EQ) D4 THEN.S
             BSR FUN3
             BRA TOP
            ELSE.S
             BSR FUN1
             BRA TOP
            ENDI
           ENDI
          ENDI
```

```
      ELSE.S

*           A1  >   B1
      IF.W D1 (GT) D3 THEN.S

*              CASE OF A1 > B1
*$$$$$$$$$$$$$$$$$$$$$$$$$$$$$$$$$$$$$$$$$$$$$$$$$$$$$$$$$$$$$$$$$$$

*              A1  >   B2
        IF.W D1 (GT) D4 THEN.S
         ADDQ.L #1,D4
*              A1  =!  B2
         IF.W D1 (NE) D4 THEN.S
          BSR FUN12
          BRA TOP
         ELSE.S
          BSR FUN10
          BRA TOP
         ENDI
        ELSE.S
*              A2  <   B2
         IF.W D2 (LT) D4 THEN.S
          BSR FUN8
          BRA TOP
         ELSE.S
*              A2  ==  B2
          IF.W D2 (EQ) D4 THEN.S
           BSR FUN9
           BRA TOP
          ELSE.S
           BSR FUN10
           BRA TOP
          ENDI
         ENDI
        ENDI

ELSE.S

*              CASE OF A1 = B1
*$$$$$$$$$$$$$$$$$$$$$$$$$$$$$$$$$$$$$$$$$$$$$$$$$$$$$$$$$$$$$$$$$$$

*              A2  <   B2
        IF.W D2 (LT) D4 THEN.S
         BSR FUN5
         BRA TOP
        ELSE.S
*              A2  >   B2
         IF.W D2 (GT) D4 THEN.S
          BSR FUN7
          BRA TOP
         ELSE.S
          BSR FUN6
          BRA TOP
         ENDI
        ENDI

ENDI
       ENDI

ENDW

IF.B EOL(A0) (NE) #TRUE THEN.S
       BSR   CREATE_B
      ENDI

TST.L  C_OPENCT(A0)
      IF  (GT)   THEN.S
       BSR   DEL_ENTS
      ENDI

METAGRB1 MOVEM.L  (A7)+,A0-A6/D0-D7
         RTS
```

```
        PAGE
****************************************************************************
*
*       GET_MEM ROUTINE:    RETURNS ADDRESS OF FREE RECORD IN A6.
*
****************************************************************************

GET_MEM   MOVE.L    A5,-(A7)
*****  Obtain continous REC_LST record if needed:
          ADDQ.W    #1,LST_CNT(A0)
          IF.W  LST_CNT(A0) (GT) #LST_MAX
            JSR       GET64
            BEQ.S     NOMEM
            MOVE.L    LST_PTR(A0),A5
            MOVE.L    A6,(A5)
            MOVE.L    A6,LST_PTR(A0)
            ADDQ.L    #4,A6
            MOVE.L    A6,LST_FLD(A0)
            CLR.W     LST_CNT(A0)
          ENDI

*****  insert rec ptr into the REC_LIST record:
          JSR       GET64
          BEQ.S     NOMEM
          MOVE.L    LST_FLD(A0),A5
          MOVE.L    A6,(A5)+
          MOVE.L    A5,LST_FLD(A0)

MOVE.L    (A7)+,A5
          RTS

*         .ABORT    .OBJABRT
NOMEM     MOVE.L    #8,D0
          XREF      .ABRTPRC
          JMP       .ABRTPRC

****************************************************************************
*
*       GETNEXTB ROUTINE
*
*       THIS ROUTINE MUST DEAL WITH 3 NON-SEQUENTIAL SITUATIONS:
*
*         1.  LINKING TO THE NEXT RECORD WHERE DATA IS STARTED.
*         2.  SKIPPING OVER A SLICE WITH THE HIGH BIT SET.
*         3.  SETTING EOL WHEN A ZERO SLICE IS ENCOUNTERED.
****************************************************************************
*
*       GETNEXTB REQUIRES THE FOLLOWING REGISTERS TO BE:
*
*         D7 = RECORD COUNT ON THE 64 BYTE RECORDS.
*         A2 = FIELD POINTER.
*         A1 = RECORD POINTER.
****************************************************************************

GETNEXTB  MOVEM.L   GETBVARS(A0),D7/A1-A2
NEXTB_2   TST.L     D7
          IF (EQ) THEN.S
            TST.L     (A2)
            BEQ.S     GETB
            MOVEQ.L   #CONTSIZE-2,D7
            MOVE.L    (A2),A2
            MOVE.L    A2,A1
            ADDQ.L    #4,A2
          ENDI
GETB      SUBQ.L    #1,D7
          MOVE.L    (A2)+,D1

IF (PL) THEN.S
            IF (EQ) THEN.S
              MOVE.B    #TRUE,EOL(A0)
            ENDI
          ELSE.S
            BRA NEXTB_2
          ENDI
```

```
              MOVE.L    D1,RUN_LEN(A0)
              CLR.L     D2
              MOVE.W    D1,D2
              MOVE.L    D2,B_LENGTH(A0)
              SWAP      D1
              ADD.W     D1,D2
              SUBQ.L    #1,D2
              AND.L     #$FFFF,D1
              MOVE.L    D1,B1(A0)
              MOVE.L    D2,B2(A0)
              CLR.B     B_USED(A0)
              IF.L      B_CONECT(A0)  (GT)
*****           PUT CON_CNT INTO CONVERGENCE HEADER
                MOVE.L    CON_HD(A0),A3
                MOVE.W    CON_CNT(A0),PTRCNT(A3)
              ENDI
              CLR.L     B_CONECT(A0)
              MOVEM.L   D7/A1-A2,GETBVARS(A0)
              RTS

***************************************************************************
*
*                    GETA ROUTINE
*
*        THIS ROUTINE FETCHES THE VALUES OF X1 & X2 FROM THE OPEN LIST
*        NODE AT OPEN_CUR INTO GLOBAL VARIABLES A.1 & A.2.
*        THEN IT RESETS FLAGS.
***************************************************************************

GETA      MOVEA.L   OPEN_CUR(A0),A5
          IF.L      C_OPENCT(A0)  (EQ)  #0
            RTS
          ENDI

MOVE.L    OPEN_A1(A5),A.1(A0)
          MOVE.L    OPEN_A2(A5),A.2(A0)
          MOVE.B    #TRUE,A_N_USED(A0)

IF.L      A_CONECT(A0)  (GT)
*****       PUT DIV_CNT INTO DIVERGENCE HEADER
            MOVE.L    DIV_HD(A0),A3
            MOVE.W    DIV_CNT(A0),PTRCNT(A3)
          ENDI
          CLR.L     A_CONECT(A0)

RTS

***************************************************************************
*
*                    GETNEXTA ROUTINE
*
*        ADVANCES THE OPEN LIST CURSORS AND CALLS GETA TO FETCH
*        THE VALUES.
*
*        NOTE:   GETA & GETNEXTA NEED TO BE KEPT SEPARATED
*                SINCE THERE ARE OCCASIONS WHERE YOU NEED TO
*                FETCH NEW DATA BUT NOT ADVANCE THE OPEN LIST
*                CURSORS.
*                   (i.e.  JUST AFTER DELETING FROM THE OPEN LIST)
***************************************************************************

GETNEXTA  SUBQ.L    #1,C_OPENCT(A0)
          MOVEA.L   OPEN_CUR(A0),A5
          MOVE.L    A5,PREV_CUR(A0)
          MOVE.L    (A5),OPEN_CUR(A0)
          BSR.S     GETA
          RTS

PAGE
***************************************************************************
*
*        GROWBRAN  ROUTINE
```

```
         INCLUDE   GROWBRAN

PAGE
**********************************************************************
*
*           CONVERGE ROUTINE:
*
**********************************************************************
         INCLUDE   CONVERGE

PAGE
**********************************************************************
*
*              INS_OPL - INSERT INTO THE OPEN LIST.
*
*
*
*      THE FUNCTION OF THIS ROUTINE IS TO INSERT A NEW OPEN LIST
*      NODE INTO THE OPEN LIST OF THE NODE POINTED AT BY A3.
**********************************************************************

INS_OPL  ADD.L     #1,OPEN_CNT(A0)
         BSR       GET_MEM
         MOVE.L    (A3),(A6)
         MOVE.L    A6,(A3)
         MOVE.L    D0,SLICE1(A6)
         MOVE.W    D1,DAT_TYPE(A6)
         CLR.W     S_BUFCNT(A6)
         MOVE.L    A4,DAT_HEAD(A6)
         MOVE.L    ROW(A0),D7
         MOVE.W    D7,START_Y(A6)
         MOVE.L    #1,DATA_CNT(A6)
         MOVE.L    A4,BRA_HEAD(A6)
         MOVE.L    B1(A0),OPEN_A1(A6)
         MOVE.L    B2(A0),OPEN_A2(A6)
         MOVE.L    D2,TAILP.P(A6)
         RTS

**********************************************************************
*
*              DEL_OPL ROUTINE: DELETE OPEN LIST ITEM.
*
*      THE FUNCTION OF THIS ROUTINE IS TO DELETE FROM THE OPEN LIST
*      THE NODE POINTED AT BY THE OPEN CURSOR.
**********************************************************************

*        Always delete node pointed to by OPEN_CUR.

DEL_OPL  SUB.L     #1,OPEN_CNT(A0)
         SUB.L     #1,C_OPENCT(A0)
         MOVEA.L   OPEN_CUR(A0),A2
         MOVEA.L   (A2),A5
*
*        .RELEASE  A2
*
         MOVEA.L   PREV_CUR(A0),A4
         MOVE.L    A5,(A4)
         MOVE.L    A5,OPEN_CUR(A0)

*        TST.L     D7
*        BNE.S     DEL_OPL1
         BSR       GETA

DEL_OPL1 RTS

**********************************************************************
*
*              FUN0           A
*                  ............           B
*
*      THIS ROUTINE DOES ONE OF TWO THINGS:
```

```
*       1.  IF THE A SLICE HAS NOT BEEN USED, DO HOUSE KEEPING
*           ON THE DATA STRUCTURE BEING GROWN.  THEN DELETE A
*           SLICE FROM THE OPEN LIST.
*       2.  IF IT HAS BEEN USED THEN ADVANCE THE OPEN LIST CURSOR.
*           (i.e. GETNEXTA)
***************************************************************************

FUN0        IF.B  A_N_USED(A0) (EQ) #TRUE
            MOVEA.L   OPEN_CUR(A0),A1
            BSR.S     END_BRAN
            CLR.L     D7
            BSR       DEL_OPL
            ELSE.S
            BSR       GETNEXTA
            ENDI

RTS

PAGE
***************************************************************************
*
*           END_BRAN   ROUTINE
*
*           INPUT:
*                     A1 = ^ OPEN LIST NODE FOR BRANCH BEING TERMINATED
*
***************************************************************************

END_BRAN    MOVEM.L   D0-D3,-(A7)
            MOVEA.L   DAT_HEAD(A1),A2
            MOVE.L    TAILP.P(A1),A3
            MOVE.L    A3,D0
            IF  (NE)  THEN.S
              MOVE.L  A2,(A3)
            ENDI

*****   Unknown Trap
            IF.W  DAT_TYPE(A1) (EQ) #TYPE_UTR
              MOVE.W    DATA_CNT(A1),D0
              MOVE.W    D0,(A2)
              BSR       GET_MEM
              MOVE.L    DOWN_PTR(A2),A5
              MOVE.L    A5,DOWN_PTR(A6)
              MOVE.L    A6,DOWN_PTR(A2)
              MOVE.L    A2,UP_PTR(A6)

IF.W  TYPE(A5) (EQ) #TYPE_CON
                MOVE.L  CFLD_PTR(A0),A5
                MOVE.L  A6,-(A5)
              ENDI

MOVE.W    #TYPE_UNK,DAT_TYPE(A1)
              MOVE.L    A6,DAT_HEAD(A1)
              MOVE.L    A6,A2
              MOVE.L    A3,D0
              IF  (NE)  THEN.S
                MOVE.L  A2,(A3)
              ENDI
            ENDI

*****   UNK
            IF.W  DAT_TYPE(A1) (EQ) #TYPE_UNK
              MOVEM.L   SLICE1(A1),D0-D3
              MOVEM.L   D0-D3,SLICES(A2)
              MOVE.W    S_BUFCNT(A1),(A2)
              ADDQ.W    #1,(A2)
              MOVE.W    #TYPE_BLO,TYPE(A2)
              MOVE.W    START_Y(A1),Y_START(A2)
              MOVE.L    ROW(A0),D0
              SUBQ.W    #1,D0
              MOVE.W    D0,Y_END(A2)
              MOVEM.L   (A7)+,D0-D3
              RTS
            ENDI
```

```
*****   BLOB
        IF.W    DAT_TYPE(A1) (EQ) #TYPE_BLO
          MOVE.W    START_Y(A1),D1
          MOVE.L    ROW(A0),D2
          SUBQ.W    #1,D2
          MOVE.W    D2,D3
          SUB.W     D1,D2
          ADD.W     #1,D2
          MOVE.W    D2,(A2)
          MOVE.W    D1,Y_START(A2)
          MOVE.W    D3,Y_END(A2)
          MOVEM.L   (A7)+,D0-D3
          RTS
        ENDI

*****   TRAP
        MOVE.W    DATA_CNT(A1),D0
        ADD.W     #1,D0
        MOVE.W    D0,(A2)

ADDQ.L    #1,REC_CNT(A1)
        BSR       CONT_TRP
        MOVEA.L   FLD_PTR(A1),A6

MOVE.L    ROW(A0),D0
        SUBQ.W    #1,D0
        MOVEM.L   OPEN_A1(A1),D1-D2
        SWAP      D1
        SWAP      D2
        MOVE.W    D0,D1
        MOVE.W    D0,D2
        MOVEM.L   D1-D2,(A6)

MOVEM.L   (A7)+,D0-D3
        RTS

PAGE
```

****************************************************************************
*
*       DIVERGE : CREATE A NEW VERTICAL COLUMN HEADER AND LINK IT IN.
*
*               DIVERGE RETURNS:
*
*               A4 - pointer to branch head record
*               D0 - run-length
*               D1 - data type
*               D2 - tail-ptr-ptr
*
****************************************************************************

```
        INCLUDE   DIVERGE

PAGE
```

****************************************************************************
*
*               FUNG1 ROUTINE
*
*       THIS ROUTINE IS USED WHEN SLICE A STARTS BEFORE SLICE B
*       AND THEY ARE CONNECTED.
****************************************************************************

```
FUNG1   IF.B  A_N_USED(A0) (EQ) #TRUE
          BSR     GROWBRAN
        ELSE.S
          BSR     DIVERGE
          MOVEA.L OPEN_CUR(A0),A3
          BSR     INS_OPL
          MOVEA.L OPEN_CUR(A0),A2
          MOVE.L  A2,PREV_CUR(A0)
          MOVE.L  (A2),OPEN_CUR(A0)
        ENDI

RTS
```

```
****************************************************************************
*                FUN1        A
*                            ..............,.....
****************************************************************************

FUN1      BSR      FUNG1
          BSR      GETNEXTA
          RTS

****************************************************************************
*                FUN3        A
*                            .....................
****************************************************************************

FUN3      BSR      FUNG1
          BSR      GETNEXTA
          BSR      GETNEXTB
          RTS

****************************************************************************
*                FUN4        A
*                            .....................
****************************************************************************

FUN4      BSR      FUNG1
          BSR      GETNEXTB
          RTS

****************************************************************************
*                FUN5        ................
*                            ......................
****************************************************************************

FUN5      BSR      GROWBRAN
          BSR      GETNEXTA
          RTS

****************************************************************************
*                FUN6        .................
*                            .................
****************************************************************************

FUN6      BSR      GROWBRAN
          BSR      GETNEXTA
          BSR      GETNEXTB
          RTS

****************************************************************************
*                FUN7        .........................
*                            ...........
****************************************************************************

FUN7      BSR      GROWBRAN
          BSR      GETNEXTB
          RTS

****************************************************************************
*
*                FUNG3
*
*        THIS ROUTINE IS USED FOR THE SITUATIONS WHERE A & B
*        ARE CONNECTED AND B PRECEDES A AND A DOWS NOT
*        CONTINUE AFTER B .
****************************************************************************
```

```
FUNG3      IF.B B_USED(A0) (EQ) #TRUE
             MOVEQ.L #1,D7
             BSR     CONVERGE
             MOVE.L  OPEN_CUR(A0),A1
             BSR     END_BRAN
             BSR     DEL_OPL
           ELSE.S
             BSR     GROWBRAN
           ENDI

RTS
```

```
***************************************************************************
*                 FUN8              ............
*                                   ............................
***************************************************************************

FUN8       BSR     FUNG3
           IF.B A_N_USED(A0) (EQ) #FALSE
             BSR     GETNEXTA
           ENDI
           RTS
```

```
***************************************************************************
*                 FUN9              .........
*                                   ..................
***************************************************************************

FUN9       BSR     FUNG3
           IF.B A_N_USED(A0) (EQ) #FALSE
             BSR     GETNEXTA
           ENDI
           BSR     GETNEXTB
           RTS
```

```
***************************************************************************
*                 FUN10             ................
*                                   ...............
***************************************************************************

FUN10      IF.B B_USED(A0) (EQ) #TRUE
             CLR.L   D7
             BSR     CONVERGE
           ELSE.S
             BSR     GROWBRAN
           ENDI
           BSR     GETNEXTB
           RTS
```

```
***************************************************************************
*
*          NEW_BRAN ROUTINE : BUILDS NEW BRANCHES.
*
*
*
***************************************************************************

NEW_BRAN   BSR     GET_MEM
           MOVEQ.L #6,D4
             MOVE.W  #TYPE_UNK,TYPE(A4)
             MOVE.L  #TYPE_UNK,D1
             MOVE.L  RUN_LEN(A0),D0
             CLR.L   D2

RTS
```

```
***************************************************************
*
*                FUN12                        .................
*                        .................
*
*       USED WHEN B CAUSED A NEW OPEN LIST NODE TO BE INSERTED
*       WITHIN THE OPEN LIST A & B NOT CONNECTED.
***************************************************************

FUN12   IF.B  B_USED(A0)  (EQ) #FALSE
          BSR     NEW_BRAN

*         ***** input branch head into the meta object header:
          ADDQ.W    #1,META_CNT(A0)
          ADDQ.W    #1,MREC_CNT(A0)
          BSR       CONT_HED
          MOVE.L    META_HD(A0),A3
          MOVE.W    META_CNT(A0),PTRCNT(A3)
          MOVE.L    MFLD_PTR(A0),A3
          MOVE.L    A4,(A3)+
          MOVE.L    A3,D2
          ADDQ.L    #4,A3
          MOVE.L    A3,MFLD_PTR(A0)

MOVEA.L PREV_CUR(A0),A2
            MOVEA.L A2,A3
            BSR     INS_OPL
            MOVE.L  (A2),PREV_CUR(A0)
          ENDI
          BSR       GETNEXTB
          RTS

***************************************************************
*
*                FUN13
*                        B .................
*
*       USED TO APPEND NEW OPEN LIST NODES TO THE END
*       OF THE OPEN LIST.
***************************************************************

FUN13    BSR      NEW_BRAN

*         ***** input branch head into the meta object header:
          ADDQ.W    #1,META_CNT(A0)
          ADDQ.W    #1,MREC_CNT(A0)
          BSR       CONT_HED
          MOVE.L    META_HD(A0),A3
          MOVE.W    META_CNT(A0),PTRCNT(A3)
          MOVE.L    MFLD_PTR(A0),A3
          MOVE.L    A4,(A3)+
          MOVE.L    A3,D2
          ADDQ.L    #4,A3
          MOVE.L    A3,MFLD_PTR(A0)

MOVEA.L OPEN_CUR(A0),A3
            BSR     INS_OPL
            MOVE.L  A3,OPEN_CUR(A0)

MOVE.L  (A3),OPEN_CUR(A0)
          BSR       GETNEXTB
          RTS

***************************************************************
*
*                CREATE_B:  CREATE BRANCH
*
*       THIS ROUTINE PROCESS UNUSED RAW DATA WHEN THE OPEN LIST
*       IS EXHAUSTED.
***************************************************************
```

```
CREATE_B   IF.B B_USED(A0) (EQ) #TRUE
             BSR    GETNEXTB
           ENDI

IF.B EOL(A0) (EQ) #FALSE THEN.S
            IF.L OPEN_CUR(A0) (EQ) #0
              MOVE.L PREV_CUR(A0),OPEN_CUR(A0)
            ENDI
           ENDI

WHILE.B EOL(A0) (EQ) #FALSE
             BSR    FUN13
           ENDW

RTS

************************************************************************
*
*               DEL_ENTS
*
*          THIS ROUTINE PROCESS THE REMAINING PORTION OF THE
*          OPEN LIST AFTER THE RAW DATA IS EXHAUSTED.
************************************************************************

DEL_ENTS   IF.B A_N_USED(A0) (EQ) #FALSE
             BSR    GETNEXTA
           ENDI
           WHILE.L C_OPENCT(A0) (NE)
             BSR    FUN0
           ENDW

RTS

************************************************************************
*
*          END  OF  METAGRAB
*
************************************************************************

PAGE
*****  subroutine MOBREL ***********************************************
           INCLUDE   MOBREL

END

*****  DIVERGE ********************************************
*
* ENT:   A0 -) global variable table
*
**********************************************************
DIVERGE    MOVEM.L  A0-A3/A5-A6/D3-D7,-(A7)
           MOVE.L   OPEN_CUR(A0),A1

IF.L A_CONECT(A0) (EQ) #1
*            ***** create a new divergence record
             BSR    GET_MEM
             MOVE.L A6,A5
             MOVE.L A5,DIV_HD(A0)
             MOVE.W #TYPE_DIV,TYPE(A5)

*            ***** special case handler:
             MOVE.L DAT_HEAD(A1),A2
             MOVE.L DOWN_PTR(A2),D1
             BEQ.S  NOT_SPCD
             MOVE.L D1,A2
             IF.W TYPE(A2) (EQ) #TYPE_CONV
               MOVE.L A2,BEG_PTR(A5)
               MOVE.L A2,END_PTR(A5)
               MOVE.L A5,BEG_PTR(A2)
               MOVE.L A5,END_PTR(A2)
               MOVE.L PREV_CUR(A0),A2
               MOVE.L BRA_HEAD(A2),A3
```

```
            MOVE.L    A5,UP_PTR(A3)
            MOVE.L    A3,PTR0_BEG(A5)
            LEA.L     PTR0_END(A5),A3
            MOVE.L    A3,TAILP.P(A2)

BSR       END_BRAN
            MOVE.L    DIV_HD(A0),A5
            SUBQ.L    #1,OPEN_CNT(A0)
            MOVE.L    PREV_CUR(A0),A2
            MOVE.L    (A1),(A2)
            MOVE.L    A2,OPEN_CUR(A0)
            BRA       UPDATE_D
          ENDI

*           ***** set begin and end ptrs of divergence record
NOT_SPCD    MOVE.L    BRA_HEAD(A1),BEG_PTR(A5)
            MOVE.L    DAT_HEAD(A1),A2
            MOVE.L    A2,END_PTR(A5)
            MOVE.L    A5,DOWN_PTR(A2)

*           ***** BLOB
          IF.W  DAT_TYPE(A1) (EQ) #TYPE_BLO
            MOVE.L    FLD_PTR(A1),A2
            MOVE.L    -(A2),D0
            CLR.L     (A2)
            MOVE.L    A2,FLD_PTR(A1)
            MOVE.L    -(A2),D3

SUBQ.L    #1,REC_CNT(A1)
          IF.W  (MI)  THEN.S
            MOVE.L    REC_PTR(A1),A2
            MOVE.L    (A2),A3
            CLR.L     (A2)
*           .RELEASE  A3
          ENDI

BSR       END_BRAN
            BRA       SET_DIV
          ENDI

*           ***** UNK
          IF.W  DAT_TYPE(A1) (EQ) #TYPE_UNK
            MOVE.W    S_BUFCNT(A1),D1
            LSL.W     #2,D1
            MOVE.L    SLICE1(A1,D1.W),D0
            CLR.L     SLICE1(A1,D1.W)
            SUBQ.W    #1,S_BUFCNT(A1)
            SUBQ.W    #4,D1
            MOVE.L    SLICE1(A1,D1.W),D3

TST.W     D1
          IF.W  (MI)  THEN.S
            MOVE.L    DAT_HEAD(A1),A4
            MOVE.L    UP_PTR(A4),A2
            MOVE.L    A2,END_PTR(A5)
            MOVE.L    A5,DOWN_PTR(A2)
            MOVE.L    A5,UP_PTR(A4)
            CLR.L     DOWN_PTR(A4)
            MOVE.L    FLD_PTR(A1),A2
            MOVEM.L   (A2),D3-D4
            MOVEM.L   D3-D4,SLICE_LF(A5)
            BRA       SET_DIV2
          ENDI

BSR       END_BRAN
            BRA       SET_DIV
          ENDI

*           ***** TRAP
          IF.W  DAT_TYPE(A1) (EQ) #TYPE_TRP
            MOVEM.L   OPEN_A1(A1),D0-D1
            SUB.W     D0,D1
```

```
                ADDQ.W   #1,D1
                SWAP.W   D0
                MOVE.W   D1,D0
                MOVEM.L  OPEN_A1(A1),D0-D1
                MOVE.L   SLICE1(A1),OPEN_A1(A1)
                MOVE.L   SLICE2(A1),OPEN_A1(A1)
                BSR      END_BRAN
                MOVEM.L  D0-D1,OPEN_A1(A1)
                MOVEM.L  SLICE1(A1),D3-D4
                BRA.S    LINE_DIV
              ENDI

***** UNKNOWN TRAP
              TST.W    S_BUFCNT(A1)
              IF  (EQ) THEN.S
                MOVE.L   SLICE1(A1),D0
                MOVE.L   DAT_HEAD(A1),A2
                MOVE.W   DATA_CNT(A1),(A2)
                MOVE.L   FLD_PTR(A1),A2
                MOVE.L   -(A2),D4
                MOVE.L   -(A2),D3
                SWAP.W   D3
                SWAP.W   D4
                   MOVE.L   D1,A4
                   MOVE.L   DAT_HEAD(A1),(A4)
                ENDI
              ELSE.S
                MOVE.W   S_BUFCNT(A1),D1
                LSL.W    #2,D1
                MOVE.L   SLICE1(A1,D1.W),D0
                CLR.L    SLICE1(A1,D1.W)
                SUBQ.W   #1,S_BUFCNT(A1)
                BSR      END_BRAN
                SUBQ.W   #4,D1
                MOVE.L   SLICE1(A1,D1.W),D3
                MOVE.L   A5,DOWN_PTR(A2)
                MOVE.L   A2,END_PTR(A5)
                BRA.S    SET_DIV
              ENDI

LINE_DIV      SUB.W    D3,D4
              ADDQ.W   #1,D4
              SWAP.W   D3
              MOVE.W   D4,D3

*             ***** generate new branch for the most recent slice in D0
SET_DIV       BSR      GET_MEM
              MOVE.L   A6,A4
              MOVE.W   #TYPE_UNK,TYPE(A4)
              MOVE.L   A5,UP_PTR(A4)

*             ***** set (x0,y) and (x1,y) of divergence record
SET_DIV1      MOVE.L   ROW(A0),D2
              SUBQ.L   #1,D2
              MOVE.L   D3,D1
              MOVE.W   D2,D1
              MOVE.L   D1,SLICE_LF(A5)
              SWAP     D1
              ADD.W    D3,D1
              SUBQ.W   #1,D1
              SWAP.W   D1
              MOVE.L   D1,SLICE_RT(A5)

*             ***** Modify current open list for the new data record
SET_DIV2      MOVE.L   A4,PTR0_BEG(A5)
              LEA.L    PTR0_END(A5),A2
              MOVE.L   A2,TAILP.P(A1)
              MOVE.W   #TYPE_UNK,DAT_TYPE(A1)
              MOVE.L   D0,SLICE1(A1)
              CLR.L    SLICE2(A1)
              CLR.L    SLICE3(A1)
              CLR.L    SLICE4(A1)
              CLR.W    S_BUFCNT(A1)
```

```
                MOVE.L    ROW(A0),D1
                MOVE.W    D1,START_Y(A1)
                MOVE.L    A4,DAT_HEAD(A1)
                MOVE.L    A4,BRA_HEAD(A1)

*               ***** update the global variables for divergence record grow
UPDATE_D        MOVE.W    #1,DIV_CNT(A0)
                MOVE.W    #2,DREC_CNT(A0)
                MOVE.L    A5,DREC_PTR(A0)
                LEA.L     PTR1_BEG(A5),A2
                MOVE.L    A2,DFLD_PTR(A0)

ENDI
            MOVE.L    DIV_HD(A0),A5
            MOVE.B    #TRUE,B_USED(A0)
            MOVEQ.L   #1,D1
            MOVE.L    D1,B_CONECT(A0)
            ADDQ.L    #1,A_CONECT(A0)
            ADDQ.W    #1,DREC_CNT(A0)
            ADDQ.W    #1,DIV_CNT(A0)
            MOVE.W    DIV_CNT(A0),(A5)
*           ***** create cont' divergence record if:
            IF.W  DREC_CNT(A0) (GT) #DIV_MAX
              CLR.W   DREC_CNT(A0)
              BSR     GET_MEM
              MOVE.W  #TYPE_DIV,TYPE(A6)
              MOVE.L  DREC_PTR(A0),A2
              MOVE.L  A6,LINK_FOR(A2)
              MOVE.L  A2,LINK_PRV(A6)
              MOVE.L  A6,DREC_PTR(A0)
              ADDQ.L  #4,A6
              MOVE.L  A6,DFLD_PTR(A0)
            ENDI

*           ***** create new open list for new slice #2,#3,...
            BSR       NEW_BRAN
*           ***** link new open list to divergence record
            MOVE.L    DFLD_PTR(A0),A2
            MOVE.L    A4,(A2)+
            MOVE.L    A2,D2
            ADDQ.L    #4,A2
            MOVE.L    A2,DFLD_PTR(A0)
            MOVE.L    A5,UP_PTR(A4)

MOVEM.L   (A7)+,A0-A3/A5-A6/D3-D7
            RTS
***** END OF DIVERGE *********************************

***** CONVERGE ***********************************
*
* ENT:  A0 -> global variable table
*
****************************************************************
CONVERGE MOVEM.L   A0-A6/D0-D7,-(A7)
         MOVE.L    PREV_CUR(A0),A1

IF.L  B_CONECT(A0) (EQ) #1
*           ***** create a new convergence record
            BSR       GET_MEM
            MOVE.L    A6,A5
            MOVE.L    A5,CON_HD(A0)
            MOVE.W    #TYPE_CON,TYPE(A5)

*           ***** special case handler:
            IF.W  DAT_TYPE(A1) (EQ) #TYPE_UNK
              TST.W   S_BUFCNT(A1)
              IF  (EQ)  THEN.S
                MOVE.L  DAT_HEAD(A1),A2
                MOVE.L  UP_PTR(A2),D1
                BEQ.S   NOT_SPC
                MOVE.L  D1,A2
                CMP.W   #TYPE_DIV,TYPE(A2)
                BNE.S   NOT_SPC
                MOVE.L  A2,PTR0_BEG(A5)
```

```
              MOVE.L   A2,PTR0_END(A5)
              MOVE.L   DFLD_PTR(A0),A3
              MOVE.L   A5,-(A3)
              MOVE.L   A5,-(A3)
              MOVE.L   BRA_HEAD(A1),A2
              MOVE.L   A2,BEG_PTR(A5)
              LEA.L    END_PTR(A5),A3
              MOVE.L   A3,TAILP.P(A1)
              MOVE.L   A5,UP_PTR(A2)
              BRA      UPDATE_C
            ENDI
          ENDI

*         ***** set begin ptrs of 1st branch of convergence record
NOT_SPC   MOVE.L   BRA_HEAD(A1),PTR0_BEG(A5)
          MOVE.L   DAT_HEAD(A1),A3
          MOVE.L   A3,PTR0_END(A5)
          MOVE.L   A5,DOWN_PTR(A3)

*         ***** BLOB
          IF.W  DAT_TYPE(A1) (EQ) #TYPE_BLO
            MOVE.L   FLD_PTR(A1),A3
            MOVE.L   -(A3),D0
            CLR.L    (A3)
            MOVE.L   A3,FLD_PTR(A1)

SUBQ.L   #1,REC_CNT(A1)
            IF   (MI)   THEN.S
              MOVE.L   REC_PTR(A1),A2
              MOVE.L   (A2),A3
              CLR.L    (A2)
              .RELEASE         A3
            ENDI

BSR      END_BRAN
            BRA      SET_CONV
          ENDI

***** UNK
          IF.W  DAT_TYPE(A1) (EQ) #TYPE_UNK
            MOVE.W   S_BUFCNT(A1),D1
            LSL.W    #2,D1
            MOVE.L   SLICE1(A1,D1.W),D0
            CLR.L    SLICE1(A1,D1.W)
            SUBQ.W   #1,S_BUFCNT(A1)

TST.W    D1
            IF   (EQ)   THEN.S
              MOVE.L   DAT_HEAD(A1),A4
              MOVE.L   UP_PTR(A4),A2
              MOVE.L   A2,PTR0_END(A5)
              MOVE.L   A5,DOWN_PTR(A2)
              MOVE.L   A5,UP_PTR(A4)
              CLR.L    DOWN_PTR(A4)
              BRA      SET_CON1
            ENDI

BSR      END_BRAN
            BRA.S    SET_CONV
          ENDI

***** TRAP
          IF.W  DAT_TYPE(A1) (EQ) #TYPE_TRP
            MOVEM.L  B1(A0),D0-D1
            SUB.W    D0,D1
            ADDQ.W   #1,D1
            SWAP.W   D0
            MOVE.W   D1,D0
            MOVE.L   SLICE1(A1),OPEN_A1(A1)
            MOVE.L   SLICE2(A1),OPEN_A2(A1)
            BSR      END_BRAN
            MOVE.L   B1(A0),OPEN_A1(A1)
            MOVE.L   B2(A0),OPEN_A2(A1)
            BRA.S    SET_CONV
          ENDI
```

```
***** UNKNOWN TRAP
        TST.W       S_BUFCNT(A1)
        IF  (EQ)    THEN.S
          MOVE.L    SLICE1(A1),D0
          MOVE.L    DAT_HEAD(A1),A2
          MOVE.W    DATA_CNT(A1),(A2)
          MOVE.L    TAILP.P(A1),D1
          IF.L. (NE)  THEN.S
            MOVE.L  D1,A4
            MOVE.L  A2,(A4)
          ENDI
        ELSE.S
          MOVE.W    S_BUFCNT(A1),D1
          LSL.W     #2,D1
          MOVE.L    SLICE1(A1,D1.W),D0
          CLR.L     SLICE1(A1,D1.W)
          SUBQ.W    #1,S_BUFCNT(A1)
          CLR.L     CFLD_PTR(A0)
          BSR       END_BRAN
          MOVE.L    A2,PTR0_END(A5)
        ENDI

*           ***** generate new branch for the most recent slice in D0
SET_CONV    BSR     GET_MEM
            MOVE.L  A6,A4
            MOVE.W  #TYPE_UNK,TYPE(A4)
            MOVE.L  A5,UP_PTR(A4)

*           ***** set (x0,y) and (x1,y) of convergence record
SET_CON1    MOVE.L  ROW(A0),D2
            MOVE.L  D0,D1
            MOVE.W  D2,D1
            MOVE.L  D1,SLICE_LF(A5)
            SWAP.W  D1
            ADD.W   D0,D1
            SUBQ.W  #1,D1
            SWAP.W  D1
            MOVE.L  D1,SLICE_RT(A5)

*           ***** Modify current open list for the new data record
            MOVE.L  A4,BEG_PTR(A5)
            LEA.L   END_PTR(A5),A3
            MOVE.L  A3,TAILP.P(A1)
            MOVE.W  #TYPE_UNK,DAT_TYPE(A1)
            MOVE.L  D0,SLICE1(A1)
            CLR.L   SLICE2(A1)
            CLR.L   SLICE3(A1)
            CLR.L   SLICE4(A1)
            CLR.W   S_BUFCNT(A1)
            MOVE.L  ROW(A0),D1
            MOVE.W  D1,START_Y(A1)
            MOVE.L  A4,DAT_HEAD(A1)
            MOVE.L  A4,BRA_HEAD(A1)

*           ***** update the global variables for convergence record grow
UPDATE_C    MOVE.W  #1,CON_CNT(A0)
            MOVE.W  #2,CREC_CNT(A0)
            MOVE.L  A5,CREC_PTR(A0)
            LEA.L   PTR1_BEG(A5),A3
            MOVE.L  A3,CFLD_PTR(A0)

ENDI

MOVE.L  CON_HD(A0),A5
            MOVEQ.L #1,D1
            MOVE.L  D1,A_CONECT(A0)
            ADDQ.L  #1,B_CONECT(A0)
            ADDQ.W  #1,CREC_CNT(A0)
            ADDQ.W  #1,CON_CNT(A0)
            MOVE.W  CON_CNT(A0),(A5)
```

```
*         ***** create cont' convergence record if:
          IF.W   CREC_CNT(A0) (GT) #CON_MAX
            CLR.W   CREC_CNT(A0)
            BSR     GET_MEM
            MOVE.W  #TYPE_CON,TYPE(A6)
            MOVE.L  CREC_PTR(A0),A2
            MOVE.L  A6,LINK_FOR(A2)
            MOVE.L  A2,LINK_PRV(A6)
            MOVE.L  A6,CREC_PTR(A0)
            ADDQ.L  #4,A6
            MOVE.L  A6,CFLD_PTR(A0)
          ENDI

*         ***** close the branch of new slice #2,#3,...
*         ***** link these branch to convergence record
          MOVE.L  CFLD_PTR(A0),A3
          MOVE.L  BRA_HEAD(A1),(A3)+
          MOVE.L  DAT_HEAD(A1),A2
          MOVE.L  A2,(A3)+
          MOVE.L  A5,DOWN_PTR(A2)
          MOVE.L  A3,CFLD_PTR(A0)

MOVEM.L (A7)+,A0-A6/D0-D7
          RTS
***** END OF CONVERGE ******************************************

***** GROWBRAN *************************************************
*
* ENT:   A0 = ^ to global variable table
*
****************************************************************
GROWBRAN  MOVEM.L  A0-A6/D0-D7,-(A7)
          MOVE.L   OPEN_CUR(A0),A1

*         ***** common house keeping steps:
          MOVE.L   B1(A0),OPEN_A1(A1)
          MOVE.L   B2(A0),OPEN_A2(A1)
          MOVE.B   #TRUE,B_USED(A0)
          CLR.B    A_N_USED(A0)
          ADD.L    #1,B_CONECT(A0)
          ADD.L    #1,A_CONECT(A0)

*** TRAP ***
          IF.W  DAT_TYPE(A1) (EQ) #TYPE_TRP
            MOVEM.L  A.1(A0),D6-D7
            MOVEM.L  D6-D7,SLICE1(A1)
            SUB.L    B1(A0),D6
            SUB.L    B2(A0),D7
            MOVEM.W  MIN.DX0(A1),D0/D2
            MOVE.B   D0,D1
            EXT.W    D1
            MOVE.B   D2,D3
            EXT.W    D3
            ASR.W    #8,D0
            ASR.W    #8,D2

*         ***** check if change in length of consecutive slices
*                of the trap is well behaved:
*         ***** find abs(DX0+DX1) of the last two slices:
            MOVE.L   D6,D4
            SUB.L    D7,D4
            IF  (MI) THEN.S
              NEG.L  D4
            ENDI

**** routine CHK_TRP ********************************************

ENT:   D4 = sum of changes of length of left and right edges

RTN:   2 cases:
                  i.  Well behaved edges -) return to caller
                  ii. Not well beaved edges
                         -) end the current trap record,

****************************************************************
```

```
CHK_TRP   MOVEM.L   D0-D7,-(A7)
          IF.L   D4  (GT)  #DDX_LEN   THEN.S
*****     close the trap record:
          MOVE.L   A.1(A0),OPEN_A1(A1)
          MOVE.L   A.2(A0),OPEN_A2(A1)
          BSR      END_BRAN
          MOVE.L   B1(A0),OPEN_B1(A1)
          MOVE.L   B2(A0),OPEN_B2(A1)

*         ***** create new data type record & update open list:
          BSR      GET_MEM
          MOVE.L   A6,DOWN_PTR(A2)
          MOVE.L   A2,UP_PTR(A6)
          MOVE.W   #TYPE_UNK,DAT_TYPE(A1)
          CLR.W    S_BUFCNT(A1)
          MOVE.L   ROW(A0),D4
          MOVE.W   D4,START_Y(A1)
          MOVE.L   A6,DAT_HEAD(A1)
          MOVE.L   RUN_LEN(A0),SLICE1(A1)
          CLR.L    SLICE2(A1)
          CLR.L    SLICE3(A1)
          CLR.L    SLICE4(A1)
          MOVEM.L  (A7)+,D0-D7
          MOVEM.L  (A7)+,A0-A6/D0-D7
          RTS
          ENDI
          MOVEM.L  (A7)+,D0-D7
***** END OF CHK_TRP ******************************************

*         ***** check if the edges of growing trap
*                is well behaved by  1st derivatives:
          ADDQ.B   #1,DX_CNT(A1)
          ADD.W    D6,DX0_SUMC(A1)
          ADD.W    D7,DX1_SUMC(A1)

MOVE.L   COUNT1,D4
          IF.B  DX_CNT(A1)  (EQ)  D4

TST.B   FIRST(A1)
            IF  (EQ)   THEN.S
              MOVE.L   DX0_SUMC(A1),DX0_SUMP(A1)
              MOVE.L   #$0FFF0FFF,DX0_SUMP(A1)
              ADDQ.B   #1,FIRST(A1)
            ENDI

MOVEM.W  DX0_SUMC(A1),D4/D5

SUB.W    DX0_SUMP(A1),D4
            IF.W  (MI)  THEN.S
              NEG.W  D4
            ENDI

SUB.W    DX1_SUMP(A1),D5
            IF.W  (MI)  THEN.S
              NEG.W  D5
            ENDI

IF.W  D4 (GT) DX_MAX  OR.W
              MOVE.L   DX0_SUMC(A1),DX0_SUMP(A1)
              BRA.S    END_TRP
            ENDI

CLR.L    DX0_SUMC(A1)
            CLR.B    DX_CNT(A1)
          ENDI

*         ***** check if the edges of growing trap
*                is well behaved by  2nd derivatives:
          BSR      DX_DDX2

IF.W  D4 (GT) #DDX_MAX  OR.W
```

```
            MOVEM.L    A.1(A0),D4-D5
            SWAP.W     D4
            SWAP.W     D5
            MOVE.L     ROW(A0),D6
            MOVE.W     D6,START_Y(A1)
            SUBQ.L     #1,D6
            MOVE.W     D6,D4
            MOVE.W     D6,D5
            ADDQ.L     #1,REC_CNT(A1)
            BSR        CONT_TRP
            MOVE.L     FLD_PTR(A1),A2
            MOVE.L     D4,(A2)+
            MOVE.L     D5,(A2)+
            MOVE.L     A2,FLD_PTR(A1)
            MOVE.W     #TYPE_UTR,DAT_TYPE(A1)
            ADDQ.W     #1,DATA_CNT(A1)
            CLR.W      S_BUFCNT(A1)
            MOVE.L     RUN_LEN(A0),SLICE1(A1)
            CLR.L      SLICE2(A1)
            CLR.L      SLICE3(A1)
            CLR.L      SLICE4(A1)
         ELSE.S
            ASL.W      #8,D0
            ASL.W      #8,D2
            MOVE.B     D1,D0
            MOVE.B     D3,D2
            MOVEM.W    D0/D2,MIN.DX0(A1)
         ENDI

MOVEM.L    (A7)+,A0-A6/D0-D7
         RTS
      ENDI

*** UTRAP ***
      IF.W   DAT_TYPE(A1) (EQ) #TYPE_UTR
         BSR      DX_DDX

IF.W   D4 (GT) #DDX_MAX OR.W
*           ***** close the trap record:
            MOVE.L    DAT_HEAD(A1),A2
            MOVE.W    DATA_CNT(A1),PTRCNT(A2)
*           ***** create an unknown data record:       BSR      GET_MEM
            MOVE.L    A6,DOWN_PTR(A2)
            MOVE.L    A2,UP_PTR(A6)
            MOVE.L    A6,DAT_HEAD(A1)
            MOVE.L    ROW(A0),D4
            SUBQ.W    #4,D4
            MOVE.W    D4,START_Y(A1)
            BRA       LINK1
         ELSE.S
            MOVE.W    #TYPE_TRP,DAT_TYPE(A1)
            MOVE.B    FIRSTMP(A1),FIRST(A1)
            CLR.B     DX_CNT(A1)
            CLR.L     DX0_SUMC(A1)
            MOVEM.L   A.1(A0),D6-D7
            MOVEM.L   D6-D7,SLICE1(A1)
            LSL.W     #8,D0
            MOVE.B    D1,D0
            LSL.W     #8,D2
            MOVE.B    D3,D2
            MOVEM.W   D0/D2,MIN.DX0(A1)
            CLR.W     S_BUFCNT(A1)
         ENDI
         MOVEM.L    (A7)+,A0-A6/D0-D7
         RTS
      ELSE.S
         IF.W   DAT_TYPE(A1) (EQ) #TYPE_UTR
            ADDQ.W    #1,S_BUFCNT(A1)
            MOVE.W    S_BUFCNT(A1),D6
            LSL.W     #2,D6
            MOVE.L    RUN_LEN(A0),SLICE1(A1,D6.W)
            MOVEM.L   (A7)+,A0-A6/D0-D7
            RTS
         ENDI
```

```
        ENDI

*** UNK ***
        IF.W    DAT_TYPE(A1) (EQ) #TYPE_UNK

TST.L   BLOB
        BEQ.S   UNK1

BSR   DX_DDX

IF.W  D4 (GT) #DDX_MAX OR.W
UNK1        MOVE.L  DAT_HEAD(A1),A2
            MOVE.W  #TYPE_BLO,TYPE(A2)
            MOVE.W  #TYPE_BLO,DAT_TYPE(A1)
            MOVEM.L SLICE1(A1),D0-D3
            MOVEM.L D0-D3,SLICES(A2)
            MOVE.W  #16,D4
            LEA.L   SLICES(A2,D4.W),A3
            MOVE.L  RUN_LEN(A0),(A3)+
            MOVE.L  A3,FLD_PTR(A1)
            MOVEQ.L #8,D0
            MOVE.L  D0,REC_CNT(A1)
            MOVEM.W DX(A0),D0-D7
            MOVEM.W D0-D7,SLICE1(A1)
          ELSE.S
            MOVE.L  DAT_HEAD(A1),A2
            MOVE.W  #TYPE_TRP,TYPE(A2)
            MOVE.W  #TYPE_TRP,DAT_TYPE(A1)
            MOVE.L  SLICE1(A1),D4
            MOVE.L  D4,D5
            SWAP.W  D5
            ADD.W   D4,D5
            SUBQ.W  #1,D5
            SWAP.W  D5
            MOVE.W  START_Y(A1),D4
            MOVE.W  START_Y(A1),D5
            LEA.L   BASE_X1(A2),A3
            MOVE.L  D4,(A3)+
            MOVE.L  D5,(A3)+
            MOVE.L  A3,FLD_PTR(A1)
            MOVEQ.L #2,D4
            MOVE.L  D4,REC_CNT(A1)
            CLR.W   S_BUFCNT(A1)
            CLR.W   DATA_CNT(A1)
            MOVE.L  A.1(A0),SLICE1(A1)
            MOVE.L  A.2(A0),SLICE2(A1)
            CLR.B   DX_CNT(A1)
            CLR.L   DX0_SUMP(A1)
            CLR.L   DX0_SUMC(A1)
            CLR.B   FIRST(A1)
            LSL.L   #8,D0
            MOVE.B  D1,D0
            LSL.L   #8,D2
            MOVE.B  D3,D2
            MOVEM.W D0/D2,MIN.DX0(A1)
          ENDI

MOVEM.L (A7)+,A0-A6/D0-D7
          RTS

ELSE.S
          IF.W  DAT_TYPE(A1) (EQ) #TYPE_UNK
            ADDQ.W  #1,S_BUFCNT(A1)
            MOVE.W  S_BUFCNT(A1),D6
            LSL.W   #2,D6
            MOVE.L  RUN_LEN(A0),SLICE1(A1,D6.W)
            MOVEM.L (A7)+,A0-A6/D0-D7
            RTS
          ENDI
        ENDI

TST.L   BLOB
        BEQ.S   BLOB1
```

```
*** BLOB ***
        MOVEM.W   SLICE1(A1),D0-D7
        BSR       DX_DDX1
        MOVEM.L   A.1(A0),D6-D7
        SUB.L     B1(A0),D6
        SUB.L     B2(A0),D7
        MOVEM.L   D6-D7,-(A7)
        BSR       DX_DDX2
        MOVEM.L   (A7)+,D6-D7

IF.W   D4  (GT)  #DDX_MAX  OR.W
BLOB1     ADDQ.L    #1,REC_CNT(A1)
          BSR       CONT_BLO
          MOVE.L    FLD_PTR(A1),A2
          MOVE.L    RUN_LEN(A0),(A2)+
          MOVE.L    A2,FLD_PTR(A1)
          MOVEM.W   SLICE2(A1),D0-D5
          MOVEM.W   D0-D7,SLICE1(A1)
        ELSE
*           ***** If the last 6 slices have well behaved edges:
*           ***** delete the 5 preceding slices stored in blob record
          MOVEM.W   D0-D3,DX(A0)
          MOVE.L    FLD_PTR(A1),A2
          MOVE.L    REC_CNT(A1),D1
          MOVE.L    #4,D0
LOOP1     TST.W     D0
          IF   (EQ)   THEN.S
            MOVE.L   -(A2),D6
            CLR.L    (A2)
          ELSE.S
            IF.W  D0  (EQ)  #4   THEN.S
              MOVE.L   -(A2),D6
              CLR.L    (A2)
              MOVE.W   D6,D7
              LSR.L    #8,D6
              LSR.L    #8,D6
              ADD.W    D6,D7
              SUBQ.W   #1,D7
              EXT.L    D7
              MOVEM.L  D6-D7,SLICE1(A1)
            ELSE.S
              CLR.L    -(A2)
            ENDI
          ENDI
          SUBQ.L    #1,D1
          IF.L    (MI)   THEN.S
            MOVEQ.L  #8,D1
            MOVE.L   REC_PTR(A1),A2
            MOVE.L   (A2),A3
            CLR.L    (A2)
*           .RELEASE    A3                    " (system macro)
          ENDI
          DBRA    D0,LOOP1

*           ***** terminate the blob:
          BSR       END_BRAN
          SUBQ.W    #5,PTRCNT(A2)
          SUBQ.W    #5,Y_END(A2)

*           ***** create new trap record and link to last blob
          BSR       GET_MEM
          MOVE.L    A6,DOWN_PTR(A2)
          MOVE.L    A2,UP_PTR(A6)
          MOVE.W    #TYPE_TRP,TYPE(A6)
          CLR.B     DX_CNT(A1)
          CLR.L     DX0_SUMP(A1)
          CLR.L     DX0_SUMC(A1)
          CLR.B     FIRST(A1)
          MOVE.L    ROW(A0),D5
          SUBQ.W    #5,D5
          MOVE.W    D5,START_Y(A1)
          MOVE.W    #TYPE_TRP,DAT_TYPE(A1)
          MOVE.L    A6,DAT_HEAD(A1)
```

```
                MOVEQ.L    #2,D4
                MOVE.L     D4,REC_CNT(A1)
                CLR.W      DATA_CNT(A1)
                CLR.W      S_BUFCNT(A1)
                MOVEM.W    DX(A0),D0-D3
                LSL.W      #8,D0
                MOVE.B     D1,D0
                LSL.W      #8,D2
                MOVE.B     D3,D2
                MOVEM.W    D0/D2,MIN.DX0(A1)
                MOVE.L     D6,D7
                SWAP.W     D6
                ADD.W      D6,D7
                SUBQ.W     #1,D7
                SWAP.W     D6
                SWAP.W     D7
                MOVE.W     D5,D6
                MOVE.W     D5,D7
                LEA.L      BASE_X1(A6),A6
                MOVE.L     D6,(A6)+
                MOVE.L     D7,(A6)+
                MOVE.L     A6,FLD_PTR(A1)
            ENDI

MOVEM.L    (A7)+,A0-A6/D0-D7
                RTS

***** subroutine DX_DDX ******************************************
*
* ENT:     A1 = ^ to the open list record
*
*          3 entry points:
*
*             DX_DDX
*             DX_DDX1
*             DX_DDX2
*
*          DX_DDX finds the min and max of DX0 and DX1 and keep
*          in D0-D3.  The DDX0 and DDX1 are also calculated and
*          save in D4 and D5 respectively.
************************************************************************
*************** ENT :  prev. slices in slice buffer of open list
*                      and   5th slice in RUN_LEN or B1/B2(A0)
DX_DDX      MOVEM.W    SLICE1(A1),D0-D7
            ADD.W      D0,D1
            SUBQ.W     #1,D1
            ADD.W      D2,D3
            SUBQ.W     #1,D3
            ADD.W      D4,D5
            SUBQ.W     #1,D5
            ADD.W      D6,D7
            SUBQ.W     #1,D7

*           ***** find DX0's :
            SUB.W      D2,D0
            SUB.W      D4,D2
            SUB.W      D6,D4
            SUB.L      B1(A0),D6

*           ***** find DX1's :
            SUB.W      D3,D1
            SUB.W      D5,D3
            SUB.W      D7,D5
            SUB.L      B2(A0),D7

MOVEM.W    D0-D7,DX(A0)

*************** ENT :  all DX0 and DX1 in  D0-D7
DX_DDX1     IF.W  D0 (GT) D2  THEN.S
               EXG.L   D0,D2
            ENDI
```

```
            IF.W  D0 (GT) D4    THEN.S
              EXG.L   D0,D4
            ENDI

IF.W  D4 (LT) D0    THEN.S
              EXG.L   D4,D0
            ENDI
            IF.W  D4 (LT) D2    THEN.S
              EXG.L   D4,D2
            ENDI

IF.W  D5 (GT) D1    THEN.S
              EXG.L   D5,D1
            ENDI
            IF.W  D5 (GT) D3    THEN.S
              EXG.L   D5,D3
            ENDI

IF.W  D3 (LT) D1    THEN.S
              EXG.L   D3,D1
            ENDI
            IF.W  D3 (LT) D5    THEN.S
              EXG.L   D3,D5
            ENDI

MOVE.W    D4,D1
            MOVE.W    D5,D2

************** ENT : prev. min & max of DX0 & DX1 in  D0-D3
*                    and current ones in D6 and D7
DX_DDX2  IF.W  D6 (LT) D0    THEN.S
            EXG.L   D6,D0
         ENDI
         IF.W  D6 (GT) D1    THEN.S
            EXG.L   D6,D1
         ENDI
         IF.W  D7 (LT) D2    THEN.S
            EXG.L   D7,D2
         ENDI
         IF.W  D7 (GT) D3    THEN.S
            EXG.L   D7,D3
         ENDI MOVE.W    D1,D4
         SUB.W     D0,D4
         MOVE.W    D3,D5
         SUB.W     D2,D5

RTS
***** END OF DX_DDX *******************************************

***** CONT_TRP ************************************************
*       Check if continous trap record is needed
***************************************************************
CONT_TRP MOVE.L    A2,-(A7)
         IF.L  REC_CNT(A1) (GT) #TRAP_MAX
            BSR     GET_MEM
            MOVE.W  #TYPE_TRP,TYPE(A6)
            MOVE.L  FLD_PTR(A1),A2
            MOVE.L  A6,(A2)
            ADDQ.L  #4,A6
            MOVE.L  A6,FLD_PTR(A1)
            CLR.L   REC_CNT(A1)
         ENDI
         MOVE.L    (A7)+,A2
         RTS
***** END OF CONT_TRP ******************************************

***** CONT_BLO ************************************************
*       Check if continous blob record is needed
***************************************************************
```

```
CONT_BLO MOVE.L     A2,-(A7)
         IF.L   REC_CNT(A1) (GT) #BLOB_MAX
             BSR     GET_MEM
             MOVE.W  #TYPE_BLO,TYPE(A6)
             MOVE.L  FLD_PTR(A1),A2
             MOVE.L  A2,REC_PTR(A1)
             MOVE.L  A6,(A2)
             ADDQ.L  #4,A6
             MOVE.L  A6,FLD_PTR(A1)
             CLR.L   REC_CNT(A1)
         ENDI
         MOVE.L  (A7)+,A2
         RTS
***** END OF CONT_BLO ********************************************

*****  END OF GROWBRAN   *****************************************

*****  MOBREL - META OBJECT RELEASE  *****************************
*
* ENT:   REC_LST(GLO_RAM) -) Beginning of Rec_List record
*
* RTN:   All registers not changed
*        Meta object records released to Free space of system
*
******************************************************************
MOBREL   MOVEM.L    A0-A3/D0-D1,-(A7)
         LEA.L      GLO_RAM(PC),A0
         MOVE.L     REC_LST(A0),A1
         MOVE.L     A1,A2

LOOP_NXT MOVE.L     A2,A3
         ADDQ.L     #4,A3
         MOVEQ.L    #LST_MAX,D0

LOOP_REC MOVE.L     (A3)+,D1
         BEQ.S      END_LST
         MOVE.L     D1,A0
         .RELEASE   A0
         DBRA       D0,LOOP_REC

MOVE.L     (A2),D1
         BEQ.S      END_LST
         MOVE.L     (A2),A2
         BRA.S      LOOP_NXT

END_LST  CMPA.L     A1,A2
         IF   (EQ)  THEN.S
            .RELEASE    A1
         ELSE.S
            .RLSTRNG    A1,A2
         ENDI

MOVEM.L    (A7)+,A0-A3/D0-D1
         RTS

******************************************************************
*  END OF MOBREL
******************************************************************

***** MACRO - .RELEASE *******************************************
.RELEASE MACRO
         BCLR       #7,-4(\1)
         ENDM
***** END OF .RELEASE ********************************************

***** MACRO - .LINKREC *******************************************
.LINKREC MACRO
         MOVE.L     LINK_BEG(A0),(\1)
         MOVE.L     \1,LINK_BEG(A0)
         ENDM
***** END OF .LINKREC ********************************************

***** MACRO - .RLSTRNG *******************************************
.RLSTRNG MACRO
         MOVE.L     \1,-(A7)
```

```
RLS\@       MOVE.L      (\1),-(A7)
            BCLR        #7,-4(\1)
            CMPA.L      \1,\2
            MOVEA.L     (A7)+,\1
            BNE.S       RLS\@
            MOVE.L      (A7)+,\1
            ENDM
***** END OF .RLSTRNG ***********************************************
FRAMESIZ    EQU         16
CONTSIZE    EQU         16
LINK        EQU         4*(CONTSIZE-1)
HOLE_CNT    EQU         6

*SWATHSIZ EQU           9
LOCAL       SECTION 14
*FRAME      DS.L        FRAMESIZ*(SWATHSIZ+HOLE_CNT)
FRAME       DS.B        $5000
.ENDLOCL    DS.B        0
SWATHSIZ    EQU         (.ENDLOCL-FRAME)/(4*FRAMESIZ)-HOLE_CNT
******** SYSMACS.SA - System macros and equates **************
            NOLIST XREF        .LOCK,.UNLOCK,.DELAYMS,.QJOB,.QXJOB
            XREF        GETJOB,.ABRTPRC,.STATE,.SYSLOCK
            XREF        .PARAMS,.ABRTF,.GPARAM,.TPARAM
            XREF        .TASKS,.PRCNUM,.P1STAT,.OBJLOCK
            XREF        GET_ADRS,RLS_FILE,INITFILE,RLS_LOCL
            XREF        WRT_FILE,.DOJOB

******************************************************
* LOCK (ADRS)
*     LOCK aborts if .ABRTF set, else waits for the
*       byte at (ADRS) to be clear, then sets it.
******************************************************
LOCK        MACRO
            PEA         \1
            BSR.W       .LOCK
            ADDQ.L      #4,SP
            ENDM

******************************************************
* UNLOCK (ADRS)
*     UNLOCK clears the byte at (ADRS), then
*       aborts if .ABRTF set, else returns.
******************************************************
UNLOCK      MACRO
            CLR.B       \1
            ENDM

******************************************************
* DELAY (ms)
*     DELAY delays (ms) milliseconds
******************************************************
DELAY       MACRO
            MOVE.W      \1,-(SP)
            BSR.W       .DELAYMS
            ADDQ.L      #2,SP
            ENDM

******************************************************
* BLDFILE (filepntr),(buffer adrs),(buffer length)
*     Builds the first block of a RAMFILE in local.
*
* RTN: A0 -> After buffer.
*      A1 -> After filepntr
*      D0 = Size
******************************************************
BLDFILE     MACRO
            LEA         \1,A1
            LEA         \2,A0
            MOVE.L      \3,D0
            BSR.W       INITFILE
            ENDM
```

```
*************************************************************
*************************************************************
* WRTFILE  (filepntr),(#size),(data adrs)
*     Writes a data record to RAMFILE.
*
* RTN: All regs unchanged
*************************************************************
WRTFILE   MACRO
          MOVEM.L    D0/A0-A1,-(SP)
          LEA        \1,A0
          MOVE.L     \2,D0
          LEA        \3,A1
          BSR.W      WRT_FILE
          MOVEM.L    (SP)+,D0/A0-A1
          ENDM

*************************************************************
* GETADRS  (filepntr),(datasize)
*     Gets an adrs in which to store (datasize)
*     bytes of data.
*
* RTN: A0 -> Adrs
*      D0 = #bytes requested
*      No other registers affected.
*************************************************************
GETADRS   MACRO
          LEA        \1,A0
          MOVE.L     \2,D0
          BSR.W      GET_ADRS
          ENDM

*************************************************************
* RLSGLBL  (filepntr)    Release a global-origined
*                        file of data blocks.
*
* RTN: A0 - File pntr
*      All other regs unchanged.
*************************************************************
RLSGLBL   MACRO
          LEA        \1,A0
          BSR.W      RLS_FILE
          ENDM

*************************************************************
* RLSLOCL  (filepntr)    Release a local-origined
*                        file of data blocks.
*
* RTN: A0 - File pntr
*      All other regs unchanged.
*************************************************************
RLSLOCL   MACRO
          LEA        \1,A0
          BSR.W      RLS_LOCL
          ENDM

*************************************************************
* QXJOB (JOBQ adrs),(JOB adrs),(DATA adrs),(DONE adrs)
*     QXJOB queues the job if multiprocessing, else
*     does the job directly.
*************************************************************
QXJOB     MACRO
          MOVE.L     \4,-(SP)
          MOVE.L     \3,-(SP)
          MOVE.L     \2,-(SP)
          MOVE.L     \1,-(SP)
          BSR.W      .QXJOB
          LEA        16(SP),SP
          ENDM

*************************************************************
* QJOB (JOBQ adrs),(JOB adrs),(DATA adrs),(DONE adrs)
*     QJOB queues the job.
*************************************************************
```

```
QJOB     MACRO
         MOVE.L    \4,-(SP)
         MOVE.L    \3,-(SP)
         MOVE.L    \2,-(SP)
         MOVE.L    \1,-(SP)
         BSR.W     .QJOB
         LEA       16(SP),SP
         ENDM
```

```
****************************************************
* UNQJOB (JOBQ)
*     UNQJOB gets the next job from (JOBQ).
*         If there is a job, its number is in D0,
*            its address in A0, and zero flag is clear.
*         Else D0=0, zero flag is set.
****************************************************
UNQJOB   MACRO
         MOVE.L    \1,-(SP)
         BSR.W     GETJOB
         ADDQ.L    #4,SP
         TST       D0
         ENDM
```

```
****************************************************
* DELJOBQ (Job queue pntr adrs) - Delete a job queue
*     DELJOBQ deletes the job queue and frees
*         the queue memory.
****************************************************
DELJOBQ  MACRO
         PEA       \1
         BSR.W     .DELJOBQ
         ADDQ.L    #4,SP
         ENDM
```

```
****************************************************
* TSTGLBL (#)
*     TSTGLBL tests the Parameter List byte at
*         offset (#).
*
* RTN:   Zero flag reflects state of the byte.
****************************************************
TSTGLBL  MACRO
         MOVE.L    A0,-(SP)
         MOVE.L    .PARAMS,A0
         TST.B     \1(A0)
         MOVEA.L   (SP)+,A0
         ENDM
```

```
****************************************************
* GLBLADR (byte#)
*     GLBLADR gets the adrs of Parameter List
*         byte (byte#).
*
* RTN:   A0 -> Parameter List byte.
****************************************************
GLBLADR  MACRO
         MOVE.L    .PARAMS,A0
         ADDA.W    \1,A0
         ENDM
```

```
****************************************************
* GWINDOW gets a window parameter or
*         adrs for (#) at XMIN,XMAX,YMIN,YMAX
*
* RTN:   For .ARCRAD, .CHRMNSZ, .CHRORNT, .SMBMNSZ
*            and .SMBORNT:    A0 -> parameter.
*        For all others:      D0 = flag value (1/0)
*        All regs except A0 & D0 unchanged.
****************************************************
GWINDOW  MACRO
         MOVE.W    \5,-(SP)
         MOVE.W    \4,-(SP)
         MOVE.W    \3,-(SP)
         MOVE.W    \2,-(SP)
         MOVE.W    \1,-(SP)
         BSR.W     .GPARAM
```

```
            LEA         10(SP),SP
            ENDM

**********************************************************
* TSTWNDO   (Lower parameter #),(higher parameter #)
*              Tests for parameters enabled in any
*              window.
*
* RTN:   No parameter enabled: D0=0, ZF=1.
*        Any parameter enabled: D0=1, ZF=0.
**********************************************************
TSTWNDO  MACRO
            MOVE.W      \1,-(SP)
            MOVE.W      \2,-(SP)
            BSR.W       .TPARAM
            LEA         4(SP),SP
            ENDM

**********************************************************
* TESTABT
*      TESTABT tests "abort" flag. If set, jumps
*         directly out, does not return.
**********************************************************
TESTABT  MACRO
            TST.B       .ABRTF
            BNE.W       .ABRTPRC
            ENDM

**********************************************************
* .SNDBFR (BUFR ADRS),(BUFR LENGTH)
*         .SNDBFR sends a buffer load of data to WS.
**********************************************************
.SNDBFR  MACRO
            PEA         \1
            MOVE.W      \2,-(SP)
            BSR.W       .SNDBUFR
            ADDQ.L      #6,SP
            ENDM

**********************************************************
* ABORT (CODE)
*      ABORT stores CODE into .ABTNUM, sets .ABRTF,
*         and aborts the processor.
**********************************************************
ABORT    MACRO
            MOVE.B      \1,D0
            JMP         .ABRTPRC
            ENDM
**********************************************************
* DOJOB (job queue adrs)
*         Does a job from the job queue, if any there.
*         Returns D0 = 1 if job done, else 0, & ZF reset/set
* Example: DOJOB #.JOBQ
**********************************************************
DOJOB    MACRO
            MOVE.L      \1,-(SP)
            BSR.W       .DOJOB
            LEA         4(SP),SP
            ENDM

**********************************************************
* .ENTER (status)
*         Sets processor status to (status)
* Example:  .ENTER SCANSTA$
**********************************************************
.ENTER   MACRO
            MOVEM.L     A6/D6,-(SP)
            LEA         .P!STAT,A6
            CLR.L       D6
            MOVE.B      .PRCNUM,D6
            MOVE.B      #\1,(A6,D6)
            MOVEM.L     (SP)+,A6/D6
            ENDM
```

```
**************************************************
* .EXIT (task#)    (task# is optional)
*       Sets processor status to idle. If task#
*         specified, clears task# in .TASKS
* Example:  .EXIT
*           .EXIT PIXEL$
**************************************************
.EXIT   MACRO
        MOVEM.L    A6/D6,-(SP)
        LEA        .P1STAT,A6
        CLR.L      D6
        MOVE.B     .PRCNUM,D6
        CLR.B      (A6,D6)
        IFNC       '\1',''
        LOCK       .SYSLOCK
        BCLR       #\1,.TASKS
        UNLOCK     .SYSLOCK
        ENDC
        MOVEM.L    (SP)+,A6/D6
        ENDM

****************************************************************
* ENTERSUB (#status)
*       Saves existing processor status at -(SP) and updates it
*       to (#status).  MUST BE MATCHED BY EXITSUB.
****************************************************************
ENTERSUB MACRO
        LEA        -2(SP),SP
        MOVEM.L    A6/D6-D7,-(SP)
        LEA        .P1STAT,A6
        CLR.L      D6
        MOVE.B     .PRCNUM,D6
        MOVE.B     (A6,D6),D7
        MOVE.W     D7,12(SP)
        MOVE.B     \1,(A6,D6)
        MOVEM.L    (SP)+,A6/D6-D7
        ENDM

****************************************************************
* EXITSUB
*
****************************************************************
EXITSUB MACRO
        MOVEM.L    A6/D6-D7,-(SP)
        LEA        .P1STAT,A6
        CLR.L      D6
        MOVE.B     .PRCNUM,D6
        MOVE.W     12(SP),D7
        MOVE.B     D7,(A6,D6)
        MOVEM.L    (SP)+,A6/D6-D7
        LEA        2(SP),SP
        ENDM

************* System Definitions *******************

NOFORMAT
****************** ADR .STATE values *******************
.ADRIDLE EQU       0          0 = Waiting for GO
.ADRSCAN EQU       1          1 = Scanning & Clipping
.ADRDUCE EQU       2          2 = Resolution Reduction
.ADRNCNT EQU       3          3 = Non-context processing
.ADRCNTX EQU       4          4 = Context processing
.LDMETA  EQU       5          5 = Loading Metafile

****************** TASKS flags *************************
PIXEL$    EQU      0          Bit 0 = Pixelize
OBJGRB$   EQU      1              1 = Grab Objects
VECTCHR$  EQU      2              2 = Recognize Vectors & Chars
SYMBREC$  EQU      3              3 = Recognize symbols
CMBNBLB$  EQU      4              4 = Combine blobs
CHRCNTX$  EQU      5              5 = Do context processing
DSPSBLB$  EQU      6              6 - Dispose of blobs
DIMNREC$  EQU      7              7 - Recognize dimension lines
RECOGN$   EQU      $FE         Set all recognize flags
SYMDONE$  EQU      $1F         "Non-context" mask
```

```
*************** "ABORT" codes ************************
.WSRESET  EQU    1        1 = Work-station said reset
.WSABRT   EQU    2        2 = Work-station said abort
.MEMABRT  EQU    3        3 = Memory overflow
.JBQABRT  EQU    4        4 = JOBQ overflow
.OBJABRT  EQU    5        5 = Out of RAM for objects.

************** Processor status codes *****************
IDLESTA$  EQU    0        Idle
SCANSTA$  EQU    1        Scanning
CLIPSTA$  EQU    2        Clipping raw runlengths
RDUCSTA$  EQU    3        Reducing raw runlenghts
PIXLSTA$  EQU    4        Pixelizing
OBJSTA$   EQU    5        Object-grabbing
CTRLSTA$  EQU    6        Metagrabber
VECGSTA$  EQU    7        Vectorizing
CHARSTA$  EQU    8        Character recognizing
LTYPSTA$  EQU    9        Linetypes
SYMBSTA$  EQU    10       Symbol recognition
CMBNSTA$  EQU    11       Combining blobs
DMCLSTA$  EQU    12       Dimensioning clumps
CNTXSTA$  EQU    13       Character context
DSPSSTA$  EQU    14       Disposing of blobs
METASTA$  EQU    15       Uploading metafile (NOT NEEDED)
SORTING$  EQU    15       Sorting
RELEASE$  EQU    16       Releasing memory

*************** Memory file constants *******************
EOBLK     EQU    $F000    End-of-block
```

I claim:

1. A method of compiling serial pixel data reduced by scanning consecutive rows of an image, the method comprising the steps of:
   (a) encoding the serial pixel data to produce runlength data including a plurality of slices each including a plurality of consecutive connected pixels;
   (b) forming a first open list including a plurality of slices of a first row of the image;
   (c) determining if a first portion of a first slice in the first open list overlaps a first portion of a second slice from a second row of the image;
   (d) if the first portion of the first slice overlaps the first portion of the second slice and it a second portion of the first slice does not overlap a portion of another slice, attaching the second slice to a growing column of the first open list by attaching the second slice to the first slice;
   (e) if the first portion of the first slice overlaps the first portion of the second slice, and it the second portion of the first slice overlaps a portion of another slice, creating another column of the first open list and putting the second slice in that column, wherein each slice has a left end coordinate and a right end coordinate and wherein each object corresponds to an open list and the image includes at least one object, the object having the property that it includes a plurality of dark connected pixels which are surrounded entirely by transparent pixels, wherein step (c) includes determining if the left coordinate of the first slice is less than the left coordinate of the second slice; and
   (f) if the left coordinate of the first slice is less than the left coordinate of the second slice, determining it the right coordinate of the first slice is less than the left coordinate of the second slice, and it is, determining that the first slice does not overlap the second slice.

2. The method of claim 1 including the steps of
   (1) repeating steps (c), (d) and (e) for a next slice that is from the first open list or the second row by determining if a first portion of the next slice overlaps the first portion of whichever of the first and second slices is form a different row than the next slice until all slices from the first row or the second row have been attached to the first open list; and
   (2) repeating steps (a) through (e) for the next row of slices of the image and the last row of slices attached to the first open list until the slices of all rows of an object of the image have been attached to the first open list.

3. The method of claim 2 including the step of creating another open list corresponding to another object of the image and putting the second slice in that open list if the first portion of the first slice does not overlap the first portion of the second slice.

4. The method of claim 1 including, if the right coordinate of the first slice is not less than the left coordinate of the right slice, determining if the right coordinate of the first slice is greater than the right coordinate of the second slice and if it is, determining that the first slice does overlap the second slice and determining if the first slice was previously attached to another slice on the same line as the second slice.

5. The method of claim 4 including, if the right coordinate of the first slice is greater than the right coordinate of the second slice, and if it is, reading the next slice of the second row before performing step (e).

6. The method of claim 5 including, if the right coordinate of the first slice is not equal to the right coordinate of the second slice, reading the next slice o the open list before performing step (e).

7. A method of compiling serial pixel data produced by scanning consecutive rows of an image, the method comprising the steps of:
   (a) encoding the serial pixel data to produce runlength data including a plurality of slices each including a plurality of consecutive connected pixels;

(b) forming a first open list including a plurality of slices of a first row of the image;

(c) determining if a first portion of a first slice in the first open list overlaps a first portion of a second slice from a second row of the image;

(d) if the first portion of the first slice overlaps the first portion of the second slice and it a second portion of the first slice does not overlap a portion of another slice, attaching the second slice to a growing column of the first open list by attaching the second slice to the first slice;

(e) if the first portion of the first slice overlaps the first portion of the second slice, and it the second portion of the first slice overlaps a portion of another slice, creating another column of the first open list and putting the second slice in that column;

(f) creating another open list corresponding to another object of the image and putting the second slice in that open list if the first portion of the first slice does not overlap the first portion of the second slice, wherein each slice has a left end coordinate and a right end coordinate and wherein each object corresponds to an open list and the image includes at least one object having the property that it includes a plurality of dark connected pixels which are surrounded entirely by transparent pixels, wherein step (c) includes determining if the left coordinate of the first slice is less than the left coorrdinate of the second slice; and (g) if the left coordinate of the first slice is not less than the left coordinate of the right slice, determining if the left coordinate of the first slice is greater than the left coordinate of the second slice, and it is, determining it the left coordinate of the first slice is greater than the right coordinate of the second slice, and it is, determining that the first slice does not overlap the second slice, and creating a new open list corresponding to another object.

8. The method of claim 7 including, if the left coordinate of the first slice is not greater than the right coordinate of the second slice, determining that the first slice overlaps the second slice and determining if the right coordinate of the first slice is less than the right coordinate of the second slice, and if it is, determining if the second slice is attached to another slice on the same line as the second slice, and if it is, merging the object which the second slice is a part of with the object that the first slice is a part of.

9. The method of claim 8 including, if the right coordinate of the first slice is not less than the right coordinate of the second slice, determining if the second slice is attached to another slice on the same line, and if it is, merging the object at the second slice is a part of with the object that the first slice is a part of, and if it is not, attaching the second slice to the first slice to grow a column of the open list.

10. The method of claim 7 including, if the left coordinate of the first slice is greater than the left coordinate of the second slice, determining that the first slice overlaps the second slice, and attaching the second slice to the first slice.

11. The method of claim 19 wherein if the next slice of the second row is read after the end of the present line of the open list, performing the step of creating a new open list record and including in it the slice from the second row.

12. The method of claim 7 including filling minute horizontal holes between slices in the frame by performing the steps of (a) entering at least an upper portion of an object represented by a list of linked lists into a frame or table;

(b) beginning at the top row of the frame, measuring the horizontal gaps between adjacent slices on that row; and (c) extending slices on one side of insignificant horizontal gaps to join slices on the opposite side of the insignificant horizontal gaps.

13. The method of claim 12 including filling a minute vertical hole formed by slices in the frame by performing the steps of:

(a) forming a second open list including a plurality of slices in a row of the frame;

(b) determining if a first portion of a first slice in the second open list overlaps a first portion of a second slice from the next row in the frame;

(c) if the first portion of the first slice of the second list overlaps the first portion of the second slice, i. attaching the second slice from the next row of the frame to a growing first column of the second open list by attaching that second slice to the first slice of the second open list if a second portion of that first slice does not overlap a portion of another slice;

ii. creating a second column of the second open list and putting the second slice in that column if the second portion of the first slice of the second open list does overlap a portion of another slice;

iii. measuring and storing the heights of side walls formed by the growing first and second columns that are diverging from a common slice of the second open list;

iv. storing address pointers of ends of slices forming the side walls, respectively;

v. repeating steps (b)(i) through (b)(iv) until the minute vertical hole is formed by a slice being added to the growing second column forming one of the walls is attached to a slice of the growing second column forming the other wall to form the minute vertical hole; and vi. if the heights are less than a minute predetermined value, filling the minute hole by using the address pointers to extend slices forming one of the walls across the hole to corresponding slices forming the other wall of the hole.

14. The method of claim 13 wherein the entering of the upper portion of the object into the frame includes the step of arranging the slices entered into the frame in left-to-right order in accordance with increasing X coordinates of the respective slices.

15. The method of claim 14 including further simplifying the filtered data in the frame by performing the steps of (a) forming a third open list including a row of slices of the frame;

(b) determining if a first portion of a first slice in the third open list overlaps a first portion of a second slice in a next row of the frame;

(c) if the first portion of the first slice of the third open list overlaps the first portion of the second slice of that next row of the frame, i. attaching that second slice to a first growing column of the third open list by attaching that second slice to the first slice of the third open list if a second portion of the first slice of the third open list does not overlap a portion of another slice, ii. creating a second column of the third open list and putting that second slice in that second column if the second portion of the first slice of the third open list does overlap a portion of another slice;

iii. repeating the immediately preceding steps (b) and (c) for a next slice from the third open list or a next row of the frame by determining if a first portion of that next slice overlaps the first portion of whichever of the first and second slices of those steps is from a different row than that next slice until all the slices of the third open list and that next row have been attached to the open list;

(d) if the first portion of the first slice of the third open list slice does not overlap the first portion of the second slice of if that next row of the frame, then creating another open list and putting that second slice into that open list; and (e) measuring changes in the slopes of front and rear edges of a growing column of the open list and, if the growing column can be represented by a rapezoid, storing coordinates of the four corner points of the trapezoid in a trapezoid record, and otherwise storing each of the slices of the nonlinear edge portion of the growing column in a blob record.

16. The method of claim 15 including storing address pointers in each blob record or trapezoid record linking that record to another record.

17. The method of claim 15 including creating a divergence record if the first portion of the first slice of the third open list overlaps the first portion of the second slice of the next row of the frame and the left end coordinate of the final slice of the third open list is less than the left end coordinate of the second slice of the next row of the frame and the first slice of the third open list is attached to another slice.

18. The method of claim 15 including creating a convergence record if the first portion of the first slice of the third open list overlaps the first portion of the second slice of the frame and the left end coordinate of the first slice of the third open list is greater than the left end coordinate of the second slice of the next row of the frame and the second slice of the next row of the frame is attached to another slice.

19. A method of compiling serial pixel data produced by scanning consecutive rows of an image, the method comprising the steps of:

(a) encoding the serial pixel data to produce a plurality of slices each including a plurality of consecutive connected pixels;

(b) creating a first open list and inserting slices of a first row of the image into the first open list;

(c) operating on slices in the last row of slices inserted in the first open list and slices in the next row of the image by means of a first slice classifier to attach slices of the next row to slices of the last row entered in the first open list to grow branches of the first open list, to create new branches of the first open list and insert slices of the next row in the new branches, or to terminate growing branches of the first open list, in accordance with the relationship between individual slices in the last row inserted in the first open list and the next row of the image;

(d) repeating step (c) for each row of the image;

(e) entering a portion of the slice data from the first open list into a frame;

(f) eliminating insignificant horizontal gaps between slices in the frame by extending slices across such gaps;

(g) eliminating insignificant vertical gaps by creating a second open list and inserting slices from a first row of the frame into the second open list;

(h) operating on slices in the last row inserted in the second open list and slices in the next row of the frame by means of a second slice classifier to attach slices of the next row of the frame to slices of the last row entered into the second open list to grow columns of the second open list, to create new columns of the second open list and insert slices of the next row of the frame in the new columns, or to terminate growing columns of the second open list, in accordance with relationships between individual slices in the last row of slices entered into the second open list and individual slices of the next row of the frame;

(i) determining the height of columns forming divergences and holes of columns formed in the second open list and filling holes of less than a predetermined height formed in the second open list by extending slices bounding one wall of the hole to include corresponding slices bounding the opposite wall of the hole;

(j) simplifying data in the second open list into an assembly of linked trapezoid records and blob records by i. creating a third open list and inserting slices from a first row of the second open list into the third open list, ii. operating on slices in the last row inserted into the third open list and slices in the next row of the second open list by means of a third slice classifier to attach slices of the next row of the second open list to slices of the last row inserted in the third open list to grow branches of the third open list, to create new branches of the third open list and insert slices of the next row of the second list in the new branches, or to terminate growing branches of the third open list in accordance with the relationships between individual slices of the last row inserted in the third open list and individual slices of the next row of the second open list, iii. testing the linearity of branches of the third open list, and if front and rear edges of a branch of the third open list are sufficiently linear, entering the four corner points of the resulting trapezoid in a trapezoid record, and if a front or rear edge of a branch is not sufficiently linear, entering all slices bounded by the nonlinear edge into a blob record, and providing address pointers from each blob record or trapezoid record to the record of adjacent branches or trapezoid sections or blob sections thereof.

20. The method of claim 19 wherein the first, second, and third slice classifiers are essentially similar.

21. A system of compiling serial pixel data produced by scanning consecutive rows of an image, the system comprising in combination:

(a) means for encoding the serial pixel data to produce a plurality of slices each including a plurality of consecutive connected pixels;

(b) means for creating a first open list and inserting slices of a first row of the image into the first open list;
(c) means for operating on slices in the last row of slices inserted in the first open list and slices in the next row of the image by means of a first slice classifier to attach slices of the next row to slices of the last row entered in the first open list to grow branches of the first open list, to create new branches of the first open list and insert slices of the next row in the new branches, or to terminate growing branches of the first open list, in accordance with the relationship between individual slices in the last row inserted in the first open list and the next row of the image;
(d) means for entering a portion of the slices from the first open list into a frame or data table;
(e) means for eliminating insignificant horizontal gaps between slices in the frame by extending slices across such gaps;
(f) means for eliminating insignificant vertical gaps by creating a second open list and inserting slices from a first row of the frame into the second open list;
(g) means for operating on slices in the last row inserted in the second open list and slices in the next row of the frame by means of a second slice classifier to attach slices of the next row of the frame to slices of the last row entered into the second open list to grow columns of the second open list, to create new columns of the second open list and insert slices of the next row of the frame in the new columns, or to terminate growing columns of the second open list, in accordance with relationships between individual slices in the last row of slices entered into the second open list and individual slices of the next row of the frame;
(h) means for determining the height of columns forming divergences and holes of columns formed in the second open list and means for filling holes of less than a predetermined height formed in the second open list by extending slices bounding one wall of the hole to include corresponding slices bounding the opposite wall of the hole;
(i) means for simplifying data in the second open list into an assembly of linked trapezoid records and blob records, including
  i. means for creating a third open list and inserting slices from a first row of the second open list into the third open list,
  ii. means for operating on slices in the last row inserted into the third open list and slices in the next row of the second open list by means of a third slice classifier to attach slices of the next row of the second open list to slices of the last row inserted in the third open list to grow branches of the third open list, to create new branches of the third open list and insert slices of the next row of the second list in the new branches, or to terminate growing branches of the third open list in accordance with the relationships between individual slices of the last row inserted in the third open list and individual slices of the next row of the second open list,
  iii. means for testing the linearity of branches of the third open list, and means for entering the four corner points of the resulting trapezoid in a trapezoid record if front and rear edges of a branch of the third open list are sufficiently linear, and means for entering all slices bounded by the nonlinear edge into a blob record, if a front or rear edge of a branch is not sufficiently linear, and means for providing address pointers from each blob record or trapezoid record to the record of adjacent branches or trapezoid sections or blob sections thereof.

22. The system of claim 21 wherein the first, second, and third slice classifiers are essentially similar.

23. A system for compiling serial pixel data produced by scanning consecutive rows of an image, the system comprising in combination:
(a) means for encoding the serial pixel data to produce runlength data including a plurality of slices each including a plurality of consecutive connected pixels;
(b) means for forming a first open list including a plurality of slices of a first row of the image;
(c) means for determining if a first portion of a first slice in the first open list overlaps a first portion of a second slice from a second row of the image;
(d) means for attaching the second slice to a growing column of the first open list by attaching the second slice to the first slice, if a second portion of the first slice does not overlap a portion of another slice and it the first portion of the first slice overlaps the first portion of the second slice;
(e) means for creating another column of the first open list and putting the second slice in that column, it the second portion of the first slice does overlap a portion of another slice and if the first portion of the first slice overlaps the first portion of the second slice, wherein each slice has a left end coordinate and a right end coordinate and wherein each object corresponds to an open list and the image includes at least one object, each object having the property that it includes a plurality of dark connected pixels which are surrounded entirely by transparent pixels, wherein the determining means determines if the left coordinate of the first slice is less than the left coordinate of the second slice; and
(f) means for determining that the first slice does not overlap the second slice by determining that the left coordinate of the first slice is less than the left coordinate of the second slice and the right coordinate of the first slice is less than the left coordinate of the second slice.

24. The system of claim 23 including means for creating another open list corresponding to another object of the image and putting the second slice in that open list if the first portion of the first slice does not overlap the first portion of the second slice.

25. The system of claim 23 including means for filling minute horizontal holes between slices, the horizontal hole filling means including:
(a) means for entering an upper portion of an object represented by a list of linked lists into a frame or data table;
(b) means for measuring the horizontal gaps between adjacent slices on that row, beginning at a top row of the frame; and
(c) means for extending slices on one side of insignificant horizontal gaps to join slices on the opposite side of the insignificant horizontal gaps.

26. The system of claim 25 including means for filling a minute vertical hole formed by slices in the frame, the vertical hole filling means including:
(a) means for forming a second open list including a plurality of slices in a row of the frame;
(b) means for determining if a first portion of a first slice in the second open list overlaps a first portion of a second slice from the next row in the frame;
(c) means for
  i. attaching the second slice from the next row of the frame to a growing first column of the second open list by attaching that second slice to the first slice of the second open list if a second portion of that first slice does not overlap a portion of another slice;
  ii. creating a second column of the second open list and putting the second slice in that column if the second portion of the first slice of the second open list does overlap a portion of another slice;
  iii. measuring and storing the heights of side walls formed by the growing first and second columns that are diverging from a common slice of the second open list;
  iv. storing address pointers of ends of slices forming the side walls, respectively; and
  v. if the heights are less than a minute predetermined value, filling the minute hole by using the address pointers to extend slices forming one of the walls across the hole to corresponding slices forming the other wall of the hole,
if the first portion of the first slice of the second list overlaps the first portion of the second slice.

27. The system of claim 26 wherein the means for entering the upper portion of the object into the frame includes means for arranging the slices entered into the frame in left-to-right order in accordance with increasing X coordinates of the respective slices.

28. The system of claim 27 including means for further simplifying the filtered data in the frame, including:
(a) means for forming a third open list including a row of slices of the frame;
(b) means for determining if a first portion of a first slice in the third open list overlaps a first portion of a second slice in a next row of the frame;
(c) means for
  i. attaching that second slice to a first growing column of the third open list by attaching that second slice to the first slice of the third open list if a second portion of the first slice of the third open list does not overlap a portion of another slice,
  ii. creating a second column of the third open list and putting that second slice in that second column if the second portion of the first slice of the third open list does overlap a portion of another slice,
if the first portion of the first slice of the third open list overlaps the first portion of the second slice of that next row of the frame,
(d) means for creating another open list and putting that second slice into that open list if the first portion of the first slice of the third open list slice does not overlap the first portion of the second slice of if that next row of the frame; and
(e) means for measuring changes in the slope of front and rear edges of a growing column of the open list and, if the growing column can be represented by a trapezoid, storing coordinates of the four corner points of the trapezoid in a trapezoid record, and otherwise storing each of the slices of the nonlinear edge portion of the growing column in a blob record.

29. The system of claim 28 including means for storing address pointers in each blob record or trapezoid record linking that record to another record.

30. The system of claim 28 including means for creating a divergence record if the first portion of the first slice of the third open list overlaps the first portion of the second slice of the next row of the frame and the left end coordinate of the final slice of the third open list is less than the left end coordinate of the second slice of the next row of the frame and the first slice of the third open list is attached to another slice.

31. The system of claim 28 including means for creating a convergence record if the first portion of the first slice of the third open list overlaps the first portion of the second slice of the frame and the left end coordinate of the first slice of the third open list is greater than the left end coordinate of the second slice of the next row of the frame and the second slice of the next row of the frame is attached to another slice.

32. A system of compiling serial pixel data produced by scanning consecutive rows of an image, the system comprising in combination:
(a) means for encoding the serial pixel data to produce a plurality of slices each including a plurality of consecutive connected pixels;
(b) means for creating a first open list and inserting slices of a first row of an image into the first open list;
(c) means for operating on slices in the last row of slices inserted in the first open list and slices in the next row of the image by means of a first slice classifer to attach slices of the next row to slices of the last row entered in the first open list to grow branches of the first open list, to create new branches of the first open list and insert slices of the next row in the new branches, or to terminate growing branchs of the first open list, in accordance with the relationship between individual slices in the last row inserted in the first open list and the next row of the image;
(d) means for entering a portion of the slices from the first open list into a frame or data table;
(e) means for eliminating insignificant horizontal gaps between slices in the frame by extending slices across such gaps;
(f) means for eliminating insignificant vertical gaps by creating a second open list and inserting slices from a first row of the frame into the second open list;
(g) means for operating on slices in the last row inserted in the second open list and slices in the next row of the frame by means of a second slice classifier to attach slices of the next row of the frame to slices of the last row entered into the second open list to grow columns of the second open list, to create new columns of the second open list and insert slices of the next row of the frame in the new columns, or to terminate growing columns of the second open list, in accordance with relationships between individual slices in the last row of slices entered into the second open list and individual slices of the next row of the frame; and
(h) means for determining the height of columns forming divergences and holes of columns formed in the second open list and means for filling holes of less than a predetermined height formed in the second open list by extending slices bounding one wall of the hole to include corresponding slices bounding the opposite wall of the hole.

33. A method of comprising serial pixel data produced by scanning consecutive rows of an image, the method comprising the steps of:
(a) encoding the serial pixel data to produce run-length data including a plurality of slices each including a plurality of consecutive connected pixels;
(b) forming an open list including a plurality of open listing nodes each having an associated open list record and a plurality of slices of a first row of the image in the open list nodes, respectively, an storing data pertaining to each slice in the open list record of the open list node including that slice, the stored data including a left end coordinate and a right end coordinate of each slice and also additional data derived from coordinates of previous slices, to be used in subsequent data compression, interpretation, or record-building operations;
(c) using the open list record of the first slice to determine if a first portion of a first slice in the open list overlaps a first portion of a second slice from a second row of the image;
(d) if the first portion of the first slice overlaps the first portion of the second slice and it a second portion of the first slice does not overlap a portion of another slice, attaching the second slice to a first growing column of the open list by attaching the second slice to the first slice by substituting the left coordinate of the second slice for the left coordinate of the first slice and substituting the right coordinate of the second slice for the right coordinate of the first slice in the open list record of the node including the first slice; and
(e) using the additional data in the open list record of the node now including the first and second slices to simplify the compiled pixel data or to create a blob record or a trapezoid record represented the first growing column.

34. The method of claim 33 including, if the first portion of the first slice overlaps the first portion of the second slice and the second portion of the first slice overlaps a portion of another slice, creating a second growing column of the first open list and putting the second slice in the second growing column by putting a left cooordinate and right coordinate of the second slice and additional data derived form coordinates of previous slices, to be used in subsequent data compression, interpretation, or record-building operations in an open list record of an open list node now including the second slice, and using the additional data in the open list records to create a divergence record or a convergence record.

* * * * *